(12) United States Patent
Smith et al.

(10) Patent No.: US 12,036,496 B2
(45) Date of Patent: Jul. 16, 2024

(54) FILTER MEDIA WITH IRREGULAR STRUCTURE

(71) Applicant: Hollingsworth & Vose Company, East Walpole, MA (US)

(72) Inventors: Bruce Smith, Copper Hill, VA (US); Maxim Silin, Hudson, MA (US); David T. Healey, Bellingham, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 16 days.

(21) Appl. No.: 17/873,960

(22) Filed: Jul. 26, 2022

(65) Prior Publication Data

US 2023/0025717 A1    Jan. 26, 2023

Related U.S. Application Data

(63) Continuation of application No. 16/181,242, filed on Nov. 5, 2018, now Pat. No. 11,433,332.

(51) Int. Cl.
*B01D 53/22* (2006.01)
*B01D 39/16* (2006.01)

(52) U.S. Cl.
CPC .... *B01D 39/163* (2013.01); *B01D 2239/0241* (2013.01); *B01D 2239/0618* (2013.01);
(Continued)

(58) Field of Classification Search
CPC .... B01D 2239/0622; B01D 2239/1225; B01D 2239/0618; B01D 39/163;
(Continued)

(56) References Cited

U.S. PATENT DOCUMENTS

| 2,152,900 A | 4/1939 | Manning |
| 2,444,301 A | 6/1948 | Kyrides et al. |
| (Continued) | | |

FOREIGN PATENT DOCUMENTS

| EP | 2 487 285 A1 | 8/2012 |
| JP | H04-45813 A | 2/1992 |
| (Continued) | | |

OTHER PUBLICATIONS

International Search Report and Written Opinion for PCT/US19/59652 mailed Feb. 27, 2020.
(Continued)

*Primary Examiner* — Anthony R Shumate
(74) *Attorney, Agent, or Firm* — Wolf, Greenfield & Sacks, P.C.

(57) ABSTRACT

Articles and methods relating to filter media are generally provided. In some embodiments, a filter media has an irregular surface structure. For instance, the filter media may comprise a plurality of peaks that are irregular in one or more ways. A ratio of a peak height standard deviation to an average peak height may be greater than or equal to 0.05, and/or a ratio of a peak spacing standard deviation to an average peak spacing may be greater than or equal to 0.08. In some embodiments, a filter media comprises a non-woven fiber web having a layer thickness of greater than 0.3 mm and/or a stiffness of less than or equal to 100 mg.

17 Claims, 20 Drawing Sheets

(52) U.S. Cl.
CPC ............... *B01D 2239/0622* (2013.01); *B01D 2239/0627* (2013.01); *B01D 2239/0631* (2013.01); *B01D 2239/0654* (2013.01); *B01D 2239/1225* (2013.01); *B01D 2239/1258* (2013.01); *B01D 2239/1275* (2013.01)

(58) Field of Classification Search
CPC .... B01D 2239/1275; B01D 2239/1258; B01D 2239/0241; B01D 2239/0631; B01D 2239/0654; B01D 2239/0627
See application file for complete search history.

(56) References Cited

U.S. PATENT DOCUMENTS

| | | | |
|---|---|---|---|
| 2,600,962 A | 6/1952 | Billings | |
| 3,270,132 A * | 8/1966 | Richey | H04N 3/02 |
| | | | 358/484 |
| 3,291,986 A | 12/1966 | Lamb | |
| 3,853,658 A * | 12/1974 | Ney | G02B 6/06 |
| | | | 156/290 |
| 3,982,075 A | 9/1976 | Jefferis et al. | |
| 4,423,923 A * | 1/1984 | Frazier | G02B 6/2804 |
| | | | 385/115 |
| 4,433,896 A * | 2/1984 | Frazier | G02B 6/2804 |
| | | | 156/158 |
| 4,606,964 A | 8/1986 | Wideman | |
| 4,652,487 A | 3/1987 | Morman | |
| 4,874,399 A | 10/1989 | Reed et al. | |
| 4,981,747 A | 1/1991 | Morman | |
| 5,084,178 A | 1/1992 | Miller et al. | |
| 5,277,976 A | 1/1994 | Hogle et al. | |
| 5,347,378 A | 9/1994 | Handschy et al. | |
| 5,580,459 A | 12/1996 | Powers et al. | |
| 5,643,507 A | 7/1997 | Berrigan et al. | |
| 5,672,399 A | 9/1997 | Kahlbaugh et al. | |
| 5,764,518 A | 6/1998 | Collins | |
| 5,785,725 A | 7/1998 | Cusick et al. | |
| 5,855,783 A | 1/1999 | Shucosky et al. | |
| 5,891,207 A | 4/1999 | Katta | |
| 6,030,428 A | 2/2000 | Ishino et al. | |
| 6,146,451 A | 11/2000 | Sakata | |
| 6,171,684 B1 | 1/2001 | Kahlbaugh et al. | |
| 6,184,531 B1 | 2/2001 | Smart et al. | |
| 6,197,709 B1 | 3/2001 | Tsai et al. | |
| 6,200,368 B1 | 3/2001 | Guerin et al. | |
| 6,537,614 B1 | 3/2003 | Wei et al. | |
| 6,623,548 B1 | 9/2003 | Gordon et al. | |
| 6,858,057 B2 | 2/2005 | Healey | |
| 6,867,156 B1 | 3/2005 | White et al. | |
| 6,964,720 B2 | 11/2005 | Schneider et al. | |
| 6,966,939 B2 | 11/2005 | Rammig et al. | |
| 6,986,804 B2 | 1/2006 | Dominiak et al. | |
| 7,008,465 B2 | 3/2006 | Graham et al. | |
| 7,137,510 B1 | 11/2006 | Klein et al. | |
| 7,314,497 B2 | 1/2008 | Kahlbaugh et al. | |
| 7,883,562 B2 | 2/2011 | Healey et al. | |
| 8,162,153 B2 | 4/2012 | Fox et al. | |
| 8,197,569 B2 | 6/2012 | Healey et al. | |
| 8,202,340 B2 | 6/2012 | Healey et al. | |
| 8,231,700 B2 | 7/2012 | Sundet | |
| 8,257,459 B2 | 9/2012 | Healey et al. | |
| 8,741,083 B2 | 6/2014 | Wennerbaeck et al. | |
| 8,882,875 B2 | 11/2014 | Healey et al. | |
| 9,616,258 B2 | 4/2017 | Tsuei | |
| 9,687,771 B2 | 6/2017 | Healey | |
| 9,718,020 B2 | 8/2017 | Healey et al. | |
| 11,420,143 B2 | 8/2022 | Smith et al. | |
| 11,433,332 B2 | 9/2022 | Smith et al. | |
| 2003/0213109 A1 | 11/2003 | Neely et al. | |
| 2004/0035095 A1 | 2/2004 | Healey | |
| 2005/0101216 A1 | 5/2005 | Middlesworth et al. | |
| 2005/0193696 A1 | 9/2005 | Muller et al. | |
| 2006/0063456 A1 * | 3/2006 | Carter | D04H 1/495 |
| | | | 442/327 |
| 2006/0096263 A1 | 5/2006 | Kahlbaugh et al. | |
| 2007/0100058 A1 * | 5/2007 | Noguchi | C08J 5/042 |
| | | | 423/447.2 |
| 2007/0157589 A1 | 7/2007 | Haberkamp et al. | |
| 2007/0283808 A1 | 12/2007 | Chung et al. | |
| 2008/0110342 A1 | 5/2008 | Ensor et al. | |
| 2008/0134893 A1 | 6/2008 | Kuo et al. | |
| 2008/0202078 A1 | 8/2008 | Healey et al. | |
| 2008/0217241 A1 | 9/2008 | Smithies et al. | |
| 2009/0071888 A1 | 3/2009 | Raedts | |
| 2009/0249956 A1 | 10/2009 | Chi et al. | |
| 2010/0107881 A1 | 5/2010 | Healey et al. | |
| 2010/0181249 A1 | 7/2010 | Green et al. | |
| 2010/0319310 A1 | 12/2010 | Smith et al. | |
| 2010/0320138 A1 | 12/2010 | Waller et al. | |
| 2011/0212008 A1 | 9/2011 | Punke et al. | |
| 2011/0214570 A1 | 9/2011 | Jones et al. | |
| 2012/0304602 A1 | 12/2012 | Healey et al. | |
| 2013/0025809 A1 | 1/2013 | Godsay et al. | |
| 2013/0108831 A1 | 5/2013 | Wu et al. | |
| 2014/0116945 A1 | 5/2014 | Kas et al. | |
| 2014/0265009 A1 | 9/2014 | Schaffitzel | |
| 2014/0346107 A1 | 11/2014 | Anantharamaiah et al. | |
| 2015/0035206 A1 | 2/2015 | Maggiore | |
| 2015/0053627 A1 | 2/2015 | Silin et al. | |
| 2015/0113930 A1 | 4/2015 | Zurliene | |
| 2015/0176852 A1 | 6/2015 | Ishibashi et al. | |
| 2015/0375142 A1 | 12/2015 | Rocklitz | |
| 2015/0375150 A1 | 12/2015 | Sahbaee et al. | |
| 2016/0068793 A1 | 3/2016 | Maggiore | |
| 2016/0129381 A1 | 5/2016 | Gao et al. | |
| 2016/0136554 A1 | 5/2016 | Swaminathan et al. | |
| 2017/0080368 A1 | 3/2017 | Smith et al. | |
| 2017/0216758 A1 | 8/2017 | Rocklitz et al. | |
| 2017/0312673 A1 | 11/2017 | Smith et al. | |
| 2017/0348876 A1 * | 12/2017 | Lin | B32B 27/283 |
| 2018/0001247 A1 | 1/2018 | Jinka et al. | |
| 2018/0015405 A1 | 1/2018 | Healey et al. | |
| 2018/0021716 A1 | 1/2018 | Li et al. | |
| 2018/0056226 A1 | 3/2018 | Buettner, III et al. | |
| 2018/0135006 A1 | 5/2018 | Maiser et al. | |
| 2018/0236384 A1 | 8/2018 | Smith | |
| 2018/0236385 A1 | 8/2018 | Jinka et al. | |
| 2018/0236389 A1 | 8/2018 | Jinka et al. | |
| 2018/0236399 A1 | 8/2018 | Marra | |
| 2018/0243674 A1 | 8/2018 | Gulrez et al. | |
| 2018/0266354 A1 | 9/2018 | Landolsi et al. | |
| 2018/0272258 A1 | 9/2018 | Healey et al. | |
| 2020/0139281 A1 | 5/2020 | Smith et al. | |
| 2020/0179837 A1 | 6/2020 | Loewe et al. | |
| 2020/0330913 A1 | 10/2020 | Smith et al. | |
| 2021/0290450 A1 * | 9/2021 | Nhan | D04H 1/54 |
| 2021/0372014 A1 * | 12/2021 | Wang | D03D 15/527 |
| 2022/0165141 A1 | 5/2022 | Tsai et al. | |
| 2023/0026576 A1 | 1/2023 | Smith et al. | |
| 2023/0124690 A1 * | 4/2023 | Yadav | B01D 39/163 |
| | | | 55/521 |
| 2023/0415081 A1 | 12/2023 | Smith et al. | |
| 2024/0060222 A1 * | 2/2024 | Nhan | A61F 13/51104 |

FOREIGN PATENT DOCUMENTS

| | | |
|---|---|---|
| WO | 2006/118838 A2 | 11/2006 |
| WO | 2016/119080 A1 | 8/2016 |

OTHER PUBLICATIONS

Joubert et al., Influence of Humidity on Clogging of Flat and Pleated HEPA Filters. Aerosol Science and Technology. 2010;44(12):1065-76.

* cited by examiner

… (1) …

FILTER MEDIA WITH IRREGULAR STRUCTURE

RELATED APPLICATIONS

This application is a continuation of U.S. patent application Ser. No. 16/181,242, filed Nov. 5, 2018, which is incorporated herein by reference in its entirety for all purposes.

FIELD

The present invention relates generally to filter media, and, more particularly, to filter media with an irregular structure.

BACKGROUND

Filter media can be formed of one or more fiber webs. A fiber web provides a porous structure that permits fluid (e.g., gas, air) to flow through the filter media. Contaminant particles contained within the fluid may be trapped on or within the fibrous web. Filter media characteristics, such as surface area and basis weight, affect filter performance including filter efficiency, pressure drop and resistance to fluid flow through the filter. In general, higher filter efficiencies may result in a higher resistance to fluid flow which leads to higher pressure drops for a given flow rate across the filter.

There is a need for filter media that can be used in a variety of applications which have a desirable balance of properties including a high efficiency and a low resistance to fluid flow across the filter media, leading to high gamma values.

SUMMARY

Filter media, related components, and related methods are generally described.

In some embodiments, a filter media is provided. The filter media comprises a non-woven fiber web having a stiffness of less than or equal to 100 mg and an average surface height of greater than 0.3 mm.

In some embodiments, a filter media is provided. The filter media comprises a non-woven fiber web comprising a plurality of peaks having an average peak height and a peak height standard deviation. A ratio of the peak height standard deviation to the average peak height is greater than or equal to 0.05. The non-woven fiber web has an average surface height of greater than 0.3 mm.

In some embodiments, a filter media is provided. The filter media comprises a non-woven fiber web comprising a plurality of peaks having an average peak spacing and a peak spacing standard deviation. A ratio of the peak spacing standard deviation to the average peak spacing is greater than or equal to 0.08. The non-woven fiber web has an average surface height of greater than 0.3 mm.

In some embodiments, a method of fabricating a filter media is provided. The method comprises depositing a non-woven fiber web onto a reversibly stretched layer and allowing the reversibly stretched layer to at least partially recover. The non-woven fiber web forms a plurality of peaks during recovery of the reversibly stretched layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Articles and methods related to filter media are generally provided. Some embodiments relate to filter media comprising an irregular structure. The irregular structure may be present on an external surface of the filter media, in the interior of the filter media, and/or throughout the filter media. In some embodiments, the irregular structure includes an irregular conformation (e.g., spatial conformation, surface conformation) of at least a portion of one or more layers in the filter media. For instance, the filter media may comprise one or more layers having a surface and/or three-dimensional shape that produces an irregular structure. In some embodiments, the irregular structure may be a plurality of peaks having one or more irregular characteristics. For instance, the plurality of peaks may have an irregular size, spacing, and/or shape. In some such cases, the plurality of peaks may be formed by undulations in the layer and/or its surface. Advantageously, the irregular structure may serve to increase the gamma of the filter media by, e.g., increasing the relative amount of the filter media per unit area. By way of example, a filter media comprising certain irregular peaks may have a larger surface area per unit area of filter media and/or a higher basis weight per unit area than certain conventional filter media. The filter media described herein may also have one or more desirable physical properties. For instance, the filter media may be relatively thin and/or have a relatively low stiffness. In some embodiments, the filter media may have a thinness and/or stiffness unachievable by other methods. Such lightweight, thin, and/or low stiffness media may be desirable for a wide variety of applications, including bag filters and face masks.

Some embodiments relate to methods of forming filter media comprising an irregular structure. As will be described in further detail below, one method of forming such filter media comprises depositing one or more layers onto a reversibly stretched layer and then allowing the reversibly stretched layer to at least partially recover. During recovery, the reversibly stretched layer may shorten along the direction in which it was stretched, possibly to its pre-stretched dimension. The recovering reversibly stretched layer may pull any layer(s) deposited thereon with it as it recovers. The recovery process may cause the filter media, and/or one or more portions thereof, to comprise an irregular structure, such as a plurality peaks having one or more irregular characteristics. Without wishing to be bound by any particular theory, it is believed that forming peaks in this manner may be particularly facile, and/or may cause peaks with a particularly desirable irregular morphology to form. However, it should also be understood that other methods of forming the structures described herein are also possible.

Figure 1:
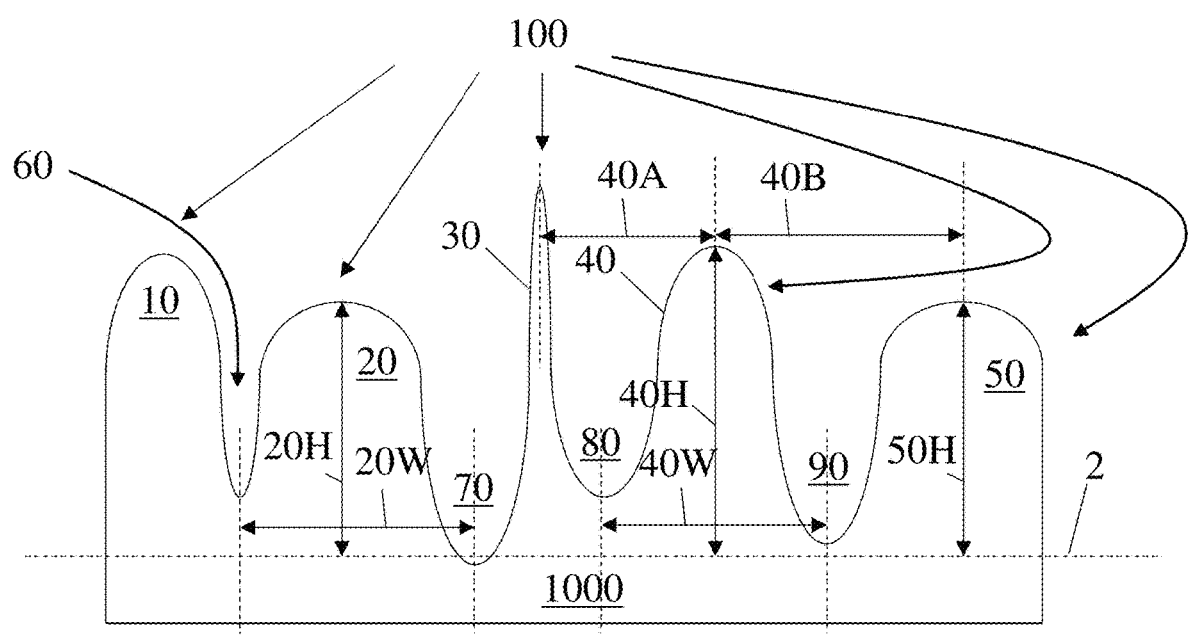
FIG. 1 is a schematic depiction of a filter media in accordance with some embodiments.

One non-limiting example of a filter media comprising an irregular structure is shown in FIG. 1. In FIG. 1, the irregular structure is present at least at the surface of the filter media; therefore, FIG. 1 shows a filter media comprising an irregular structure at the surface. The filter media 1000 shown in FIG. 1 comprises a plurality of peaks 100. The plurality of peaks 100 comprises peaks 10, 20, 30, 40, and 50 separated by troughs 60, 70, 80, and 90. Each peak has a height and a width. The peaks not on the outer edges of the filter media (i.e., peaks 20, 30, and 40) have two nearest neighbor spacings; those on the outer edges of the filter media (i.e., peaks 10 and 50) have one nearest neighbor spacing. By way of example, the peak 40 has a height 40H, a width 40W, and two nearest neighbor spacings 40A and 40B. These features of the peaks may be determined with the aid of a scanning optical microscope, such as a Keyence VR-3000G2, Measurement Unit Model VR3200 Wide-Area 3D Measurement system. The scanning optical microscope may be employed to measure the surface topography of the filter media according to the standard described in ISO 25178 (2006) at a resolution in each of the x- and y-axes of at least 25 microns and in the z-axis of at least 0.5 microns. This measurement yields a matrix of numerical values representing the measured surface height at a set of points on the sample, where the x- and y-positions of each measured surface height are given by the column and row, respectively, of the matrix. Then, a value of z of which 95% of the points making up the measured surface topography are above and 5% of the points making up the measured surface topography are below may be defined as a reference height (shown as dashed line 2 in FIG. 1). This reference height may be subtracted from the height of each point in the measured surface topography to yield a relative height of each point in the measured surface topography and a relative surface topography made up of the relative height values.

Figure 2:
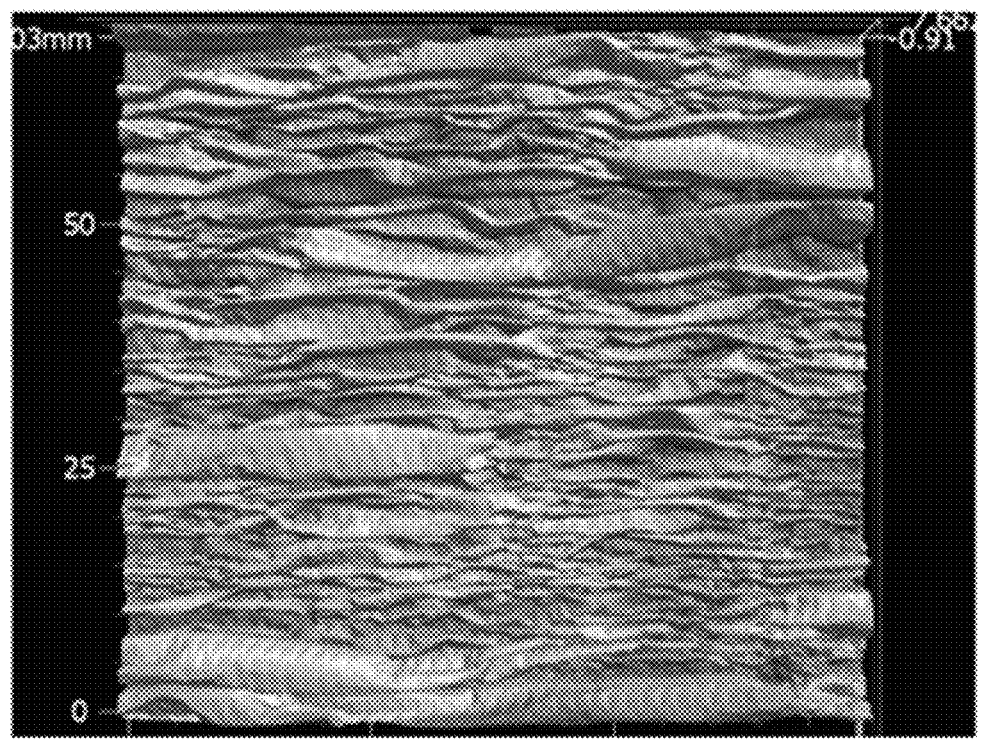
FIG. 2 is one example of a measured relative surface topography in accordance with some embodiments.
Figure 3:
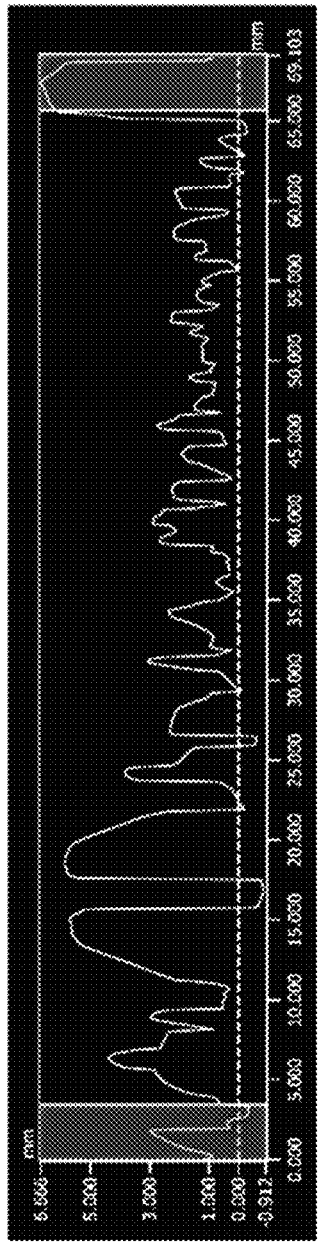
FIG. 3 is one example of a set of line data obtained during a measurement of relative surface topography in accordance with some embodiments.
Figure 4:
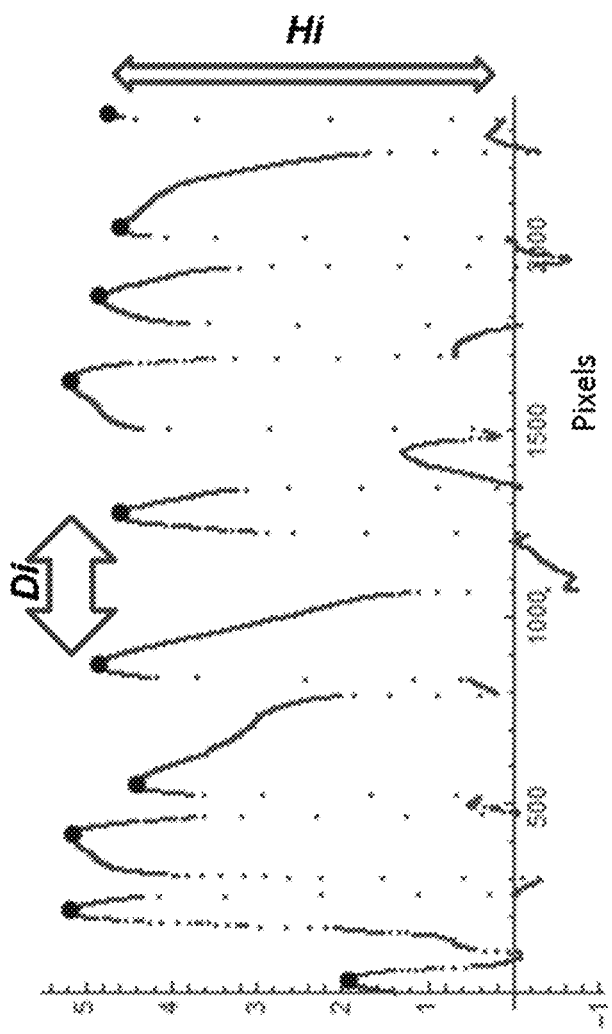
FIG. 4 is one example of a set of line data at which the local maxima have been identified (shown as larger points), and employed to determine a peak height (Hi) and a spacing between two adjacent peaks (Di)

The relative surface topography may then undergo further computational processing according to ISO 16610-21:2011 to determine the height of each peak. The computational process may include the following sequence of steps: (1) removal of the outer 10% of points from each edge to reduce edge effects; (2) application of a Gaussian filter with a kernel size of 30 pixels to smooth the resultant data; (3) conversion of the resultant data into a set of line data by selecting the $40^{th}$ row; and (4) identification of the local maxima. The local maxima identified in step (4) are the peak heights. The spacing between two peaks may be determined by finding the difference between the positions of the points at which these local maxima occur. FIG. 2 shows one example of a relative surface topography measured according to this procedure after step (2), and FIG. 3 shows one example of a set of line data measured according to this procedure after step (3). FIG. 4 shows one example of a set of line data at which the local maxima have been identified (shown as larger points), and employed to determine a peak height (Hi) and a spacing between two adjacent peaks (Di).

In some embodiments, like that shown in FIGS. 1-4, the peaks within the plurality of peaks may differ from each other in one or more ways. For instance, a plurality of peaks may comprise two or more peaks having differing heights, differing spacings from their nearest neighbor(s), and/or differing shapes. By way of example, with reference to FIG. 1, the height 40H of the peak 40 is different than the height 20H of the peak 20. As another example, the spacing 40A between the peaks 30 and 40 is different than the spacing 40B between the peaks 40 and 50. In some embodiments, a plurality of peaks comprises no two peaks that have the same height, no two sets of peaks that have the same spacing, and/or no two peaks that have the same width. For instance, the irregular structure and/or the filter media may not comprise a peak having the same height, spacing, and/or width as another peak.

In some embodiments, a plurality of peaks comprises two or more peaks that are similar in one or more ways. For instance, a plurality of peaks may comprise two peaks having the same height, two sets of peaks having the same spacing, and/or two peaks having the same width. By way of example, with reference to FIG. 1, the height 20H of the peak 20 has the same value as the height 50H of the peak 50. In some embodiments, a plurality of peaks comprises two or more peaks that are similar in one or more ways (e.g., that have the same height, same spacing to a nearest neighbor, and/or same width) and two or more peaks that are different in one or more ways (e.g., that have differing heights, differing spacings from their nearest neighbors, and/or differing widths). With reference again to FIG. 1, the plurality of peaks 100 comprises peaks 20 and 50 having heights 20H and 50H with the same value, and also comprises a peak 40 with a height 40H having a different value than 20H and 50H.

It should be understood that an irregular structure may be present at any location within the filter media, but need not be present at all locations. For instance, some filter media may, like the filter media shown in FIG. 1, comprise a first surface that has an irregular structure (e.g., plurality of peaks) and comprise a second surface opposite the first surface that is relatively regular (e.g., flat) in comparison or lacks an irregular structure (e.g., peaks) entirely. Some filter media may, unlike the filter media shown in FIG. 1, include two opposing surfaces, each of which comprises an irregular structure. For instance, some filter media may comprise two opposing surfaces, each of which comprises a plurality of peaks and/or each of which comprises a plurality of peaks that is irregular in one or more ways. In some embodiments, as will be described in more detail below, a filter media comprises a first surface comprising a first plurality of peaks irregular in one or more ways, and a second surface that comprises a second plurality of peaks similar to a plurality of troughs positioned between the peaks in the first plurality of peaks in all ways except for amplitude. The second plurality of peaks may have the same (or substantially similar) position, shape, spacing, and/or width of the plurality of troughs positioned between the peaks in the first plurality of peaks, but may have smaller heights.

Filter media described herein should be understood to comprise an irregular structure if one or more portions thereof (e.g., one or more layers therein, one or more surfaces thereof) comprises an irregular structure. The irregular structure (e.g., plurality of peaks) may be located at one or more surfaces of the filter media, in the interior of the filter media, and/or throughout the filter media. By way of example, a filter media comprising an irregular structure may comprise: a plurality of peaks irregular in one or more ways that is present at one or more surfaces of the filter media; a plurality of peaks that extends through one or more layers of the filter media; and/or a plurality of peaks that is present at one or more surfaces of a layer of the filter media.

It should also be understood that in embodiments in which the irregular structure is not present at an exterior surface of the filter media, the characteristics of the irregular structure may be measured by removing the portions of the filter media that obstruct the irregular structure from measurement and measuring the irregular structure as described above. For instance, in some embodiments, a filter media includes two opposing layers that lack an irregular structure, but comprises a layer positioned between the two opposing layers lacking an irregular structure that comprises an irregular structure (e.g., plurality of peaks irregular in one or more ways). For such filter media, a layer comprising one of the surfaces lacking the irregular structure may be removed so that the irregular structure is exposed, and features of interest of the exposed irregular structure may be measured by optical microscopy as described above.

Figure 5:
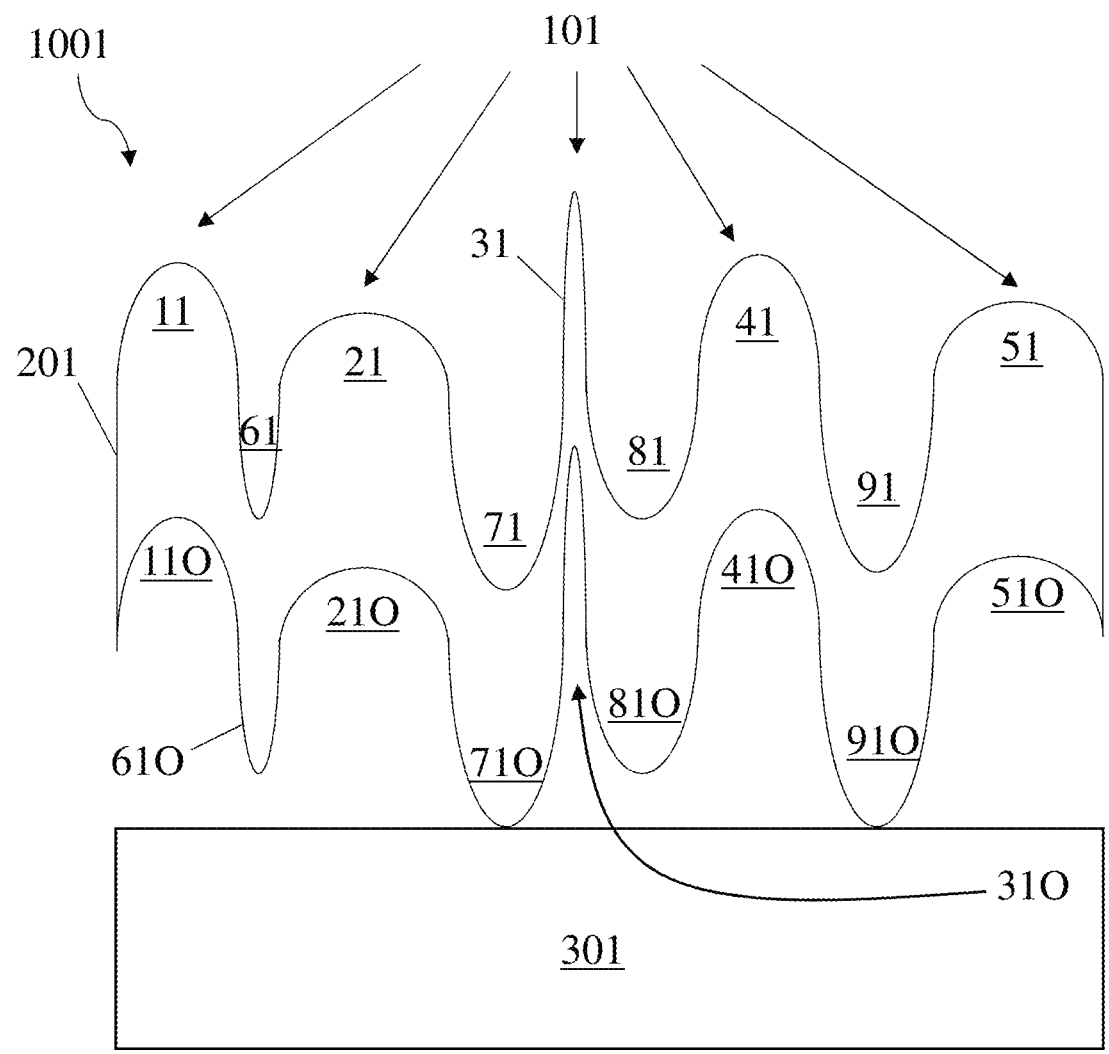
FIG. 5 is a schematic depiction of a filter media comprising two layers in accordance with some embodiments.

In some embodiments, a filter media comprises one or more layers. For instance, by way of reference to FIG. 1, a filter media 1000 may be a single layer filter media. As another example, also by way of reference to FIG. 1, filter media 1000 may be a filter media comprising two or more layers. FIG. 5 shows one non-limiting embodiment of a filter media 1001 comprising a first layer 201 and a second layer 301. In some embodiments, the filter media may comprise one or more layers comprising an irregular structure. The irregular structure may include an irregular spatial conformation of the layer. For instance, a layer, or portion thereof, may have a non-planar spatial conformation that has one or more irregular characteristics. In some embodiments, the full thickness of the layer, or the full thickness of a portion thereof, may be arranged into three-dimensional peaks and troughs. In such cases, each non-terminal peak is adjacent to a trough and each non-terminal trough is adjacent to a peak. In other words, a layer may have a structure such that each peak on a first side of the layer has a corresponding trough on the opposite side of the layer and each trough on the first side of the layer has a corresponding peak on the opposite side of the layer. A plurality of troughs may be similar in one or more ways to a plurality of peaks to which it corresponds and/or a plurality of peaks may be similar in one or more ways to a plurality of troughs to which it corresponds. For instance, a corresponding pair of troughs and peaks may be positioned in substantially the same location, may have substantially the same peak height, may have substantially the same peak width, may have substantially the same peak shape, and/or may have substantially the same nearest neighbor spacing(s). A layer that that is arranged such that its full thickness is arranged into three-dimensional peaks and troughs may be referred to as a layer comprising a plurality of peaks that extends through the full thickness of the layer and/or as an undulated layer.

One example of an undulated layer is the layer 201 in FIG. 5. The layer 201 in FIG. 5 comprises a plurality of peaks 101 comprising peaks 11, 21, 31, 41, and 51 separated by troughs 61, 71, 81, and 91. The troughs 61, 71, 81, and 91 together form a plurality of troughs 101T (not shown). These peaks and troughs are present at the upper side of the layer 201 (and of the filter media 301). The plurality of peaks 101 has a corresponding plurality of troughs 101O (not shown) comprising troughs 11O, 21O, 31O, 41O, and 51O on the bottom side of the layer 201 and the plurality of troughs 101T (not shown) has a corresponding plurality of peaks 101TO (not shown) comprising peaks 61O, 71O, 81O, and 91O. In some embodiments, when viewed in cross-section, the outline of the top surface of an undulated layer (e.g., layer 201) may be substantially the same as the outline of the bottom surface of the undulated layer.

In some embodiments, an undulated layer has a structure indicative of a layer that was not undulated at some point in time and that underwent a process in which it was undulated. Layers that are undulated may comprise portions that are in tension (e.g., upper surfaces of peaks, lower surfaces of troughs positioned between peaks) and/or portions that are in compression (e.g., lower surfaces of peaks, upper surfaces of troughs positioned between peaks). Layers may be undulated by a variety of suitable processes, such as folding, crinkling, gathering, and the like. In some embodiments, thermal shrinkage may be performed to undulate one or more layers. For instance, one or more layers may be disposed on a layer with high thermal shrinkage, and the layer with high thermal shrinkage may be heated, causing it to shrink and causing the one or more layers disposed thereon to become undulated.

In some embodiments, a filter media comprises a layer that does not include an irregular structure. The layer not including the irregular structure may not include any peaks (e.g., it may be relatively flat), or it may include a plurality of peaks that is regular. For instance, like that shown in FIG. 5, a filter media may comprise one layer including an irregular structure (e.g. plurality of peaks) and one layer that does not include an irregular structure (e.g., peaks). For example, filter media 1001 shown in FIG. 5 comprises a layer 201 that includes a plurality of peaks (e.g., 11, 21, 31, 41, and 51) and also comprises a layer 301 that does not include any peaks. In embodiments in which a layer, such as a layer 201, includes a plurality of peaks, the peaks may have one or more irregular characteristics as described herein. In some embodiments, a filter media comprises two or more layers comprising an irregular structure (e.g., two or more layers comprising pluralities of peaks irregular in one or more ways) and two or more layers that do not include an irregular structure (e.g., two or more layers lacking peaks or comprising a plurality of peaks with a regular structure). For such embodiments, the layers may be arranged with respect to each other in a variety of suitable manners. For example, two layers that each comprise a plurality of peaks irregular in one or more ways are positioned on opposite sides of a layer that lacks a plurality of peaks irregular in one or more ways. A filter media with this structure may be fabricated by gathering two layers on opposite sides of a reversibly stretchable layer. As another example, two layers that each lack a plurality of peaks irregular in one or more ways may be positioned on opposite sides of a layer comprising a plurality of peaks irregular in one or more ways. For instance, one or more layers comprising a plurality of peaks may be positioned between two outer layers that lack peaks entirely and/or are relatively flat. In some embodiments, a filter media exclusively comprises layers comprising pluralities of peaks irregular in one or more ways.

Figure 6:
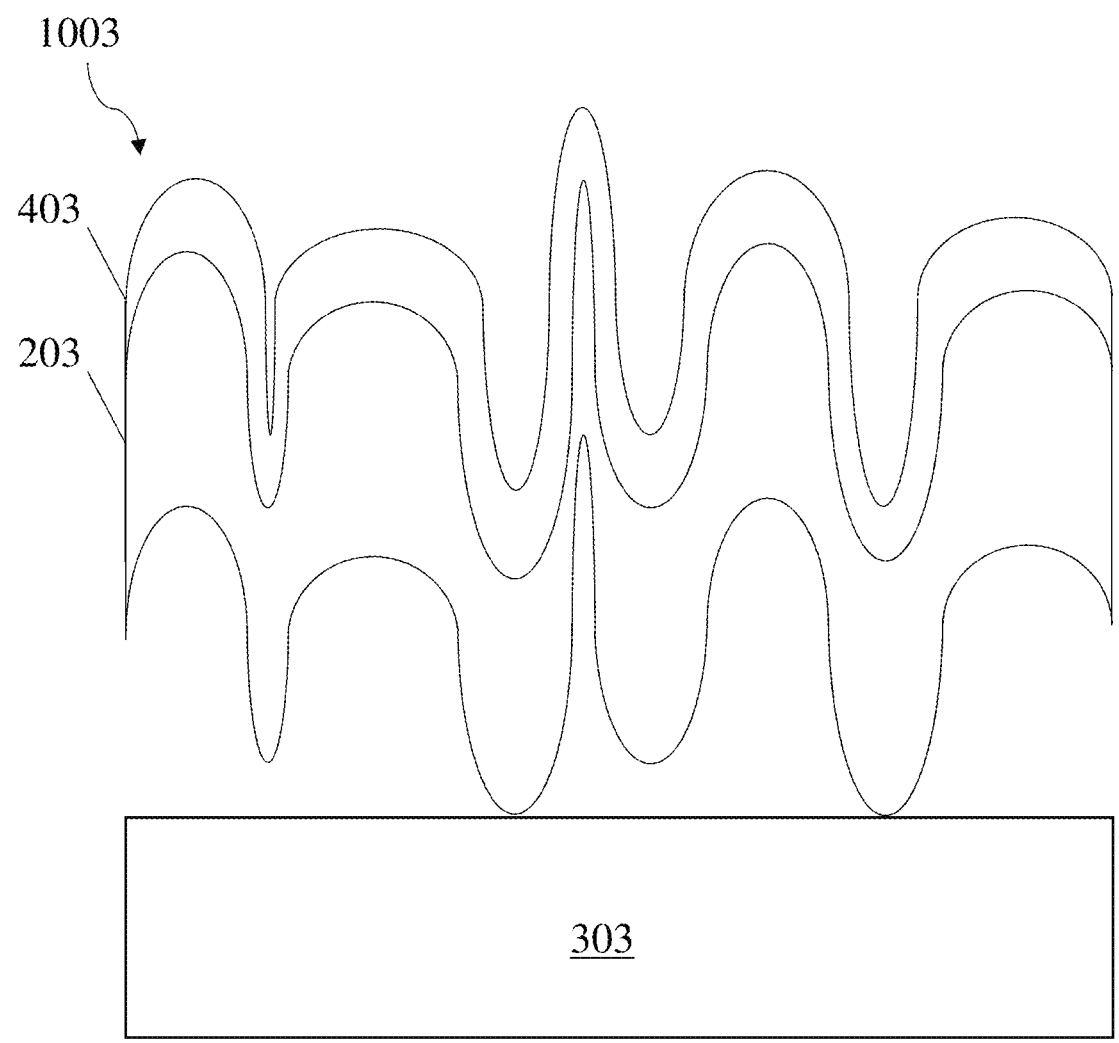
FIG. 6 is a schematic depiction of a filter media comprising three layers in accordance with some embodiments.

Some filter media, like that shown in FIG. 5, include a single layer that comprises a plurality of peaks. Some filter media include two or more layers that each comprise a plurality of peaks. FIG. 6 shows one non-limiting embodiment of a filter media comprising two layers that each comprise pluralities of peaks. In FIG. 6, a filter media 1003 comprises a first layer 203, a second layer 303, and a third layer 403. The first layer 203 and the third layer 403 each comprise two opposing surfaces. In both the first layer 203 and the third layer 403, the first surface comprises a plurality of peaks separated by a plurality of troughs. The surface opposing the first surface in each of these layers comprises a plurality of troughs corresponding to the peaks present in the first surface of the layer and a plurality of peaks corresponding to the troughs present in the first surface of the layer.

In some embodiments, a filter media comprises two or more layers that are undulated together. For instance, in FIG. 6, the first layer and the third layer are also both undulated layers that are undulated together. In other words, both the first layer and the third layer are undulated, and the first layer comprises a first plurality of peaks that is substantially similar to a second plurality of peaks present in the third layer. With reference to FIG. 6, the plurality of peaks present in the upper surface of the layer 203 is substantially similar to the plurality of peaks present in the upper surface of the layer 403. In some cases in which a first layer and a third layer are undulated together, the plurality of peaks and troughs in the first layer is substantially the same as the third layer. In some embodiments, a filter media comprises two or more layers that are undulated, but which are not undulated together. For instance, a filter media may comprise two layers that are undulated on opposite sides of a layer that is not undulated. As another example, a filter media may comprise a first layer and a second layer that are both undulated and comprise undulations substantially similar in position, but for which the undulations have a substantially different amplitude (e.g., substantially different average peak heights). Some filter media may comprise some layers that are undulated together and some layers that are undulated separately.

A variety of suitable types of layers may be included in the filter media described herein, such as efficiency layers, scrims, nanofiber layers, carrier layers, and support layers. Some filter media include at most one of any type of layer (e.g., a filter media including one scrim and one efficiency layer; a filter media including one scrim, one efficiency layer, and one nanofiber layer; a filter media including one scrim, one efficiency layer, one nanofiber layer, and one carrier layer). Some filter media include two or more layers of a single kind (e.g., a filter media comprising one scrim and two efficiency layers; a filter media comprising one scrim, two efficiency layers, and one nanofiber layer). It should be understood that references to a first layer, a second layer, a third layer, and the like may refer to any type of layer and that the layers described herein may be combined with each other in a variety of different combinations and in a variety of different orders. It should also be understood that references to a non-woven fiber web may refer to any type of non-woven fiber web layer, such as an efficiency layer that is a non-woven fiber web, a nanofiber layer that is a non-woven fiber web, a scrim that is a non-woven fiber web, a carrier layer that is a non-woven fiber web, and/or a support layer that is a non-woven fiber web. The properties of different types of layers that may be included in the filter media are described in further detail below.

Figure 7A:
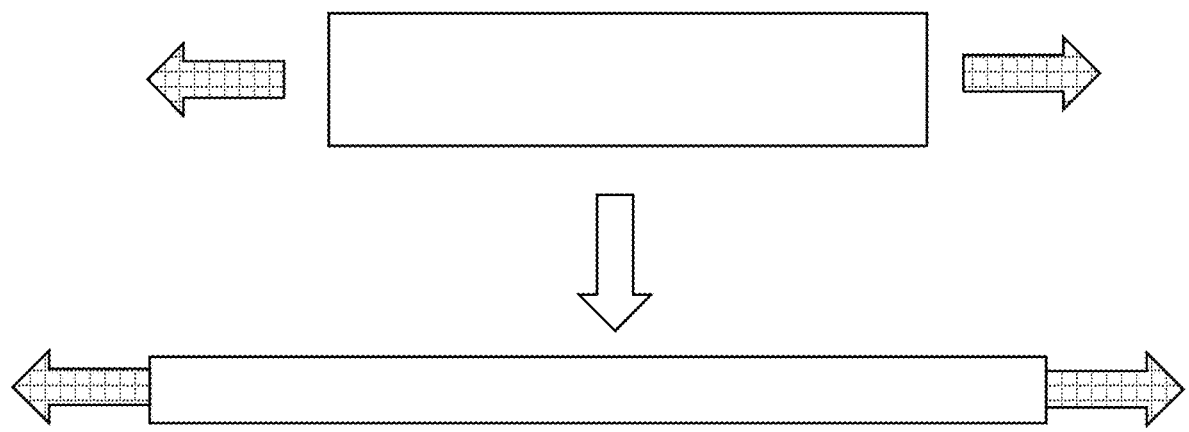
FIGS. 7A-7C are a schematic depiction of a method of fabricating a filter media in accordance with some embodiments.
Figure 7B:
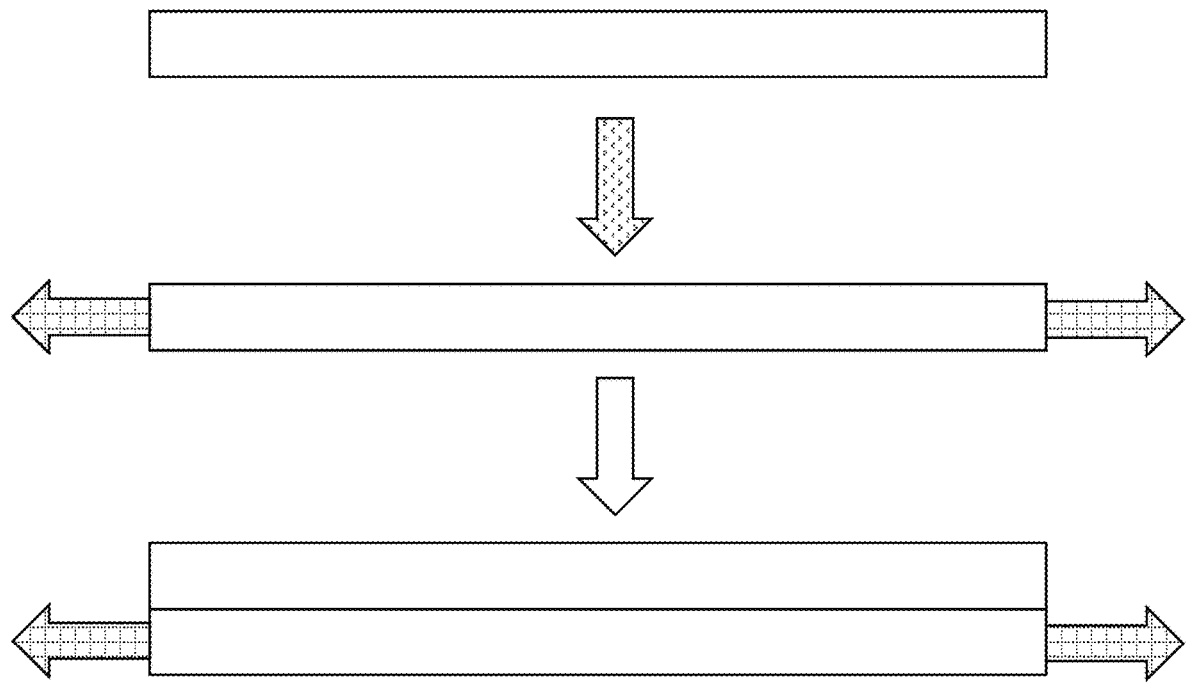
Figure 7C:
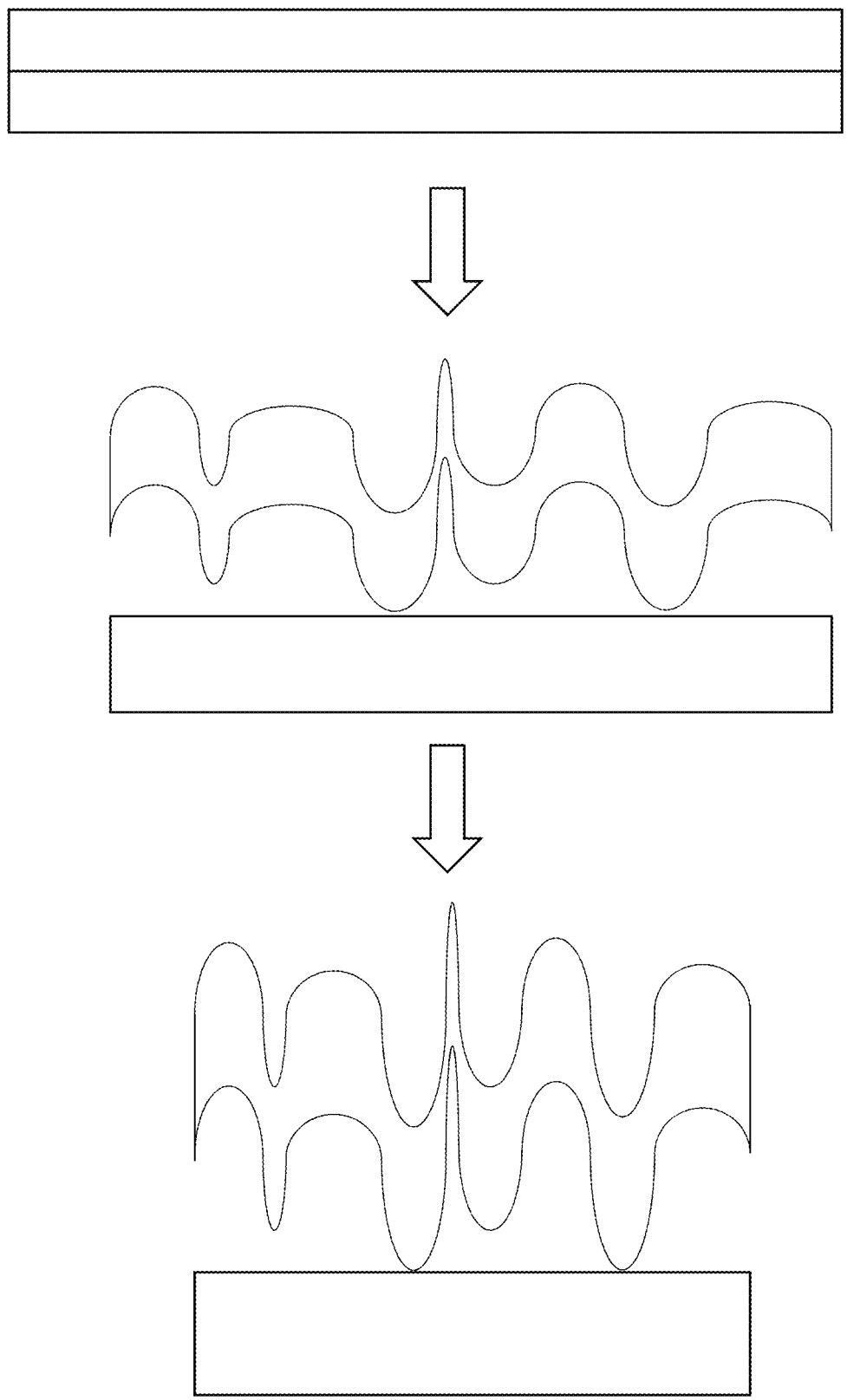

The filter media described herein may be manufactured in a variety of suitable manners. One method of manufacturing filter media that may be particularly advantageous is shown in FIGS. 7A-7C. In this method, a layer with relatively low stiffness is gathered to form a layer that is undulated using a layer capable of undergoing a reversible stretch. The layer capable of undergoing a reversible stretch is stretched, and the layer with the relatively low stiffness is deposited onto the layer capable of undergoing a reversible stretch when in the stretched state (i.e., when it is in the form of a reversibly stretched layer). Then, when the reversibly stretched layer recovers, it pulls the layer with the relatively low stiffness back with it, gathering the layer with the relatively low stiffness. The reversibly stretched layer may recover fully (i.e., to its initial dimensions prior to being stretched) or partially (i.e., to dimensions between its initial dimensions prior to being stretched and its dimensions when in the stretched state). In other words, a layer capable of undergoing a reversible stretch may be stretched in a manner that is entirely reversible or in a manner that is partially reversible and partially irreversible. FIG. 7A shows a possible first step of reversibly stretching a layer capable of undergoing a reversible stretch, such as a scrim, to a stretched state. FIG. 7B shows a possible second step of depositing a layer, such as an efficiency layer, onto the reversibly stretched layer. FIG. 7C shows the recovery of the reversibly stretched layer. During the recovery process, the layer with the relatively low stiffness gathers and forms a plurality of peaks that are irregular in height, spacing, width, and/or shape.

In general, any suitable number of layers may be undulated (e.g., by gathering) using a layer capable of undergoing a reversible stretch. In some embodiments, not shown in FIGS. 7A-7C, one or more further layers may be deposited onto the reversibly stretched layer after deposition of a layer with relatively low stiffness thereon. In some embodiments, one or more further layers may be deposited onto the reversibly stretched layer together with a layer having a relatively low stiffness. The further layer or layers may be deposited prior to recovery of the reversibly stretched layer. For instance, a second efficiency layer may be deposited onto a first efficiency layer deposited on a reversibly stretched scrim, a nanofiber layer may be deposited onto an efficiency layer deposited on a reversibly stretched scrim, or two efficiency layers may be deposited together onto a reversibly stretched scrim. Then, as shown in FIG. 7C, the reversibly stretched layer may be allowed to recover. Layers deposited on the reversibly stretched layer (e.g., on the layer with the relatively low stiffness and/or together with the layer with the relatively low stiffness) may become undulated (e.g., by gathering) during this step. In some embodiments, like the embodiment shown in FIG. 6, the layers may undulated and/or gathered together. The further layer or layers deposited onto the reversibly stretched layer in addition to the layer with the relatively low stiffness may also have a relatively low stiffness, which may promote this advantageous gathering. In some embodiments, one or more further layers may be deposited onto the reversibly stretched layer after recovery of the reversibly stretched layer.

In some embodiments, like the embodiment shown in FIGS. 7A-7C, a layer to be gathered is deposited directly onto a reversibly stretched layer and the resultant gathered layer and recovered layer are directly adjacent. As used herein, when a layer is referred to as being "on" or "adjacent" another layer, it can be directly on or adjacent the layer, or an intervening layer or material also may be present. A layer that is "directly on", "directly adjacent" or "in contact with" another layer means that no intervening layer or material is present.

In some embodiments, a layer to be gathered is deposited onto a layer or material deposited onto the reversibly stretched layer, and the resultant gathered layer and recovered layer are adjacent but not directly adjacent. For example, a layer to be gathered may be deposited on an adhesive deposited on the reversibly stretched layer, such that the adhesive is positioned between the resultant gathered layer and recovered layer. In some embodiments in which an adhesive is positioned between the layer to be gathered and the reversibly stretched layer, the adhesive may be deposited onto the reversibly stretched layer prior to stretching and/or after stretching. For example, an adhesive may be deposited onto a scrim, the scrim may be stretched, and then an efficiency layer may be deposited onto the stretched scrim. In this case, the adhesive is stretched along with the scrim along the direction that the scrim is stretched. The efficiency layer may bond less well to the scrim along the direction the scrim is stretched, and so may detach from the scrim at certain positions along the opposite direction when the scrim is allowed to recover. In such cases, the efficiency layer may be gathered, and the scrim may comprise undulations (or be undulated) that follow the undulations in the efficiency layer. The undulations in the scrim may be much smaller than those in the efficiency layer (i.e., they may have a much smaller average peak height), and so the scrim may be considered to be relatively, but not perfectly, flat in comparison to the efficiency layer.

When a reversibly stretched layer is stretched, the direction of stretch may generally be selected as desired. In some embodiments, a reversibly stretched layer may be stretched in a machine direction. In some embodiments, a reversibly stretched layer may be stretched in a cross direction. When stretched, the reversibly stretched layer may be stretched to a variety of suitable lengths. The reversibly stretched layer may be stretched to a length of greater than or equal to 50%, greater than or equal to 75%, greater than or equal to 100%, greater than or equal to 125%, greater than or equal to 150%, greater than or equal to 175%, greater than or equal to 200%, greater than or equal to 225%, greater than or equal to 250%, greater than or equal to 275%, greater than or equal to 300%, greater than or equal to 325%, greater than or equal to 350%, greater than or equal to 375%, greater than or equal to 400%, greater than or equal to 450%, greater than or equal to 500%, greater than or equal to 600%, or greater than or equal to 800% of its initial length. In some embodiments, the reversibly stretched layer is stretched to a length of less than or equal to 1000%, less than or equal to 800%, less than or equal to 600%, less than or equal to 500%, less than or equal to 450%, less than or equal to 400%, less than or equal to 375%, less than or equal to 350%, less than or equal to 325%, less than or equal to 300%, less than or equal to 275%, less than or equal to 250%, less than or equal to 225%, less than or equal to 200%, less than or equal to 175%, less than or equal to 150%, less than or equal to 125%, less than or equal to 100%, or less than or equal to 75% of its initial length. Combinations of the above-referenced ranges are also possible (e.g., greater than or equal to 50% and less than or equal to 1000%, greater than or equal to 100% and less than or equal to 400%, or greater than or equal to 200% and less than or equal to 300%). Other ranges are also possible.

Layer(s) deposited on a reversibly stretched layer in a reversibly stretched state may recover with the reversibly stretched layer to a recovered length, undergoing a reduction in length. The reduction in length may be equivalent to the corresponding reduction in length experienced by the reversibly stretched layer upon recovery. When the reversibly stretched layer exhibits substantially complete recovery, the reduction in length of the layer(s) may fall within one or more ranges that may be derived from the ranges above by the following formula: Percent reduction in length=(1−100/(100+percent stretch))*100%.

For instance, a layer deposited on a reversibly stretched layer stretched to 50% of its initial length that fully recovers would have a corresponding reduction in length of 33% of its initial length. As another example, a layer deposited on a reversibly stretched layer stretched to 1000% of its initial length that fully recovers would have a corresponding reduction in length of 91% of its initial length.

Figure 8:
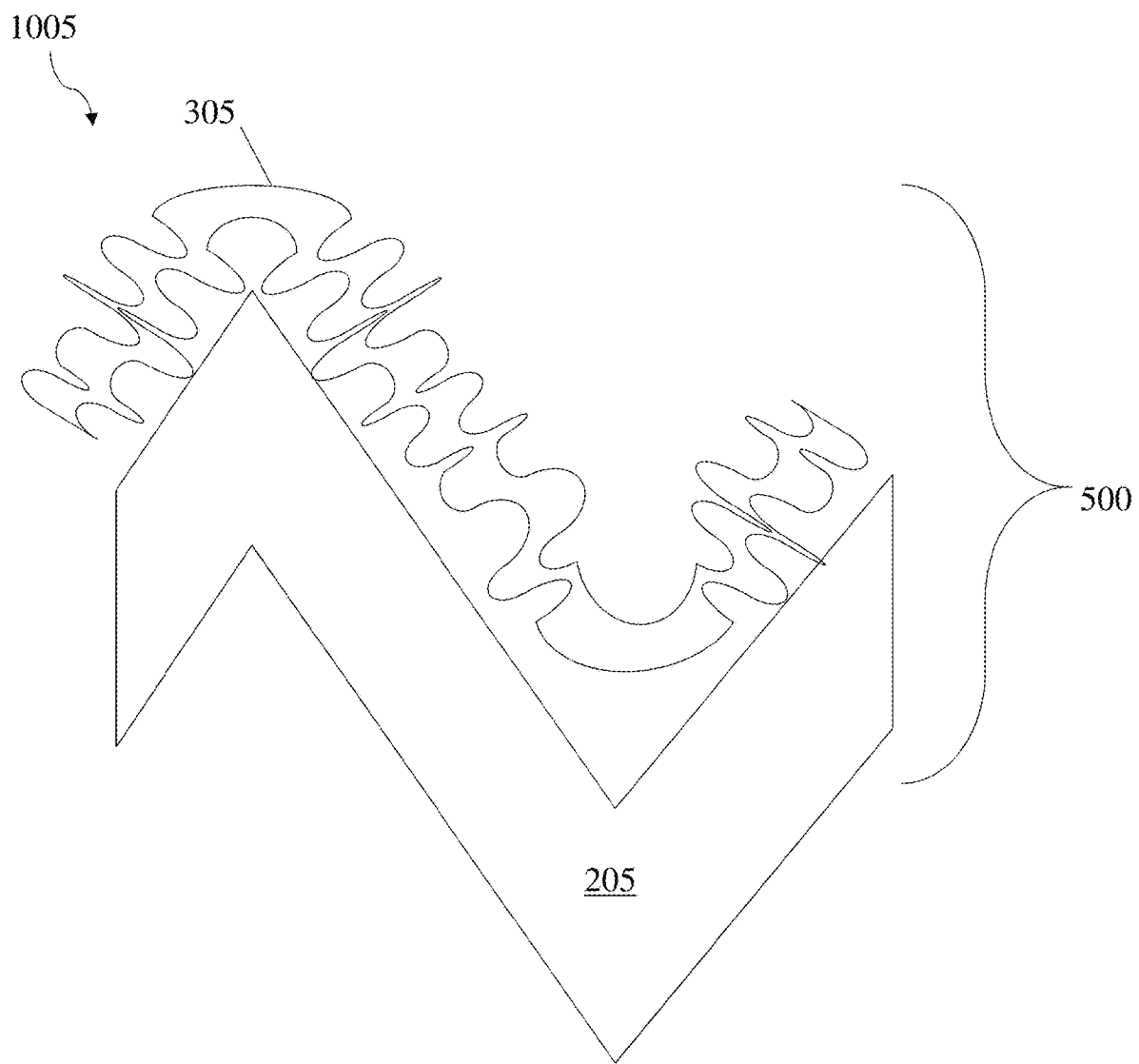
FIG. 8 is a schematic depiction of a filter media comprising two layers in accordance with some embodiments.

In some embodiments, a filter media comprising an irregular structure may further comprise one or more additional structures. The additional structure may include peaks, troughs, undulations, and/or other features. The additional structure or structures may be regular (e.g., a plurality of regular peaks) or irregular (e.g., a plurality of peaks irregular in one or more ways). In general, the additional structure, whether regular or irregular, may be on a different length scale than the irregular structure. For instance, an additional structure may comprise one or more features (e.g., peaks, troughs) with a size greater in magnitude than a feature (e.g., a peak, a trough) of the irregular structure. A non-limiting example of a filter media including an irregular structure and an additional structure is shown in FIG. 8. As illustrated in FIG. 8, a filter media 1005 may include both an irregular structure and an additional structure 500. The irregular structure may be present on an external surface of the filter media, in the interior of the filter media, and/or throughout the filter media. In some instances, as illustrated in FIG. 8, the irregular structure may be present on an external surface of the filter media and/or extend through the full thickness of one or more layers of the filter media. In some cases, an undulated layer in the filter media, such as the undulated layer 305 in FIG. 8, may comprise an irregular structure as described herein. As for the irregular structure, the presence of an additional structure comprising regular and/or irregular undulations (e.g., a plurality of peaks) may increase the relative amount of the filter media per unit area, which may desirably increase the gamma of the filter media.

In some embodiments, one or more layers in a filter media may comprise both an irregular structure and an additional structure. By way of example, in some embodiments, a filter media comprises a layer comprising a plurality of peaks irregular in one or more ways and comprising an additional structure. The plurality of peaks irregular in one or more ways typically, but not always, has a length scale smaller than the additional structure. In some embodiments, one or more layers in a filter media are undulated on two length scales. For instance, a layer in a filter media may be undulated in an irregular manner and then further undulated on a larger length scale to form the additional structure. The plurality of peaks making up the irregular undulations may, at least partially, have a different orientation than the undulations forming the additional structure and/or a different average peak height than the undulations forming the additional structure.

In some embodiments, the additional structure or structures are formed by an additional step (e.g., pleating, waving) that imparts the additional structure to the filter media. For instance, a filter media comprising an irregular structure including a plurality of peaks may be pleated to impart regular peaks to the filter media. The peak heights, peak spacing, and/or peak size of the pleats may be significantly larger than the same features of the irregular structure. In some such cases, the pleating may serve to impart a relatively macroscale structure to the filter media as a whole while the irregular structure imparts a relatively microscale structure to the filter media. In some embodiments, the additional structure may be relatively macroscale in comparison to the irregular structure and may be formed by subjecting a filter media, such as filter media 1001 in FIG. 1, to a process that forms undulations, such as pleating and/or waving, to form a filter media including an irregular structure and an additional structure, such as filter media 1005.

A variety of techniques may be employed to form an additional structure in a layer comprising an irregular structure. Some such techniques comprise undulating a layer comprising a first plurality of peaks making up the irregular structure, such as a layer comprising a plurality of peaks irregular in one or more ways, to form a second plurality of peaks making up the additional structure. By way of example, the layer comprising the first plurality of peaks, and any other layers undulated together with the layer comprising the plurality of peaks, may be pleated and/or waved. Pleating, and/or waving the layer(s) may result in the formation of a second plurality of peaks that is relatively regular. As another example, the layer comprising the first plurality of peaks, and any other layers undulated together with the layer comprising the plurality of peaks, may undergo one or more of the processes described above to form a second plurality of peaks irregular in one or more ways. In other words, the additional structure may be an irregular structure and/or may be formed by one of the methods employed to form the first plurality of peaks. For instance, the layer comprising the first plurality of peaks, and any other layers undulated together with the layer comprising the first plurality of peaks, may be folded, crinkled, gathered, and/or disposed on a layer that undergoes thermal shrinkage.

Figure 9A:
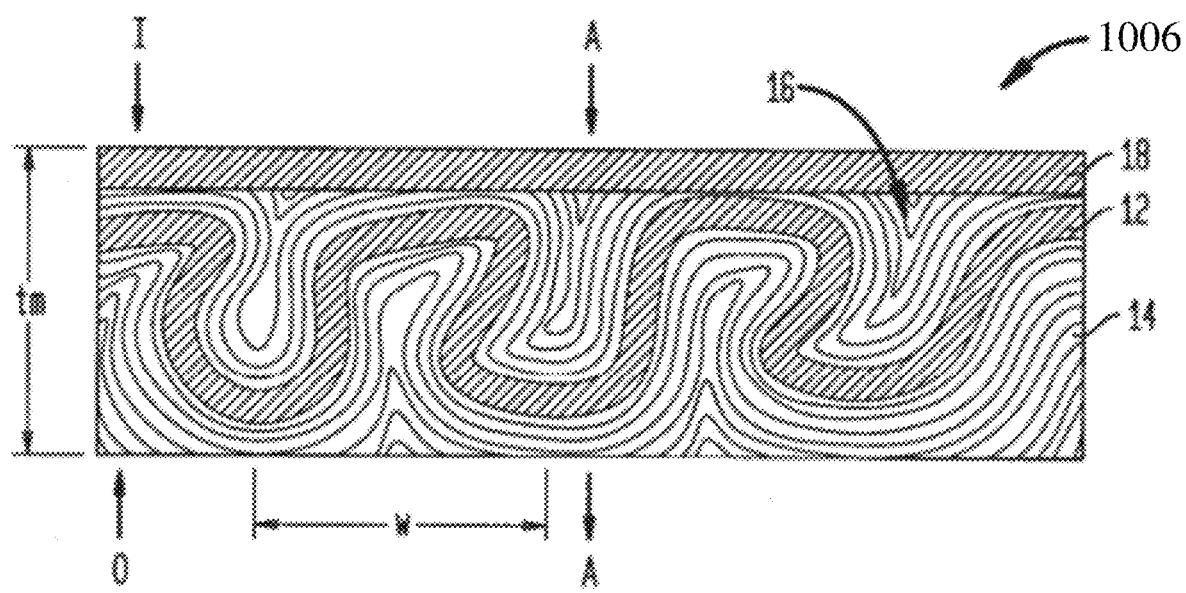
FIGS. 9A-9C are schematic depictions of a waved filter media according to some embodiments.

In some embodiments, a filter media comprising one or more layers comprising an undulated layer further comprises one or more additional support layers (e.g., one or more fibrous support layers) that hold the one or more undulated layers in the undulated configuration. The support layer(s) may lack a plurality of irregular peaks and/or may be relatively flat prior to undulation. FIG. 9A illustrates one exemplary embodiment of a filter media in which a layer is undulated by waving and held in the waved configuration by two support layers. FIG. 9A depicts a filter media 1006 having at least one waved layer and at least one support layer that holds the waved layer in a waved configuration to maintain separation of peaks and troughs of adjacent waves of the waved layer. In the illustrated embodiment, the filter media 1006 includes an efficiency layer 12, a first, downstream support layer 14, and a second, upstream support layer 16 disposed on opposite sides of the efficiency layer 12. Although not shown, the efficiency layer 12 may comprise an irregular structure, such as a plurality of peaks irregular in one or more ways. The first and second support layers 14 and 16 may lack a plurality of peaks prior to waving with the efficiency layer 12. The support layers 14, 16 can help maintain the efficiency layer 12, and optionally any additional layers described elsewhere herein, in the waved configuration. The additional layers may have one or more structural features described elsewhere herein with respect to the layer comprising the plurality of peaks irregular in one or more ways. For instance, each additional layer may or may not, independently: comprise a plurality of peaks, be an undulated layer prior to waving, be a gathered layer prior to waving, be undulated with one or more other layers, and/or be gathered with one or more other layers.

With further reference to FIG. 9A, in some embodiments, a scrim is positioned between the support layer 14 and the efficiency layer 12 and/or between the support layer 16 and the efficiency layer 12. In some embodiments a nanofiber layer is positioned between the support layer 14 and the efficiency layer 12 and/or between the support layer 16 and the efficiency layer 12. While two support layers 14, 16 are shown, the filter media 10 need not include both support layers. Where only one support layer is provided, the support layer can be disposed upstream or downstream of the filtration layer(s).

The filter media 1006 can also optionally include one or more outer or cover layers located on the upstream-most and/or downstream-most sides of the filter media 1006. FIG. 9A illustrates a top layer 18 disposed on the upstream side of the filter media 1006 to function, for example, as an upstream dust holding layer. The top layer 18 can also function as an aesthetic layer. The layers in the illustrated embodiment are arranged so that the top layer 18 is disposed on the air entering side, labeled I, the second support layer 16 is just downstream of the top layer 18, the efficiency layer 12 is disposed just downstream of the second support layer 16, and the first support layer 14 is disposed downstream of the efficiency layer 12 on the air outflow side, labeled O. The direction of air flow, i.e., from air entering I to air outflow O, is indicated by the arrows marked with reference A.

Figure 9B:
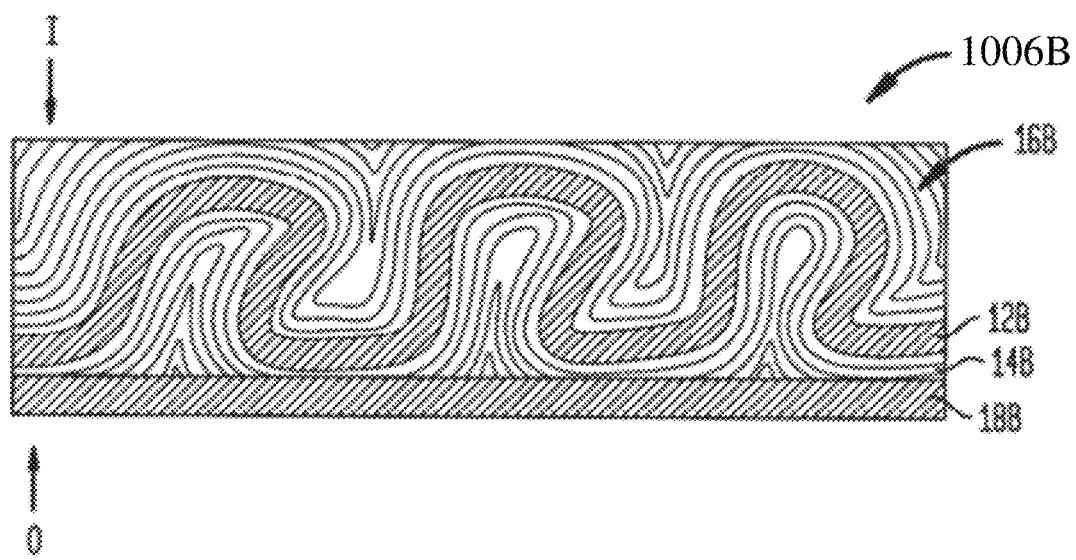

The outer or cover layer can alternatively or additionally be a bottom layer disposed on the downstream side of the filter media 1006 to function as a strengthening component that provides structural integrity to the filter media 1006 to help maintain the waved configuration. The outer or cover layer(s) can also function to offer abrasion resistance. FIG. 9B illustrates another embodiment of a filter media 1006B that is similar to filter media 1006 of FIG. 9A. In this embodiment, the filter media 1006B does not include a top layer, but rather has an efficiency layer 12B, a first support layer 14B disposed just downstream of the efficiency layer 12B, a second support layer 16B disposed just upstream of the efficiency layer 12B on the air entering side I, and a bottom layer 18B disposed just downstream of the first support layer 14B on the air exiting side O. Further layers may be positioned between the efficiency layer and the support layers shown in FIG. 9B, such as scrim layer(s) and/or nanofiber layer(s). Furthermore, as shown in the exemplary embodiments of FIGS. 9A and 9B, the outer or cover layer(s) can have a topography different from the topographies of the efficiency layer and/or any support layers. For example, in either a pleated or non-pleated configuration, the outer or cover layer(s) may be non-waved (e.g., substantially planar, lacking undulations, and/or lacking a plurality of peaks irregular in one or more ways), whereas the efficiency layer, any support layers, and/or any layer(s) positioned between the efficiency layer and the support layer(s) may have a waved configuration. A person skilled in the art will appreciate that a variety of other configurations are possible, and that the filter media can include any number of layers in various arrangements.

It should be understood that while some embodiments relate to waved filter media, like those shown in FIGS. 9A and 9B, some filter media that are not waved may have one or more of the features shown in FIGS. 9A and/or 9B. By way of example, a layer comprising a first plurality of peaks, such as a layer comprising a plurality of peaks irregular in one or more ways, may be further undulated to form a second plurality of peaks by a method other than waving and may be positioned in a filter media comprising one or more support layers and/or one or more outer or cover layers. The method other than waving may be any of those described herein, such as pleating, folding, crinkling, gathering, and/or thermal shrinking.

Filter media comprising an irregular structure and an additional structure, such as filter media comprising one or more layers, may be manufactured in a variety of suitable manners. In an exemplary embodiment the layer(s) are waved (e.g., layer(s) comprising a plurality of peaks irregular in one or more ways, efficiency layer(s), scrim(s), nanofiber layer(s), and/or support layer(s)). The layer(s) to be waved may be positioned adjacent to one another in a desired arrangement from air entering side to air outflow side, and the combined layers may be conveyed between first and second moving surfaces that are traveling at different speeds, such as with the second surface traveling at a speed that is slower than the speed of the first surface. A suction force, such as a vacuum force, can be used to pull the layers toward the first moving surface, and then toward the second moving surface as the layers travel from the first to the second moving surfaces. The speed difference may cause the layers to form z-direction waves as they pass onto the second moving surface, thus forming peaks and troughs in the layers. The speed of each surface can be altered to obtain the desired number of waves per inch. The distance between the surfaces can also be altered to determine the amplitude of the peaks and troughs, and in an exemplary embodiment the distance is adjusted between 0.025 inches to 4 inches. For example, the amplitude of the peaks and waves may be between 0.1 inch and 4.0 inches, e.g., between 0.1 inch and 1.0 inch, between 0.1 inch and 2.0 inches, or between 3.0 inches and 4.0 inches. For certain applications, the amplitude of the peaks and waves may be between 0.1 inch and 1.0 inch, between 0.1 inch and 0.5 inches, or between 0.1 inch and 0.3 inches. The properties of the different layers can also be altered to obtain a desired filter media configuration. In an exemplary embodiment the filter media has 2 to 6 waves per inch, with a height (overall thickness) in the range of between 0.025 inches and 2 inches, however this can vary significantly depending on the intended application. For instance, in other embodiments, the filter media may have 2 to 4 waves per inch, e.g., 3 waves per inch. The overall thickness of the media may be between 0.025 inches and 4.0 inches, e.g., between 0.1 inch and 1.0 inch, between 0.1 inch and 2.0 inches, or between 3.0 inches and 4.0 inches. For certain applications, the overall thickness of the media may be between 0.1 inch and 0.5 inches, or between 0.1 inch and 0.3 inches. As shown in FIG. 9A, in some embodiments, a single wave W extends from the middle of one peak to the middle of an adjacent peak. Thickness of the waved filter media can be determined according to the Edana WSP 120.1 Standard (2005) with a pressure foot selected to have a 2 ounce load and a 1 square inch area.

Figure 9C:
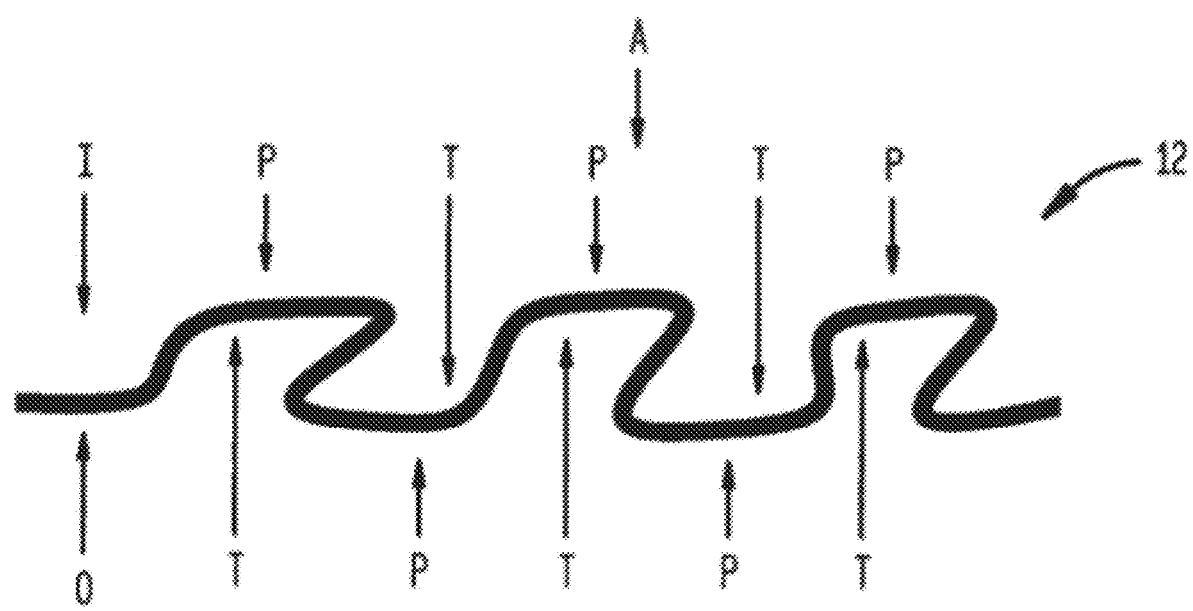

In the embodiment shown in FIG. 9A, when the efficiency layer 12 and the support layers 14, 16 are waved, the resulting efficiency layer 12 will have a plurality of peaks P and troughs T on each surface thereof (i.e., air entering side I and air outflow side O), as shown in FIG. 9C. The support layers 14, 16 will extend across the peaks P and into the troughs T so that the support layers 14, 16 also have waved configurations. A person skilled in the art will appreciate that a peak P on the air entering side I of the efficiency layer 12 will have a corresponding trough T on the air outflow side O. Thus, the downstream support layer 14 will extend into a trough T, and exactly opposite that same trough T is a peak P, across which the upstream support layer 16 will extend. Since the downstream support layer 14 extends into the troughs T on the air outflow side O of the efficiency layer 12, the downstream coarse layer 14 will maintain adjacent peaks P on the air outflow side O at a distance apart from one another and will maintain adjacent troughs T on the air outflow side O at a distance apart from one another. The upstream support layer 16, if provided, can likewise maintain adjacent peaks P on the air entering side I of the efficiency layer 12 at a distance apart from one another and can maintain adjacent troughs T on the air entry side I of the efficiency layer 12 at a distance apart from one another. As a result, the efficiency layer 12 has a surface area that is significantly increased, as compared to a surface area of the fiber filtration layer in the planar configuration. In certain exemplary embodiments, the surface area in the waved configuration is increased by at least 50%, and in some instances as much as 120%, as compared to the surface area of the same layer in a planar configuration. In other words, the waved configuration may comprise at least 50% more, or at least 120% more, of filter media area per footprint of the filter media than an otherwise equivalent unwaved filter media.

In embodiments in which the upstream and/or downstream support layers hold the one or more other layers in a waved configuration, it may be desirable to reduce the amount of free volume (e.g., volume that is unoccupied by any fibers) in the troughs. That is, a relatively high percentage of the volume in the troughs may be occupied by the support layer(s) to give the other layer(s) structural support. For example, at least 95% or substantially all of the available volume in the troughs may be filled with the support layer. The support layer may have a solidity of greater than or equal to 1%, greater than or equal to 1.25%, greater than or equal to 1.5%, greater than or equal to 2%, greater than or equal to 2.5%, greater than or equal to 3%, greater than or equal to 4%, greater than or equal to 5%, greater than or equal to 7.5%, greater than or equal to 10%, greater than or equal to 12.5%, greater than or equal to 15%, greater than or equal to 20%, or greater than or equal to 25%. The support layer may have a solidity of less than or equal to 30%, less than or equal to 25%, less than or equal to 20%, less than or equal to 15%, less than or equal to 12.5%, less than or equal to 10%, less than or equal to 7.5%, less than or equal to 5%, less than or equal to 4%, less than or equal to 3%, less than or equal to 2.5%, less than or equal to 2%, less than or equal to 1.5%, or less than or equal to 1.25%. Combinations of the above-referenced ranges are also possible (e.g., greater than or equal to 1% and less than or equal to 30%, greater than or equal to 4% and less than or equal to 20%, or greater than or equal to 5% and less than or equal to 15%). Other ranges are also possible.

The solidity of a support layer may be determined by using the following formula: solidity=[basis weight/(fiber density*thickness)]*100%. The basis weight and thickness may be determined as described elsewhere herein. The fiber density is equivalent to the average density of the material or material(s) forming the fiber, which is typically specified by the fiber manufacturer. The average density of the materials forming the fibers may be determined by: (1) determining the total volume of all of the fibers in the filter media; and (2) dividing the total mass of all of the fibers in the filter media by the total volume of all of the fibers in the filter media. If the mass and density of each type of fiber in the filter media are known, the volume of all the fibers in the filter media may be determined by: (1) for each type of fiber, dividing the total mass of the type of fiber in the filter media by the density of the type of fiber; and (2) summing the volumes of each fiber type. If the mass and density of each type of fiber in the filter media are not known, the volume of all the fibers in the filter media may be determined in accordance with Archimedes' principle.

Additionally, as shown in the exemplary embodiments of FIG. 9A, the extension of the support layer(s) across the peaks and into the troughs may be such that the surface area of the support layer in contact with a top layer 18A is similar across the peaks as it is across the troughs. Similarly, the surface area of the support layer in contact with a bottom layer 18B (FIG. 9B) may be similar across the peaks as it is across the troughs. For example, the surface area of the support layer in contact with a top or bottom layer across a peak may differ from the surface area of the support layer in contact with the top or bottom layer across a trough by less than 70%, less than 50%, less than 30%, less than 20%, less than 10%, or less than 5%.

In certain exemplary embodiments, the downstream and/or upstream support layers 14, 16 can have a fiber density that is greater at the peaks than it is in the troughs; and, in some embodiments, a fiber mass that is less at the peaks than it is in the troughs. This can result from the coarseness of the downstream and/or upstream support layers 14, 16 relative to the efficiency layer 12. In particular, as the layers are passed from the first moving surface to the second moving surface, the relatively fine nature of the efficiency layer 12 will allow the downstream and/or upstream support layers 14, 16 to conform around the waves formed in the efficiency layer 12. As the support layers 14, 16 extend across a peak P, the distance traveled will be less than the distance that each layer 14, 16 travels to fill a trough. As a result, the support layers 14, 16 will compact at the peaks, thus having an increased fiber density at the peaks as compared to the troughs, through which the layers will travel to form a loop-shaped configuration.

Once the layers are formed into a waved configuration, the waved shape can be maintained by activating binder fibers (e.g., binder fibers in one or both of the support layers) to effect bonding of the fibers. A variety of techniques can be used to activate the binder fibers. For example, if bicomponent binder fibers having a core and sheath are used, the binder fibers can be activated upon the application of heat. If monocomponent binder fibers are used, the binder fibers can be activated upon the application of heat, steam and/or some other form of warm moisture. A top layer 18 (FIG. 9A) and/or bottom layer 18B (FIG. 9B) can also be positioned on top of the upstream support layer 16 (FIG. 9A) or on the bottom of the downstream support layer 14B (FIG. 9B), respectively, and mated, such as by bonding, to the upstream support layer 16 or downstream support layer 14B simultaneously or subsequently. A person skilled in the art will also appreciate that the layers can optionally be mated to one another using various techniques other than using binder fibers. The layers can also be individually bonded layers, and/or they can be mated, including bonded, to one another prior to being waved.

The filter media described herein may be suitable for a variety of filtration applications. For instance, the filter media described herein may be suitable for use in HVAC bag filters, HVAC panel filters, respiratory protective equipment, medical filters, vacuum cleaner filters, room air purifier filters, cabin air filters, and hydraulic fluid filters. Some filter media described herein may be fluid filters, such as gas filters (e.g., an filters) and/or liquid filters (e.g., water filters, fuel filters). In some embodiments, the filter media described herein are high energy particulate air (HEPA) or ultra-low penetration air (ULPA) filters. These filters are required to remove particulates at an efficiency level of greater than 99.95% and 99.9995%, respectively, per EN1822:2009. In some embodiments, the filter media may remove particulates at an efficiency of greater than 95%, greater than 99.995%, greater than 99.99995%, or up to 99.999995%. In some embodiments, the filter media may be suitable for HVAC applications. That is, the filter media may have a particulate efficiency of greater than or equal to about 10% and less than or equal to about 90%, or greater than or equal to about 35% and less than or equal to about 90%. Other types of filter media and efficiencies are also possible. In some embodiments, a filter media may be a HEPA, ULPA, or HVAC filter and may be one component of a filter element as described in more detail below.

In some embodiments, a filter media described herein may be a component of a filter element. That is, the filter media may be incorporated into an article suitable for use by an end user. Non-limiting examples of suitable filter elements include flat panel filters, V-bank filters (comprising, e.g., between 1 and 24 Vs), cartridge filters, cylindrical filters, conical filters, and curvilinear filters. Filter elements may have any suitable height (e.g., between 2 inches and 124 inches for flat panel filters, between 4 inches and 124 inches for V-bank filters, between 1 inch and 124 inches for cartridge and cylindrical filters). Filter elements may also have any suitable width (between 2 inches and 124 inches for flat panel filters, between 4 inches and 124 inches for V-bank filters). Some filter elements (e.g., cartridge filters, cylindrical filters) may be characterized by a diameter instead of a width; these filter elements may have a diameter of any suitable value (e.g., between 1 inch and 124 inches). Filter elements typically comprise a frame, which may be made of one or more materials such as cardboard, aluminum, steel, alloys, wood, and polymers.

The filter media described herein may perform advantageously in one or more ways. In some embodiments, a filter media has a desirably high value of gamma, which is a rating applied to filter media based on the relationship between penetration and pressure drop across the media, or particulate efficiency as a function of pressure drop across the media or web. Generally, higher gamma values are indicative of better filter performance, i.e., a high particulate efficiency as a function of pressure drop. As described above, and without wishing to be bound by any particular theory, increasing the surface area of a filter media will typically increase its gamma. Accordingly, the filter media described herein that have relatively high surface areas, such as filter media comprising an irregular structure and/or a plurality of peaks irregular in one or more ways, may also have relatively high values of gamma. Gamma is defined by the following formula: Gamma=(-$\log_{10}$(initial penetration %/100)/initial pressure drop, mm $H_2O$)×100. Penetration, often expressed as a percentage, is defined as follows: Pen (%)=(C/$C_0$)*100 where C is the particle concentration after passage through the filter and $C_0$ is the particle concentration before passage through the filter. The initial penetration is the penetration measured upon first exposure of the filter media to the particles, and the initial pressure drop is the pressure drop measured upon first exposure of the filter media to the particles. The penetration and gamma described herein are those measured using NaCl particles with an average diameter of 0.26 microns. The penetration and pressure drop can both be measured by employing a TSI 8130 Automated Filter Tester (8130 CertiTest™ Filter Tester from TSI) with a circular opening with an area of 100 cm² to analyze a flat-sheet filter media.

When measuring gamma, the TSI 8130 Automated Filter Tester is employed to blow an NaCl aerosol made up of NaCl particles with an average diameter of 0.26 microns at the filter media. The NaCl particles may be generated from a 2 wt % aqueous solution of NaCl which is caused to form an NaCl aerosol by blowing dilution air through the solution at a rate of 70 L/min at a pressure of 30 psi. The aerosol is then blown through the filter media at a pressure 30 psi and a rate of 32 L/min, which corresponds to a face velocity of 5.3 cm/s. As the TSI 8130 Automated Filter Tester is blowing the NaCl aerosol, both the pressure drop across the filter media and the penetration of the NaCl aerosol are measured by two condensation nucleus particle counters simultaneously, one of which is upstream of the filter media and one of which is downstream of the filter media. The particle collection efficiency is reported at the beginning of the test, and is the percentage of upstream challenge particles collected by the filter at the beginning of the test. The initial pressure drop is also measured at the beginning of the test.

In some embodiments, a filter media has a gamma of greater than or equal to 8, greater than or equal to 10, greater than or equal to 15, greater than or equal to 20, greater than or equal to 25, greater than or equal to 30, greater than or equal to 40, greater than or equal to 50, greater than or equal to 75, greater than or equal to 100, greater than or equal to 125, greater than or equal to 150, greater than or equal to 175, greater than or equal to 200, greater than or equal to 225, greater than or equal to 250, greater than or equal to 275, greater than or equal to 300, greater than or equal to 330, greater than or equal to 350, or greater than or equal to 375. In some embodiments, a filter media has a gamma of less than or equal to 400, less than or equal to 375, less than or equal to 350, less than or equal to 330, less than or equal to 300, less than or equal to 275, less than or equal to 250, less than or equal to 225, less than or equal to 200, less than or equal to 175, less than or equal to 150, less than or equal to 125, less than or equal to 100, less than or equal to 75, less than or equal to 50, less than or equal to 40, less than or equal to 30, less than or equal to 25, less than or equal to 20, less than or equal to 15, or less than or equal to 10. Combinations of the above-referenced ranges are also possible (e.g., greater than or equal to 8 and less than or equal to 400, greater than or equal to 25 and less than or equal to 330, or greater than or equal to 30 and less than or equal to 330). Other ranges are also possible.

As described above, some filter media described herein comprise an irregular structure, which yields one or more resultant advantages. The irregular structure may be in the form of an irregular surface structure. By way of example, it may take the form of a plurality of peaks in the surface that are irregular in one or more ways. As another example, it may take the form of a plurality of peaks present at a surface of one or more layers, and/or extending through one or more layers (e.g., in the case of undulated layers), that are irregular in one or more ways. For instance, a filter media may comprise a plurality of peaks that is present at the surface of, and/or extends through, one or more of the following types of layers: efficiency layers, nanofiber layers, carrier layers, and scrims. In some embodiments, a filter media comprises a plurality of peaks that extends throughout the entirety of the filter media. In other words, a filter media may include only layers that are undulated together and where the undulations take the form of the plurality of peaks irregular in one or more ways. Several features of pluralities of peaks irregular in one or more ways are described below. It should be understood that this description may relate to pluralities of peaks present at a surface of the filter media, at a surface of one or more layers therein, extending through the thickness of the filter media, and/or extending through one or more layers therein. These features may be features of a plurality of peaks in an undulated layer or layers and/or of a plurality of peaks that is not an undulated layer.

When a filter media comprises a plurality of peaks, such as a plurality of peaks irregular in one or more ways, the plurality of peaks may have an average peak height that is particularly advantageous. For instance, the plurality of peaks may have an average peak height of greater than or equal to 0.3 mm, greater than or equal to 0.5 mm, greater than or equal to 0.75 mm, greater than or equal to 1 mm, greater than or equal to 1.5 mm, greater than or equal to 2 mm, greater than or equal to 2.5 mm, greater than or equal to 3 mm, greater than or equal to 4 mm, greater than or equal to 5 mm, greater than or equal to 6 mm, greater than or equal to 7 mm, greater than or equal to 8 mm, or greater than or equal to 9 mm. In some embodiments, a filter media comprises a plurality of peaks having an average peak height of less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2.5 mm, less than or equal to 2 mm, less than or equal to 1.5 mm, less than or equal to 1 mm, less than or equal to 0.75 mm, or less than or equal to 0.5 mm. Combinations of the above-referenced ranges are also possible (e.g., greater than or equal to 0.3 mm and less than or equal to 10 mm, greater than or equal to 1 mm and less than or equal to 8 mm, or greater than or equal to 3 mm and less than or equal to 7 mm). Other ranges are also possible. The average peak height may be determined by finding the peak height of the peaks making up the plurality of peaks by use of a scanning optical microscope, as described above, and then averaging these peak heights to yield an average peak height.

When a filter media comprises a plurality of peaks, such as a plurality of peaks irregular in one or more ways, the plurality of peaks may have a peak height standard deviation that is particularly advantageous. For instance, the plurality of peaks may have a peak height standard deviation of greater than or equal to 0.1 mm, greater than or equal to 0.15 mm, greater than or equal to 0.2 mm, greater than or equal to 0.25 mm, greater than or equal to 0.3 mm, greater than or equal to 0.4 mm, greater than or equal to 0.5 mm, greater than or equal to 0.75 mm, greater than or equal to 1 mm, greater than or equal to 1.25 mm, greater than or equal to 1.5 mm, greater than or equal to 1.75 mm, greater than or equal to 2 mm, greater than or equal to 2.25 mm, greater than or equal to 2.5 mm, or greater than or equal to 2.75 mm. In some embodiments, a filter media comprises a plurality of peaks having a peak height standard deviation of less than or equal to 3 mm, less than or equal to 2.75 mm, less than or equal to 2.5 mm, less than or equal to 2.25 mm, less than or equal to 2 mm, less than or equal to 1.75 mm, less than or equal to 1.5 mm, less than or equal to 1.25 mm, less than or equal to 1 mm, less than or equal to 0.75 mm, less than or equal to 0.5 mm, less than or equal to 0.4 mm, less than or equal to 0.3 mm, less than or equal to 0.25 mm, less than or equal to 0.2 mm, or less than or equal to 0.15 mm. Combinations of the above-referenced ranges are also possible (e.g., greater than or equal to 0.1 mm and less than or equal to 3 mm, greater than or equal to 0.15 mm and less than or equal to 1.5 mm, or greater than or equal to 0.2 mm and less than or equal to 1 mm). Other ranges are also possible. The peak height standard deviation may be determined by finding the peak height of the peaks making up the plurality of peaks by use of a scanning optical microscope, as described above, and then using standard statistical techniques to determine the standard deviation of the peak heights to yield the peak height standard deviation.

When a filter media comprises a plurality of peaks, such as a plurality of peaks irregular in one or more ways, the plurality of peaks may have a ratio of peak height standard deviation to average peak height that is particularly advantageous. For instance, the plurality of peaks may have a ratio of peak height standard deviation to average peak height of greater than or equal to 0.03, greater than or equal to 0.035, greater than or equal to 0.04, greater than or equal to 0.045, greater than or equal to 0.05, greater than or equal to 0.055, greater than or equal to 0.06, greater than or equal to 0.065, greater than or equal to 0.07, greater than or equal to 0.075, greater than or equal to 0.08, greater than or equal to 0.09, greater than or equal to 0.1, greater than or equal to 0.15, greater than or equal to 0.2, greater than or equal to 0.25, greater than or equal to 0.3, greater than or equal to 0.35, greater than or equal to 0.4, greater than or equal to 0.45, greater than or equal to 0.5, greater than or equal to 0.55, greater than or equal to 0.6, greater than or equal to 0.65, greater than or equal to 0.7, or greater than or equal to 0.75. In some embodiments, a filter media comprises a plurality of peaks having a ratio of peak height standard deviation to average peak height of less than or equal to 0.8, less than or equal to 0.75, less than or equal to 0.7, less than or equal to 0.65, less than or equal to 0.6, less than or equal to 0.55, less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.09, less than or equal to 0.08, less than or equal to 0.075, less than or equal to 0.07, less than or equal to 0.065, less than or equal to 0.06, less than or equal to 0.055, less than or equal to 0.05, less than or equal to 0.045, less than or equal to 0.04, or less than or equal to 0.035. Combinations of the above-referenced ranges are also possible (e.g., greater than or equal to 0.03 and less than or equal to 0.8, greater than or equal to 0.05 and less than or equal to 0.6, or greater than or equal to 0.07 and less than or equal to 0.5). Other ranges are also possible. The ratio of peak height standard deviation to average peak height may be determined by finding the peak height standard deviation and average peak height as described above, and then taking their ratio.

When a filter media comprises a plurality of peaks, such as a plurality of peaks irregular in one or more ways, the plurality of peaks may have an average peak spacing that is particularly advantageous. For instance, the plurality of peaks may have an average peak spacing of greater than or equal to 1 mm, greater than or equal to 1.5 mm, greater than or equal to 2 mm, greater than or equal to 2.5 mm, greater than or equal to 3 mm, greater than or equal to 3.5 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 12 mm, greater than or equal to 14 mm, greater than or equal to 16 mm, or greater than or equal to 18 mm. In some embodiments, a filter media comprises a plurality of peaks having an average peak spacing of less than or equal to 20 mm, less than or equal to 18 mm, less than or equal to 16 mm, less than or equal to 14 mm, less than or equal to 12 mm, less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3.5 mm, less than or equal to 3 mm, less than or equal to 2.5 mm, less than or equal to 2 mm, or less than or equal to 1.5 mm. Combinations of the above-referenced ranges are also possible (e.g., greater than or equal to 1 mm and less than or equal to 20 mm, greater than or equal to 2 mm and less than or equal to 14 mm, or greater than or equal to 3 mm and less than or equal to 10 mm). Other ranges are also possible. The average peak spacing may be determined by finding the spacing between each peak and its two nearest neighbors by use of a scanning optical microscope as described above, and then averaging these spacings to yield the average peak spacing.

When a filter media comprises a plurality of peaks, such as a plurality of peaks irregular in one or more ways, the plurality of peaks may have a peak spacing standard deviation that is particularly advantageous. For instance, the plurality of peaks may have a peak spacing standard deviation of greater than or equal to 0.2 mm, greater than or equal to 0.25 mm, greater than or equal to 0.3 mm, greater than or equal to 0.35 mm, greater than or equal to 0.4 mm, greater than or equal to 0.45 mm, greater than or equal to 0.5 mm, greater than or equal to 0.6 mm, greater than or equal to 0.8 mm, greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, or greater than or equal to 9 mm. In some embodiments, a filter media comprises a plurality of peaks having a peak spacing standard deviation of less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2 mm, less than or equal to 1 mm, less than or equal to 0.8 mm, less than or equal to 0.6 mm, less than or equal to 0.5 mm, less than or equal to 0.45 mm, less than or equal to 0.4 mm, less than or equal to 0.35 mm, less than or equal to 0.3 mm, or less than or equal to 0.25 mm. Combinations of the above-referenced ranges are also possible (e.g., greater than or equal to 0.2 mm and less than or equal to 10 mm, greater than or equal to 0.3 mm and less than or equal to 7 mm, or greater than or equal to 0.4 mm and less than or equal to 4 mm). Other ranges are also possible. The peak spacing standard deviation may be determined by finding the spacing between each peak and its two nearest neighbors by use of a scanning optical microscope as described above, and then using standard statistical techniques to determine the standard deviation of the nearest neighbor peak spacings to yield the peak spacing standard deviation.

When a filter media comprises a plurality of peaks, such as a plurality of peaks irregular in one or more ways, the plurality of peaks may have a ratio of peak spacing standard deviation to average peak spacing that is particularly advantageous. For instance, the plurality of peaks may have a ratio of peak spacing standard deviation to average peak spacing of greater than or equal to 0.08, greater than or equal to 0.085, greater than or equal to 0.09, greater than or equal to 0.095, greater than or equal to 0.1, greater than or equal to 0.125, greater than or equal to 0.15, greater than or equal to 0.2, greater than or equal to 0.25, greater than or equal to 0.3, greater than or equal to 0.35, greater than or equal to 0.4, greater than or equal to 0.45, greater than or equal to 0.5, greater than or equal to 0.6, greater than or equal to 0.7, greater than or equal to 0.8, or greater than or equal to 0.9. In some embodiments, a filter media comprises a plurality of peaks having a ratio of peak spacing standard deviation to average peak spacing of less than or equal to 1, less than or equal to 0.9, less than or equal to 0.8, less than or equal to 0.7, less than or equal to 0.6, less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.125, less than or equal to 0.1, less than or equal to 0.095, less than or equal to 0.09, or less than or equal to 0.085. Combinations of the above-referenced ranges are also possible (e.g., greater than or equal to 0.08 and less than or equal to 1, greater than or equal to 0.15 and less than or equal to 0.8, or greater than or equal to 0.15 and less than or equal to 0.5). Other ranges are also possible. The ratio of peak spacing standard deviation to average peak spacing may be determined by finding the peak spacing standard deviation and average peak spacing as described above, and then taking their ratio.

The filter media described herein may have an advantageous average surface height. In some embodiments, a filter media comprises a layer comprising a plurality of peaks irregular in one or more ways having an advantageous average surface height. In some embodiments, a filter media (and/or a layer therein comprising a plurality of irregular peaks) has an average surface height of greater than or equal to 0.3 mm, greater than or equal to 0.5 mm, greater than or equal to 0.75 mm, greater than or equal to 1 mm, greater than or equal to 1.5 mm, greater than or equal to 2 mm, greater than or equal to 2.5 mm, greater than or equal to 3 mm, greater than or equal to 4 mm, greater than or equal to 5 mm, greater than or equal to 6 mm, greater than or equal to 7 mm, greater than or equal to 8 mm, or greater than or equal to 9 mm. In some embodiments, a filter media (and/or a layer therein comprising a plurality of irregular peaks) has an average surface height of less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2.5 mm, less than or equal to 2 mm, less than or equal to 1.5 mm, less than or equal to 1 mm, less than or equal to 0.75 mm, or less than or equal to 0.5 mm. Combinations of the above-referenced ranges are also possible (e.g., greater than or equal to 0.3 mm and less than or equal to 10 mm, greater than or equal to 1 mm and less than or equal to 8 mm, or greater than or equal to 3 mm and less than or equal to 7 mm). Other ranges are also possible. As used herein, the average surface height of a filter media and/or a layer therein is the average of the relative heights of each point in the relative surface topography of a filter media and/or a layer therein after a selected amount of computational processing. The relative surface topography of a filter media and/or a layer therein may be determined using scanning optical microscopy as described above. Then, steps (1) and (2) of the process for determining peak heights described above may be carried out to process the resultant data. Finally, the processed data may be averaged to yield an average surface height. If the layer having the average surface height in one or more of the ranges listed above is not on an external surface of the filter media (e.g., if it is covered by a relatively flat outer or cover layer), the layer or layers positioned exterior to the relevant layer may be removed so that the relevant layer is exposed, and average surface height of the exposed relevant layer may be measured by optical microscopy as described above.

The filter media described herein may have a variety of suitable basis weights. The basis weight of a filter media will generally depend on whether or not it is undulated and the size of the undulations. For instance, filter media comprising undulations on a single length scale (e.g., filter media that comprise a layer that has been gathered, such as by the procedure shown in FIGS. 7A-7C, but not include an additional structure formed by, e.g., pleating or waving) typically have lower basis weights than filter media comprising undulations on two or more length scales (e.g., filter media that comprise a layer that has been gathered, such as by the procedure shown in FIGS. 7A-7C, and also comprise an additional structure formed by, e.g., pleating or waving).

In some embodiments, a filter media comprising undulations on a single length scale has a basis weight of greater than or equal to 60 $g/m^2$, greater than or equal to 70 $g/m^2$, greater than or equal to 80 $g/m^2$, greater than or equal to 90 $g/m^2$, greater than or equal to 95 $g/m^2$, greater than or equal to 100 $g/m^2$, greater than or equal to 110 $g/m^2$, greater than or equal to 120 $g/m^2$, greater than or equal to 130 $g/m^2$, or greater than or equal to 140 $g/m^2$. In some embodiments, a filter media comprising undulations on a single length scale has a basis weight of less than or equal to 150 $g/m^2$, less than or equal to 140 $g/m^2$, less than or equal to 130 $g/m^2$, less than or equal to 120 $g/m^2$, less than or equal to 110 $g/m^2$, less than or equal to 100 $g/m^2$, less than or equal to 95 $g/m^2$, less than or equal to 90 $g/m^2$, less than or equal to 80 $g/m^2$, or less than or equal to 70 $g/m^2$. Combinations of the above-referenced ranges are also possible (e.g., greater than or equal to 60 $g/m^2$ and less than or equal to 150 $g/m^2$, greater than or equal to 70 $g/m^2$ and less than or equal to 140 $g/m^2$, or greater than or equal to 95 $g/m^2$ and less than or equal to 140 $g/m^2$). Other ranges are also possible. The basis weight of a filter media may be determined by weighing a filter media of known area and then dividing the measured weight by the known area.

As described above, filter media comprising undulations on two or more length scales may be provided. The ratio of the basis weight of a filter media after forming the undulations on the larger of the two length scales (e.g., by waving or pleating) to the basis weight of a filter media prior to forming the undulations on the larger of the two length scales may be referred to as the additional structure undulation ratio (which is equivalent to, e.g., the wave ratio for a waved media or the pleat ratio for a pleated media). A filter media comprising undulations on two or more length scales may have an additional structure undulation ratio of greater than or equal to 1.5, greater than or equal to 1.75, greater than or equal to 2, greater than or equal to 2.25, greater than or equal to 2.5, or greater than or equal to 2.75. A filter media comprising undulations on two or more length scales may have an additional structure undulation ratio of less than or equal to 3, less than or equal to 2.75, less than or equal to 2.5, less than or equal to 2.25, less than or equal to 2, or less than or equal to 1.75. Combinations of the above-referenced ranges are also possible (e.g., greater than or equal to 1.5 and less than or equal to 3). Other ranges are also possible.

The filter media described herein may have a variety of suitable thicknesses. The thickness of a filter media will generally depend on whether or not it is undulated and the size of the undulations. For instance, filter media comprising undulations on a single length scale (e.g., filter media that comprise a layer that has been gathered, such as by the procedure shown in FIGS. 7A-7C, but not include an additional structure formed by, e.g., pleating or waving) typically have lower thicknesses than filter media comprising undulations on two or more length scales (e.g., filter media that comprise a layer that has been gathered, such as by the procedure shown in FIGS. 7A-7C, and also comprise an additional structure formed by pleating or waving).

In some embodiments, a filter media comprising undulations on a single length scale has a thickness of greater than or equal to 2 mm, greater than or equal to 3 mm, greater than or equal to 4 mm, greater than or equal to 5 mm, greater than or equal to 6 mm, greater than or equal to 7 mm, or greater than or equal to 8 mm. In some embodiments, a filter media comprising undulations on a single length scale has a thickness of less than or equal to 10 mm, less than or equal to 8 mm, less than or equal to 7 mm, less than or equal to 6 mm, less than or equal to 5 mm, less than or equal to 4 mm, or less than or equal to 3 mm. Combinations of the above-referenced ranges are also possible (e.g., greater than or equal to 2 mm and less than or equal to 10 mm, or greater than or equal to 3 mm and less than or equal to 7 mm). Other ranges are also possible. The thickness of a filter media may be determined by Edana WSP 120.1 Standard (2005) with a pressure foot selected to have a 2 ounce load and a 1 square inch area. It should be understood that the values described above may also refer to thicknesses of filter media comprising undulations on two or more length scales that have been extended to form filter media comprising undulations on a single length scale. In some embodiments, the values of thickness above may be the thicknesses of waved or pleated filter media prior to waving or pleating.

As described above, filter media comprising undulations on two or more length scales may be provided. These filter media may have thicknesses that are defined by the undulations on the second length scale (e.g., the wave height or pleat height). In some embodiments, a filter media comprising undulations on two or more length scales has a thickness of greater than or equal to 8 mm, greater than or equal to 10 mm, greater than or equal to 12.5 mm, greater than or equal to 15 mm, greater than or equal to 20 mm, greater than or equal to 25 mm, greater than or equal to 30 mm, or greater than or equal to 40 mm. In some embodiments, a filter media comprising undulations on two or more length scales has a thickness of less than or equal to 50 mm, less than or equal to 40 mm, less than or equal to 30 mm, less than or equal to 25 mm, less than or equal to 20 mm, less than or equal to 15 mm, less than or equal to 12.5 mm, or less than or equal to 10 mm. Combinations of the above-referenced ranges are also possible (e.g., greater than or equal to 8 mm and less than or equal to 50 mm). Other ranges are also possible. The thickness of a filter media may be determined by Edana WSP 120.1 Standard (2005) with a pressure foot selected to have a 2 ounce load and a 1 square inch area.

The filter media described herein may have a variety of suitable mean flow pore sizes. In some embodiments, a filter media has a mean flow pore size of greater than or equal to 4 microns, greater than or equal to 5 microns, greater than or equal to 6 microns, greater than or equal to 7 microns, greater than or equal to 8 microns, greater than or equal to 10 microns, greater than or equal to 12 microns, greater than or equal to 14 microns, greater than or equal to 16 microns, greater than or equal to 18 microns, greater than or equal to 20 microns, or greater than or equal to 22 microns. In some embodiments, a filter media has a mean flow pore size of less than or equal to 25 microns, less than or equal to 22 microns, less than or equal to 20 microns, less than or equal to 18 microns, less than or equal to 16 microns, less than or equal to 14 microns, less than or equal to 12 microns, less than or equal to 10 microns, less than or equal to 8 microns, less than or equal to 7 microns, less than or equal to 6 microns, or less than or equal to 5 microns. Combinations of the above-referenced ranges are also possible (e.g., greater than or equal to 4 microns and less than or equal to 25 microns, greater than or equal to 6 microns and less than or equal to 16 microns, or greater than or equal to 7 microns and less than or equal to 12 microns). Other ranges are also possible. The mean flow pore size of a filter media may be determined in accordance with ASTM F316 (2011).

The filter media described herein may have a variety of suitable pressure drops. In some embodiments, a filter media has a pressure drop of greater than or equal to 0.2 mm $H_2O$, greater than or equal to 0.4 mm $H_2O$, greater than or equal to 0.6 mm $H_2O$, greater than or equal to 0.8 mm $H_2O$, greater than or equal to 1 mm $H_2O$, greater than or equal to 1.2 mm $H_2O$, greater than or equal to 1.4 mm $H_2O$, greater than or equal to 1.6 mm $H_2O$, greater than or equal to 1.8 mm $H_2O$, greater than or equal to 2 mm $H_2O$, greater than or equal to 2.5 mm $H_2O$, greater than or equal to 3 mm $H_2O$, greater than or equal to 3.5 mm $H_2O$, greater than or equal to 4 mm $H_2O$, greater than or equal to 5 mm $H_2O$, greater than or equal to 6 mm $H_2O$, or greater than or equal to 8 mm $H_2O$. In some embodiments, a filter media has a pressure drop of less than or equal to 10 mm $H_2O$, less than or equal to 8 mm $H_2O$, less than or equal to 6 mm $H_2O$, less than or equal to 5 mm $H_2O$, less than or equal to 4 mm $H_2O$, less than or equal to 3.5 mm $H_2O$, less than or equal to 3 mm $H_2O$, less than or equal to 2.5 mm $H_2O$, less than or equal to 2 mm $H_2O$, less than or equal to 1.8 mm $H_2O$, less than or equal to 1.6 mm $H_2O$, less than or equal to 1.4 mm $H_2O$, less than or equal to 1.2 mm $H_2O$, less than or equal to 1 mm $H_2O$, less than or equal to 0.8 mm $H_2O$, less than or equal to 0.6 mm $H_2O$, or less than or equal to 0.4 mm $H_2O$. Combinations of the above-referenced ranges are also possible (e.g., greater than or equal to 0.2 mm $H_2O$ and less than or equal to 10 mm $H_2O$, greater than or equal to 0.4 mm $H_2O$ and less than or equal to 6 mm $H_2O$, greater than or equal to 0.8 mm $H_2O$ and less than or equal to 4 mm $H_2O$, or greater than or equal to 1.2 mm $H_2O$ and less than or equal to 1.8 mm $H_2O$). Other ranges are also possible. The pressure drop of a filter media may be determined by employing a TSI 8130 Automated Filter Tester as described above with respect to the measurement of gamma.

The filter media described herein may have a variety of initial penetrations. In some embodiments, a filter media has an initial penetration of less than or equal to 80%, less than or equal to 70%, less than or equal to 60%, less than or equal to 50%, less than or equal to 40%, less than or equal to 30%, less than or equal to 20%, less than or equal to 15%, less than or equal to 10%, less than or equal to 5%, less than or equal to 2%, less than or equal to 1%, less than or equal to 0.5%, less than or equal to 0.2%, less than or equal to 0.1%, less than or equal to 0.05%, less than or equal to 0.02%, less than or equal to 0.01%, less than or equal to 0.005%, less than or equal to 0.002%, less than or equal to 0.001%, less than or equal to 0.0005%, less than or equal to 0.0002%, or less than or equal to 0.0001%. In some embodiments, a filter media has an initial penetration of greater than or equal to 0.00005%, greater than or equal to 0.0001%, greater than or equal to 0.0002%, greater than or equal to 0.0005%, greater than or equal to 0.001%, greater than or equal to 0.002%, greater than or equal to 0.005%, greater than or equal to 0.01%, greater than or equal to 0.02%, greater than or equal to 0.05%, greater than or equal to 0.1%, greater than or equal to 0.2%, greater than or equal to 0.5%, greater than or equal to 1%, greater than or equal to 2%, greater than or equal to 5%, greater than or equal to 10%, greater than or equal to 15%, greater than or equal to 20%, greater than or equal to 30%, greater than or equal to 40%, greater than or equal to 50%, greater than or equal to 60%, or greater than or equal to 70%. Combinations of the above-referenced ranges are also possible (e.g., greater than or equal to 0.00005% and less than or equal to 80%). Other ranges are also possible. The initial penetration of a filter media may be determined by employing a TSI 8130 Automated Filter Tester as described above with respect to the measurement of gamma.

The filter media described herein may have a variety of suitable air permeabilities. In some embodiments, a filter media has an air permeability of greater than or equal to 20 CFM, greater than or equal to 25 CFM, greater than or equal to 30 CFM, greater than or equal to 35 CFM, greater than or equal to 40 CFM, greater than or equal to 50 CFM, greater than or equal to 60 CFM, greater than or equal to 75 CFM, greater than or equal to 100 CFM, greater than or equal to 120 CFM, greater than or equal to 150 CFM, greater than or equal to 170 CFM, greater than or equal to 200 CFM, greater than or equal to 225 CFM, greater than or equal to 250 CFM, greater than or equal to 275 CFM, greater than or equal to 300 CFM, or greater than or equal to 325 CFM. In some embodiments, a filter media has an air permeability of less than or equal to 350 CFM, less than or equal to 325 CFM, less than or equal to 300 CFM, less than or equal to 275 CFM, less than or equal to 250 CFM, less than or equal to 225 CFM, less than or equal to 200 CFM, less than or equal to 170 CFM, less than or equal to 150 CFM, less than or equal to 120 CFM, less than or equal to 100 CFM, less than or equal to 75 CFM, less than or equal to 60 CFM, less than or equal to 50 CFM, less than or equal to 40 CFM, less than or equal to 35 CFM, less than or equal to 30 CFM, or less than or equal to 25 CFM. Combinations of the above-referenced ranges are also possible (e.g., greater than or equal to 20 CFM and less than or equal to 350 CFM, greater than or equal to 35 CFM and less than or equal to 170 CFM, or greater than or equal to 20 CFM and less than or equal to 350 CFM). Other ranges are also possible. The air permeability of a filter media may be determined in accordance with ASTM Test Standard D737 (1996) under a pressure drop of 125 Pa on a sample with a test area of 38 cm$^2$.

The filter media described herein may have a variety of suitable dust holding capacities. In some embodiments, a filter media has a dust holding capacity of greater than or equal to 60 g/m$^2$, greater than or equal to 70 g/m$^2$, greater than or equal to 80 g/m$^2$, greater than or equal to 90 g/m$^2$, greater than or equal to 100 g/m$^2$, greater than or equal to 110 g/m$^2$, greater than or equal to 135 g/m$^2$, greater than or equal to 150 g/m$^2$, greater than or equal to 162 g/m$^2$, or greater than or equal to 180 g/m$^2$. In some embodiments, a filter media has a dust holding capacity of less than or equal to 200 g/m$^2$, less than or equal to 180 g/m$^2$, less than or equal to 162 g/m$^2$, less than or equal to 150 g/m$^2$, less than or equal to 135 g/m$^2$, less than or equal to 110 g/m$^2$, less than or equal to 100 g/m$^2$, less than or equal to 90 g/m$^2$, less than or equal to 80 g/m$^2$, or less than or equal to 70 g/m$^2$. Combinations of the above-referenced ranges are also possible (e.g., greater than or equal to 60 g/m$^2$ and less than or equal to 200 g/m$^2$, greater than or equal to 80 g/m$^2$ and less than or equal to 162 g/m$^2$, or greater than or equal to 90 g/m$^2$ and less than or equal to 135 g/m$^2$). Other ranges are also possible. The dust holding capacity of a filter media may be determined by the procedure described in ASHRAE 52.1 (1992) modified such that: (1) the filter media is weighed prior to the beginning of the procedure and at the conclusion of the procedure, and (2) the mass of dust held by the filter media is determined by subtracting the measured mass of the filter media prior to the beginning of the procedure from the measured mass of the filter media at the conclusion of the procedure. This procedure may be carried out by exposing a filter media with an area of 1 ft$^2$ to air comprising ASHRAE 52.1 synthetic test dust at a concentration of 2 g/100 ft$^3$. The air comprising the test dust may be provided to the filter media at a face velocity of 15 ft/min until the pressure drop of the filter media reaches 1.5 inches of H$_2$O. At this point, the procedure concludes and the mass of the filter media at the conclusion of the procedure may be determined by weighing.

As described above, some filter media described herein comprise more than one layer. In some embodiments, a filter media comprises an efficiency layer. The efficiency layer may improve the efficiency of the filter media. When present, the efficiency layer may be positioned in a variety of suitable locations in the filter media, such as the upstream-most layer, the downstream-most layer, or a layer for which there are both one or more layers positioned upstream and one or more layers positioned downstream. In other words, it may be a first layer, a second layer, a third layer, a fourth layer, or another layer. In some embodiments, a filter media comprises more than one efficiency layer. For instance, a filter media may comprise a first layer and a second layer that are efficiency layers, a first layer and a second layer that are efficiency layers, a first layer and a third layer that are efficiency layers, or any other combination of layers that are efficiency layers.

Some efficiency layers described herein are fibrous. For instance, an efficiency layer may be a non-woven fiber web. The non-woven fiber web may be a meltblown fiber web, an electrospun fiber web, a centrifugal spun fiber web, an air laid fiber web, a spunbond fiber web, or a carded non-woven fiber web. Filter layers comprising two or more efficiency layers may comprise efficiency layers that are all the same type of fiber web (e.g., a filter media may comprise two efficiency layers that are meltblown fiber webs), efficiency layers that are each different types of fiber webs (e.g., a filter media may comprise a first efficiency layer that is a meltblown fiber web and a second efficiency layer that is an electrospun fiber web), or may comprise two or more efficiency layers of a first type of fiber web and one or more efficiency layers of a second type of fiber web different than the first type (e.g., a filter media may comprise two efficiency layers that are meltblown fiber webs and one efficiency layer that is an electrospun fiber web).

Efficiency layers may comprise a variety of suitable types of fibers. As described above, an efficiency layer may comprise meltblown fibers, centrifugal spun fibers, electrospun fibers, and/or spunbond fibers. In some embodiments, a filter media comprises an efficiency layer comprising synthetic fibers and/or natural fibers. Non-limiting examples of synthetic fibers include polyolefin fibers (e.g., poly(propylene) fibers, poly(ethylene) fibers), polyester fibers (e.g., poly(butylene terephthalate) fibers, poly(ethylene terephthalate) fibers), poly(amide fibers) (e.g., nylon 6 fibers, nylon 11 fibers), polycarbonate fibers, acrylic fibers, poly(4-methyl-1-pentene) fibers, polystyrene fibers, fluoropolymer fibers (e.g., poly(vinylidene fluoride) fibers), poly(ether sulfone) fibers, ethylene vinyl acetate fibers, ethylene vinyl alcohol fibers, poly(vinyl alcohol) fibers, poly(phenylene sulfide) fibers, and poly(lactic acid) fibers. One example of a natural fiber is a chitosan fiber.

When present, an efficiency layer may comprise synthetic fibers having a variety of suitable average diameters. Each efficiency layer in the filter media may independently comprise synthetic fibers having an average diameter of greater than or equal to 0.05 microns, greater than or equal to 0.1 micron, greater than or equal to 0.2 microns, greater than or equal to 0.5 microns, greater than or equal to 1 micron, greater than or equal to 2 microns, greater than or equal to 3 microns, greater than or equal to 5 microns, or greater than or equal to 10 microns. Each efficiency layer in the filter media may independently comprise synthetic fibers having an average diameter of less than or equal to 12 microns, less than or equal to 10 microns, less than or equal to 5 microns, less than or equal to 3 microns, less than or equal to 2 microns, less than or equal to 1 micron, less than or equal to 0.5 microns, less than or equal to 0.2 microns, or less than or equal to 0.1 micron. Combinations of the above-referenced ranges are also possible (e.g., greater than or equal to 0.05 microns and less than or equal to 12 microns, greater than or equal to 0.2 microns and less than or equal to 3 microns, or greater than or equal to 0.2 microns and less than or equal to 2 microns). Other ranges are also possible.

When present, an efficiency layer may comprise synthetic fibers having a variety of suitable average lengths. The fibers may comprise staple fibers and/or continuous fibers. Each efficiency layer in the filter media may independently comprise synthetic fibers having an average length of greater than or equal to 0.01 mm, greater than or equal to 0.02 mm, greater than or equal to 0.05 mm, greater than or equal to 0.1 mm, greater than or equal to 0.2 mm, greater than or equal to 0.5 mm, greater than or equal to 1 mm, greater than or equal to 2 mm, greater than or equal to 5 mm, greater than or equal to 10 mm, greater than or equal to 20 mm, greater than or equal to 50 mm, greater than or equal to 90 mm, greater than or equal to 100 mm, greater than or equal to 200 mm, greater than or equal to 250 mm, greater than or equal to 300 mm, greater than or equal to 400 mm, greater than or equal to 500 mm, greater than or equal to 750 mm, greater than or equal to 1 m, greater than or equal to 2 m, greater than or equal to 5 m, greater than or equal to 10 m, greater than or equal to 20 m, greater than or equal to 50 m, or greater than or equal to 100 m. Each efficiency layer in the filter media may independently comprise synthetic fibers having an average length of less than or equal to 200 m, less than or equal to 100 m, less than or equal to 50 m, less than or equal to 20 m, less than or equal to 10 m, less than or equal to 5 m, less than or equal to 2 m, less than or equal to 1 m, less than or equal to 750 mm, less than or equal to 500 mm, less than or equal to 400 mm, less than or equal to 300 mm, less than or equal to 250 mm, less than or equal to 200 mm, less than or equal to 100 mm, less than or equal to 90 mm, less than or equal to 50 mm, less than or equal to 20 mm, less than or equal to 10 mm, less than or equal to 5 mm, less than or equal to 2 mm, less than or equal to 1 mm, less than or equal to 0.5 mm, or less than or equal to 0.2 mm. Combinations of the above-referenced ranges are also possible (e.g., greater than or equal to 0.01 mm and less than or equal to 200 m, greater than or equal to 0.01 mm and less than or equal to 500 mm, greater than or equal to 50 mm and less than or equal to 300 mm, or greater than or equal to 90 mm and less than or equal to 250 mm). Other ranges are also possible.

When present, an efficiency layer may have a variety of suitable basis weights. The basis weights of efficiency layers in which undulations have yet to be formed tend to be lower than those that comprise one or more sets of undulations. Forming undulations in an efficiency layer tends to increase the amount of the efficiency layer per area of filter media footprint, and thus tends to increase the basis weight of the efficiency layer. As described above, fabrication of a filter media may comprise forming undulations in an initially un-undulated efficiency layer that then undergoes one or more processes to form one or more sets of undulations. For this reason, it may be more facile to refer to the basis weights of efficiency layers prior to undulation. These basis weights are equivalent to the basis weights of the efficiency layers if extended to remove all undulations therein.

Each efficiency layer in the filter media may independently have a basis weight prior to undulation of greater than or equal to 0.02 $g/m^2$, greater than or equal to 0.05 $g/m^2$, greater than or equal to 0.1 $g/m^2$, greater than or equal to 0.2 $g/m^2$, greater than or equal to 0.5 $g/m^2$, greater than or equal to 1 $g/m^2$, greater than or equal to 2 $g/m^2$, greater than or equal to 5 $g/m^2$, greater than or equal to 10 $g/m^2$, greater than or equal to 20 $g/m^2$, greater than or equal to 30 $g/m^2$, greater than or equal to 40 $g/m^2$, greater than or equal to 50 $g/m^2$, or greater than or equal to 75 $g/m^2$. Each efficiency layer in the filter media may independently have a basis weight prior to undulation of less than or equal to 100 $g/m^2$, less than or equal to 75 $g/m^2$, less than or equal to 50 $g/m^2$, less than or equal to 40 $g/m^2$, less than or equal to 30 $g/m^2$, less than or equal to 20 $g/m^2$, less than or equal to 10 $g/m^2$, less than or equal to 5 $g/m^2$, less than or equal to 2 $g/m^2$, less than or equal to 1 $g/m^2$, less than or equal to 0.5 $g/m^2$, less than or equal to 0.2 $g/m^2$, less than or equal to 0.1 $g/m^2$, or less than or equal to 0.05 $g/m^2$. Combinations of the above-referenced ranges are also possible (e.g., greater than or equal to 0.02 $g/m^2$ and less than or equal to 100 $g/m^2$, greater than or equal to 0.05 $g/m^2$ and less than or equal to 50 $g/m^2$, or greater than or equal to 0.2 $g/m^2$ and less than or equal to 30 $g/m^2$). Other ranges are also possible.

As described above, efficiency layers comprising undulations on a single length scale may be provided. In some embodiments, an efficiency layer comprising undulations on a single length scale has a basis weight of greater than or equal to 0.08 $g/m^2$, greater than or equal to 0.1 $g/m^2$, greater than or equal to 0.125 $g/m^2$, greater than or equal to 0.15 $g/m^2$, greater than or equal to 0.2 $g/m^2$, greater than or equal to 0.25 $g/m^2$, greater than or equal to 0.3 $g/m^2$, greater than or equal to 0.4 $g/m^2$, greater than or equal to 0.5 $g/m^2$, greater than or equal to 0.75 $g/m^2$, greater than or equal to 1 $g/m^2$, greater than or equal to 1.25 $g/m^2$, greater than or equal to 1.5 $g/m^2$, greater than or equal to 2 $g/m^2$, greater than or equal to 2.5 $g/m^2$, greater than or equal to 3 $g/m^2$, greater than or equal to 4 $g/m^2$, greater than or equal to 5 $g/m^2$, greater than or equal to 7.5 $g/m^2$, greater than or equal to 10 $g/m^2$, greater than or equal to 12.5 $g/m^2$, greater than or equal to 15 $g/m^2$, greater than or equal to 20 $g/m^2$, greater than or equal to 25 $g/m^2$, greater than or equal to 30 $g/m^2$, greater than or equal to 40 $g/m^2$, greater than or equal to 50 g/m², greater than or equal to 75 g/m², greater than or equal to 100 g/m², greater than or equal to 125 g/m², greater than or equal to 150 g/m², greater than or equal to 200 g/m², greater than or equal to 250 g/m², greater than or equal to 300 g/m², greater than or equal to 400 g/m², or greater than or equal to 500 g/m². In some embodiments, an efficiency layer comprising undulations on a single length scale has a basis weight of less than or equal to 500 g/m², less than or equal to 400 g/m², less than or equal to 300 g/m², less than or equal to 250 g/m², less than or equal to 200 g/m², less than or equal to 150 g/m², less than or equal to 125 g/m², less than or equal to 100 g/m², less than or equal to 75 g/m², less than or equal to 50 g/m², less than or equal to 40 g/m², less than or equal to 30 g/m², less than or equal to 25 g/m², less than or equal to 20 g/m², less than or equal to 15 g/m², less than or equal to 12.5 g/m², less than or equal to 10 g/m², less than or equal to 7.5 g/m², less than or equal to 5 g/m², less than or equal to 4 g/m², less than or equal to 3 g/m², less than or equal to 2.5 g/m², less than or equal to 2 g/m², less than or equal to 1.5 g/m², less than or equal to 1.25 g/m², less than or equal to 1 g/m², less than or equal to 0.75 g/m², less than or equal to 0.5 g/m², less than or equal to 0.4 g/m², less than or equal to 0.3 g/m², less than or equal to 0.25 g/m², less than or equal to 0.2 g/m², less than or equal to 0.15 g/m², less than or equal to 0.125 g/m², or less than or equal to 0.1 g/m². Combinations of the above-referenced ranges are also possible (e.g., greater than or equal to 0.08 g/m² and less than or equal to 500 g/m², greater than or equal to 0.2 g/m² and less than or equal to 250 g/m², or greater than or equal to 0.8 g/m² and less than or equal to 150 g/m²). Other ranges are also possible. If a filter media comprises two or more efficiency layers comprising undulations on a single length scale, each efficiency layer may independently have a basis weight in one or more of the ranges listed above.

When present, an efficiency layer may have a variety of suitable thicknesses. As described above with respect to the basis weight of the efficiency layer, the thicknesses of the efficiency layers that in which undulations have yet to be formed tend to be lower than those that comprise one or more sets of undulations. As described above, fabrication of a filter media may comprise forming undulations in an initially un-undulated efficiency layer that then undergoes one or more processes to form one or more sets of undulations. For this reason, it may be more facile to refer to the thicknesses of efficiency layers prior to undulation. These thicknesses are equivalent to the thicknesses of the efficiency layers if extended to remove all undulations therein Each efficiency layer in the filter media may independently have a thickness prior to undulation of greater than or equal to 0.001 mm, greater than or equal to 0.002 mm, greater than or equal to 0.005 mm, greater than or equal to 0.01 mm, greater than or equal to 0.02 mm, greater than or equal to 0.05 mm, greater than or equal to 0.075 mm, greater than or equal to 0.1 mm, greater than or equal to 0.13 mm, greater than or equal to 0.2 mm, greater than or equal to 0.3 mm, greater than or equal to 0.4 mm, greater than or equal to 0.5 mm, greater than or equal to 0.7 mm, greater than or equal to 1 mm, greater than or equal to 1.25 mm, greater than or equal to 1.5 mm, greater than or equal to 1.75 mm, greater than or equal to 2 mm, or greater than or equal to 2.25 mm. Each efficiency layer in the filter media may independently have a thickness prior to undulation of less than or equal to 2.5 mm, less than or equal to 2.25 mm, less than or equal to 2 mm, less than or equal to 1.75 mm, less than or equal to 1.5 mm, less than or equal to 1.25 mm, less than or equal to 1 mm, less than or equal to 0.7 mm, less than or equal to 0.5 mm, less than or equal to 0.4 mm, less than or equal to 0.3 mm, less than or equal to 0.2 mm, less than or equal to 0.13 mm, less than or equal to 0.1 mm, less than or equal to 0.075 mm, less than or equal to 0.05 mm, less than or equal to 0.02 mm, less than or equal to 0.01 mm, less than or equal to 0.005 mm, or less than or equal to 0.002 mm. Combinations of the above-referenced ranges are also possible (e.g., greater than or equal to 0.001 mm and less than or equal to 2.5 mm, greater than or equal to 0.01 mm and less than or equal to 2.5 mm, greater than or equal to 0.1 mm and less than or equal to 0.7 mm, or greater than or equal to 0.13 mm and less than or equal to 0.3 mm). Other ranges are also possible.

As described above, efficiency layers comprising undulations on a single length scale may be provided. In some embodiments, an efficiency layer comprising undulations on a single length scale has a thickness of greater than or equal to 1.5 mm, greater than or equal to 2 mm, greater than or equal to 2.5 mm, greater than or equal to 3 mm, greater than or equal to 4 mm, greater than or equal to 5 mm, greater than or equal to 7.5 mm, greater than or equal to 10 mm, or greater than or equal to 12.5 mm. In some embodiments, an efficiency layer comprising undulations on a single length scale has a thickness of less than or equal to 15 mm, less than or equal to 12.5 mm, less than or equal to 10 mm, less than or equal to 7.5 mm, less than or equal to 5 mm, less than or equal to 4 mm, less than or equal to 3 mm, less than or equal to 2.5 mm, or less than or equal to 2 mm. Combinations of the above-referenced ranges are also possible (e.g., greater than or equal to 1.5 mm and less than or equal to 15 mm). Other ranges are also possible. If a filter media comprises two or more efficiency layers comprising undulations on a single length scale, each efficiency layer may independently have a thickness in one or more of the ranges listed above.

The thickness of efficiency layers with thicknesses of less than or equal to 0.025 mm may be determined by cross-sectional SEM. The thickness of efficiency layers with thicknesses of greater than 0.025 mm may be determined by Edana WSP 120.1 Standard (2005) with a pressure foot selected to have a 2 ounce load and a 1 square inch area.

When present, an efficiency layer may have a variety of suitable mean flow pore sizes. Each efficiency layer in the filter media may independently have a mean flow pore size of greater than or equal to 2 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 17.5 microns, greater than or equal to 20 microns, or greater than or equal to 22.5 microns. Each efficiency layer in the filter media may independently have a mean flow pore size of less than or equal to 25 microns, less than or equal to 22.5 microns, less than or equal to 20 microns, less than or equal to 17.5 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, less than or equal to 6 microns, or less than or equal to 5 microns. Combinations of the above-referenced ranges are also possible (e.g., greater than or equal to 2 microns and less than or equal to 25 microns, greater than or equal to 5 microns and less than or equal to 15 microns, or greater than or equal to 7 microns and less than or equal to 12 microns).

Other ranges are also possible. The mean flow pore size of an efficiency layer may be determined in accordance with ASTM F316 (2011).

When present, an efficiency layer may have a variety of suitable solidities. Each efficiency layer in the filter media may independently have a solidity of greater than or equal to 0.5%, greater than or equal to 1%, greater than or equal to 1.5%, greater than or equal to 2%, greater than or equal to 2.5%, greater than or equal to 3%, greater than or equal to 3.5%, greater than or equal to 4%, greater than or equal to 5%, greater than or equal to 6%, greater than or equal to 7%, greater than or equal to 8%, or greater than or equal to 10%. Each efficiency layer in the filter media may independently have a solidity of less than or equal to 12%, less than or equal to 10%, less than or equal to 8%, less than or equal to 7%, less than or equal to 6%, less than or equal to 5%, less than or equal to 4%, less than or equal to 3.5%, less than or equal to 3%, less than or equal to 2.5%, less than or equal to 2%, less than or equal to 1.5%, or less than or equal to 1%. Combinations of the above-referenced ranges are also possible (e.g., greater than or equal to 0.5% and less than or equal to 12%, greater than or equal to 2% and less than or equal to 8%, or greater than or equal to 2.5% and less than or equal to 6%). Other ranges are also possible.

The solidity of an efficiency layer may be determined by using the following formula: solidity=[basis weight/(fiber density*thickness)]*100%. The basis weight and thickness may be determined as described elsewhere herein. The fiber density is equivalent to the average density of the material or material(s) forming the fiber, which is typically specified by the fiber manufacturer. The average density of the materials forming the fibers may be determined by: (1) determining the total volume of all of the fibers in the filter media; and (2) dividing the total mass of all of the fibers in the filter media by the total volume of all of the fibers in the filter media. If the mass and density of each type of fiber in the filter media are known, the volume of all the fibers in the filter media may be determined by: (1) for each type of fiber, dividing the total mass of the type of fiber in the filter media by the density of the type of fiber; and (2) summing the volumes of each fiber type. If the mass and density of each type of fiber in the filter media are not known, the volume of all the fibers in the filter media may be determined in accordance with Archimedes' principle.

When present, an efficiency layer may have a variety of suitable stiffnesses. In some embodiments, an efficiency layer is a layer with a relatively low stiffness. Each efficiency layer in the filter media may independently have a stiffness of greater than or equal to 1 mg, greater than or equal to 2 mg, greater than or equal to 3 mg, greater than or equal to 4 mg, greater than or equal to 5 mg, greater than or equal to 6 mg, greater than or equal to 8 mg, greater than or equal to 10 mg, greater than or equal to 15 mg, greater than or equal to 20 mg, greater than or equal to 25 mg, greater than or equal to 30 mg, greater than or equal to 40 mg, greater than or equal to 50 mg, or greater than or equal to 75 mg. Each efficiency layer in the filter media may independently have a stiffness of less than or equal to 100 mg, less than or equal to 75 mg, less than or equal to 50 mg, less than or equal to 40 mg, less than or equal to 30 mg, less than or equal to 25 mg, less than or equal to 20 mg, less than or equal to 15 mg, less than or equal to 10 mg, less than or equal to 8 mg, less than or equal to 6 mg, less than or equal to 5 mg, less than or equal to 4 mg, less than or equal to 3 mg, or less than or equal to 2 mg. Combinations of the above-referenced ranges are also possible (e.g., greater than or equal to 1 mg and less than or equal to 100 mg, greater than or equal to 1 mg and less than or equal to 50 mg, greater than or equal to 3 mg and less than or equal to 30 mg, or greater than or equal to 5 mg and less than or equal to 10 mg). Other ranges are also possible. The stiffness of an efficiency layer may be determined in accordance with WSP 90.2 (2015).

When present, an efficiency layer may have a variety of suitable pressure drops. Each efficiency layer in the filter media may independently have a pressure drop of greater than or equal to 0.5 mm $H_2O$, greater than or equal to 0.75 mm $H_2O$, greater than or equal to 1 mm $H_2O$, greater than or equal to 1.2 mm $H_2O$, greater than or equal to 1.5 mm $H_2O$, greater than or equal to 2 mm $H_2O$, greater than or equal to 2.5 mm $H_2O$, greater than or equal to 3 mm $H_2O$, greater than or equal to 3.5 mm $H_2O$, greater than or equal to 4 mm $H_2O$, greater than or equal to 5 mm $H_2O$, greater than or equal to 6 mm $H_2O$, greater than or equal to 7 mm $H_2O$, greater than or equal to 8 mm $H_2O$, or greater than or equal to 10 mm $H_2O$. Each efficiency layer in the filter media may independently have a pressure drop of less than or equal to 12 mm $H_2O$, less than or equal to 10 mm $H_2O$, less than or equal to 8 mm $H_2O$, less than or equal to 7 mm $H_2O$, less than or equal to 6 mm $H_2O$, less than or equal to 5 mm $H_2O$, less than or equal to 4 mm $H_2O$, less than or equal to 3.5 mm $H_2O$, less than or equal to 3 mm $H_2O$, less than or equal to 2.5 mm $H_2O$, less than or equal to 2 mm $H_2O$, less than or equal to 1.5 mm $H_2O$, less than or equal to 1.2 mm $H_2O$, less than or equal to 1 mm $H_2O$, or less than or equal to 0.75 mm $H_2O$. Combinations of the above-referenced ranges are also possible (e.g., greater than or equal to 0.5 mm $H_2O$ and less than or equal to 12 mm $H_2O$, greater than or equal to 1 mm $H_2O$ and less than or equal to 7 mm $H_2O$, or greater than or equal to 1.2 mm $H_2O$ and less than or equal to 3.5 mm $H_2O$). The pressure drop of an efficiency layer may be determined by employing a TSI 8130 Automated Filter Tester as described above with respect to the measurement of gamma.

When present, an efficiency layer may have a variety of suitable air permeabilities. Each efficiency layer in the filter media may independently have an air permeability of greater than or equal to 2 CFM, greater than or equal to 5 CFM, greater than or equal to 10 CFM, greater than or equal to 15 CFM, greater than or equal to 20 CFM, greater than or equal to 30 CFM, greater than or equal to 40 CFM, greater than or equal to 50 CFM, greater than or equal to 70 CFM, greater than or equal to 90 CFM, greater than or equal to 100 CFM, greater than or equal to 120 CFM, greater than or equal to 150 CFM, greater than or equal to 175 CFM, greater than or equal to 200 CFM, or greater than or equal to 225 CFM. Each efficiency layer in the filter media may independently have an air permeability of less than or equal to 250 CFM, less than or equal to 225 CFM, less than or equal to 200 CFM, less than or equal to 175 CFM, less than or equal to 150 CFM, less than or equal to 120 CFM, less than or equal to 100 CFM, less than or equal to 90 CFM, less than or equal to 70 CFM, less than or equal to 50 CFM, less than or equal to 40 CFM, less than or equal to 30 CFM, less than or equal to 20 CFM, less than or equal to 15 CFM, less than or equal to 10 CFM, or less than or equal to 5 CFM. Combinations of the above-referenced ranges are also possible (e.g., greater than or equal to 2 CFM and less than or equal to 250 CFM, greater than or equal to 20 CFM and less than or equal to 120 CFM, or greater than or equal to 40 CFM and less than or equal to 90 CFM). Other ranges are also possible. The air permeability of an efficiency layer may be determined in accordance with ASTM Test Standard D737 (1996) under a pressure drop of 125 Pa on a sample with a test area of 38 $cm^2$.

When present, an efficiency layer may be charged or may be uncharged. In some embodiments, a filter media comprises at least one charged efficiency layer and at least one uncharged efficiency layer. In some embodiments, a filter media comprises an efficiency layer that is a charged meltblown fiber web. Charge may be induced on the efficiency layer by a variety of suitable charging process, non-limiting examples of which include an electrostatic charging process, a triboelectric charging process, and a hydro charging process. In some embodiments, a filter media comprises a charged electrospun efficiency layer which acquired its charge during electrospinning.

A hydro charging process may comprise impinging jets and/or streams of water droplets onto an initially uncharged efficiency layer to cause it to become charged electrostatically. At the conclusion of the hydro charging process, the efficiency layer may have an electret charge. The jets and/or streams of water droplets may impinge on the efficiency layer at a variety of suitable pressures, such as a pressure of between 10 to 50 psi, and may be provided by a variety of suitable sources, such as a sprayer. In some embodiments, an efficiency layer is hydro charged by using an apparatus that may be employed for the hydroentanglement of fibers which is operated at a lower pressure than is typical for the hydroentangling process. The water impinging on the efficiency layer may be relatively pure; for instance, it may be distilled water and/or deionized water. After electrostatic charging in this manner, the efficiency layer may be dried, such as with air dryer.

In some embodiments, an efficiency layer is hydro charged while being moved laterally. The efficiency layer may be transported on a porous belt, such as a screen or mesh-type conveyor belt. As it is being transported on the porous belt, it may be exposed to a spray and/or jets of water pressurized by a pump. The water jets and/or spray may impinge on the efficiency layer and/or penetrate therein. In some embodiments, a vacuum is provided beneath the porous transport belt, which may aid the passage of water through the efficiency layer and/or reduce the amount of time and energy necessary for drying the efficiency layer at the conclusion of the hydro charging process.

As described above, some filter media herein comprise a layer that is a scrim. Some filter media comprise two or more layers that are scrims. The scrim(s) may be a layer that is fairly open. For instance, the scrim(s) may have a relatively high air permeability (e.g., in excess of 1000 CFM) and/or a relatively low pressure drop (e.g., a pressure drop that does not contribute appreciably to the pressure drop of the filter media as a whole). A filter media may comprise a scrim that supports one or more other layers (e.g., one or more efficiency layers and/or one or more nanofiber layers) while not adding appreciably to the pressure drop of the filter media. Some scrims may be layers that are capable of undergoing a reversible stretch. In some embodiments, as also described above, a filter media comprises a scrim that holds one or more other layers (e.g., one or more efficiency layers and/or one or more nanofiber layers) in a manner such that the filter media comprises a plurality of peaks that are irregular in one or more ways. For instance, it may hold one or more other layers such that they are undulated and the undulations are irregular in one or more ways. Some filter media may comprise a scrim that protects one or more layers of a filter media, such as one or more layers of a filter media held by another scrim in a manner such that the filter media comprises a plurality of peaks that are irregular in one or more ways. Some scrims may be positioned adjacent to an efficiency layer and/or may be adhered to an efficiency layer by an adhesive.

A variety of suitable scrims may be employed in the filter media described herein. In some embodiments, a filter media comprises a scrim that is fibrous. For instance, a filter media may comprise a scrim that is a non-woven fiber web, such as a spunbond fiber web. As another example, a filter media may comprise a scrim that is a mesh, such as an extruded mesh. As a third example, a filter media may comprise a scrim that is a woven material. In some embodiments, a scrim may comprise elastically extensible fibers that are not in direct contact with each other. The scrim or scrims may be cut from a material hundreds of yards in length wound around a roll and/or from a creel.

When a filter media comprises a spunbond scrim, the spunbond scrim may comprise a variety of suitable types of spunbond fibers. A spunbond scrim may comprise fibers that are synthetic fibers, such as polyolefin fibers (e.g., poly (propylene) fibers), polyester fibers, and/or nylon fibers.

When a filter media comprises a spunbond scrim, the spunbond scrim may comprise fibers having a variety of suitable average diameters. The spunbond scrim may comprise fibers having an average diameter of greater than or equal to 1 micron, greater than or equal to 2 microns, greater than or equal to 5 microns, greater than or equal to 7.5 microns, greater than or equal to 10 microns, greater than or equal to 12.5 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. The spunbond scrim may comprise fibers having an average diameter of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 12.5 microns, less than or equal to 10 microns, less than or equal to 7.5 microns, less than or equal to 5 microns, or less than or equal to 2 microns. Combinations of the above-referenced ranges are also possible (e.g., greater than or equal to 1 micron and less than or equal to 50 microns, or greater than or equal to 15 microns and less than or equal to 35 microns). Other ranges are also possible.

When a filter media comprises a spunbond scrim, the fibers therein may be continuous.

In some embodiments, a scrim (e.g., a mesh scrim, a non-woven scrim, a woven scrim, a scrim comprising elastically extensible fibers that are not in direct contact with each other) comprises fibers that are elastically extensible. In other words, the scrim may comprise fibers that can be stretched to a relatively high elongation without breaking and then allowed to recover to a length close to or identical to their length prior to being stretched. This may be advantageous for scrims capable of undergoing a reversible stretch, such as scrims onto which one or more other layers are deposited when the scrim is in a reversibly stretched state. Some elastically extensible fibers may be capable of being stretched up to 1.5 times their initial length without breaking and may then recover to a length close to or identical to their length prior to being stretched. In some embodiments, a scrim comprises elastically extensible fibers capable of being stretched up to 1.75, 2, 2.25, 2.5, 2.75, 3, 3.25, 3.5, 3.75, 4, 4.5, 5, 5.5, 6, 6.5, 7, 7.5, 8, 8.5, 9, 9.5, or 10 times their initial length without breaking and may then recover to a length close to or identical to their length prior to being stretched. Combinations of the above-referenced ranges are also possible (e.g., greater than or equal to 1 and less than or equal to 10). Other ranges are also possible.

Non-limiting examples of suitable elastically extensible fibers include fibers comprising elastomeric materials, such as fibers comprising block copolymers (e.g., block copolymers comprising styrene, such as Kraton) and fibers comprising polyurethane elastomers (e.g., Spandex fibers).

When present, a scrim may comprise elastically extensible fibers having a variety of suitable average diameters. A scrim may comprise elastically extensible fibers having an average diameter of greater than or equal to 0.2 mm, greater than or equal to 0.25 mm, greater than or equal to 0.3 mm, greater than or equal to 0.35 mm, greater than or equal to 0.4 mm, greater than or equal to 0.5 mm, greater than or equal to 0.6 mm, greater than or equal to 0.7 mm, greater than or equal to 0.8 mm, greater than or equal to 1 mm, or greater than or equal to 1.5 mm. A scrim may comprise elastically extensible fibers having an average diameter of less than or equal to 2 mm, less than or equal to 1.5 mm, less than or equal to 1 mm, less than or equal to 0.8 mm, less than or equal to 0.7 mm, less than or equal to 0.6 mm, less than or equal to 0.5 mm, less than or equal to 0.4 mm, less than or equal to 0.35 mm, less than or equal to 0.3 mm, or less than or equal to 0.25 mm. Combinations of the above-referenced ranges are also possible (e.g., greater than or equal to 0.2 mm and less than or equal to 2 mm, greater than or equal to 0.3 mm and less than or equal to 2 mm, or greater than or equal to 0.3 mm and less than 0.8 mm). Other ranges are also possible.

When present, a scrim may comprise elastically extensible fibers having a variety of suitable average lengths. A scrim may comprise elastically extensible fibers having an average length of greater than or equal to 5 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1 m, greater than or equal to 2 m, greater than or equal to 5 m, greater than or equal to 10 m, greater than or equal to 20 m, greater than or equal to 50 m, or greater than or equal to 100 m. In some embodiments, the elastically extensible fibers may be continuous fibers. A scrim may comprise elastically extensible fibers having an average length of less than or equal to 200 m, less than or equal to 100 m, less than or equal to 50 m, less than or equal to 20 m, less than or equal to 10 m, less than or equal to 5 m, less than or equal to 2 m, less than or equal to 1 m, less than or equal to 750 mm, less than or equal to 500 mm, less than or equal to 400 mm, less than or equal to 300 mm, less than or equal to 250 mm, less than or equal to 200 mm, less than or equal to 100 mm, less than or equal to 90 mm, less than or equal to 50 mm, less than or equal to 20 mm, or less than or equal to 10 mm. Combinations of the above-referenced ranges are also possible (e.g., greater than or equal to 5 mm and less than or equal to 100 m). Other ranges are also possible. The elastically extensible fibers may extend throughout a source of the scrim, such as a throughout a material round around a roll or forming a creel.

As described above, some scrims may be relatively extensible. When present, a scrim as a whole may be capable of being stretched to a relatively high elongation without breaking and then allowed to recover to a length close to or identical to its length prior to being stretched. In some embodiments, a scrim may be capable of undergoing a reversible stretch of greater than or equal to 50%, greater than or equal to 75%, greater than or equal to 100%, greater than or equal to 125%, greater than or equal to 150%, greater than or equal to 175%, greater than or equal to 200%, greater than or equal to 225%, greater than or equal to 250%, greater than or equal to 275%, greater than or equal to 300%, greater than or equal to 325%, greater than or equal to 350%, greater than or equal to 375%, greater than or equal to 400%, greater than or equal to 450%, greater than or equal to 500%, greater than or equal to 600%, or greater than or equal to 800%. In some embodiments, a scrim may be capable of undergoing a reversible stretch of less than or equal to 1000%, less than or equal to 800%, less than or equal to 600%, less than or equal to 500%, less than or equal to 450%, less than or equal to 400%, less than or equal to 375%, less than or equal to 350%, less than or equal to 325%, less than or equal to 300%, less than or equal to 275%, less than or equal to 250%, less than or equal to 225%, less than or equal to 200%, less than or equal to 175%, less than or equal to 150%, less than or equal to 125%, less than or equal to 100%, or less than or equal to 75%. Combinations of the above-referenced ranges are also possible (e.g., greater than or equal to 50% and less than or equal to 1000%, greater than or equal to 100% and less than or equal to 400%, or greater than or equal to 200% and less than or equal to 300%). Other ranges are also possible.

When present, a scrim may have a variety of suitable basis weights. The basis weights of scrims that in which undulations have yet to be formed tend to be lower than those that comprise one or more sets of undulations. Forming undulations in a scrim tends to increase the amount of the scrim per area of filter media footprint, and thus tends to increase the basis weight of the scrim. As described above, fabrication of a filter media may comprise forming undulations in an initially un-undulated scrim that then undergoes one or more processes to form one or more sets of undulations. For this reason, it may be more facile to refer to the basis weights of scrims prior to undulation. These basis weights are equivalent to the basis weights of the scrims if extended to remove all undulations therein.

A scrim may have a basis weight prior to undulation of greater than or equal to 5 $g/m^2$, greater than or equal to 7.5 $g/m^2$, greater than or equal to 10 $g/m^2$, greater than or equal to 15 $g/m^2$, greater than or equal to 20 $g/m^2$, greater than or equal to 25 $g/m^2$, greater than or equal to 30 $g/m^2$, greater than or equal to 40 $g/m^2$, greater than or equal to 50 $g/m^2$, greater than or equal to 60 $g/m^2$, greater than or equal to 70 $g/m^2$, greater than or equal to 80 $g/m^2$, or greater than or equal to 100 $g/m^2$. A scrim may have a basis weight prior to undulation of less than or equal to 120 $g/m^2$, less than or equal to 100 $g/m^2$, less than or equal to 80 $g/m^2$, less than or equal to 70 $g/m^2$, less than or equal to 60 $g/m^2$, less than or equal to 50 $g/m^2$, less than or equal to 40 $g/m^2$, less than or equal to 30 $g/m^2$, less than or equal to 25 $g/m^2$, less than or equal to 20 $g/m^2$, less than or equal to 15 $g/m^2$, less than or equal to 10 $g/m^2$, or less than or equal to 7.5 $g/m^2$. Combinations of the above-referenced ranges are also possible (e.g., greater than or equal to 5 $g/m^2$ and less than or equal to 120 $g/m^2$, greater than or equal to 20 $g/m^2$ and less than or equal to 80 $g/m^2$, or greater than or equal to 40 $g/m^2$ and less than or equal to 60 $g/m^2$). Other ranges are also possible. The basis weight of a scrim may be determined by weighing a scrim of known area and then dividing the measured weight by the known area.

When present, a scrim may have a variety of suitable thicknesses. The thicknesses of scrims in which undulations have yet to be formed, tend to be lower than those that comprise one or more sets of undulations. As described above, fabrication of a filter media may comprise forming undulations in an initially un-undulated scrim that then undergoes one or more processes to form one or more sets of undulations. For this reason, it may be more facile to refer to the thicknesses of scrims prior to undulation. These thicknesses are equivalent to the thicknesses of the scrims if extended to remove all undulations therein.

A scrim may have a thickness prior to undulation of greater than or equal to 0.1 mm, greater than or equal to 0.15 mm, greater than or equal to 0.2 mm, greater than or equal to 0.25 mm, greater than or equal to 0.3 mm, greater than or equal to 0.35 mm, greater than or equal to 0.4 mm, greater than or equal to 0.45 mm, greater than or equal to 0.5 mm, greater than or equal to 0.55 mm, greater than or equal to 0.6 mm, greater than or equal to 0.65 mm, greater than or equal to 0.7 mm, greater than or equal to 0.8 mm, greater than or equal to 0.9 mm, greater than or equal to 1 mm, greater than or equal to 1.5 mm, greater than or equal to 2 mm, greater than or equal to 3 mm, or greater than or equal to 4 mm. A scrim may have a thickness prior to undulation of less than or equal to 5 mm, less than or equal to 4 mm, less than or equal to 3 mm, less than or equal to 2 mm, less than or equal to 1.5 mm, less than or equal to 1 mm, less than or equal to 0.9 mm, less than or equal to 0.8 mm, less than or equal to 0.7 mm, less than or equal to 0.65 mm, less than or equal to 0.6 mm, less than or equal to 0.55 mm, less than or equal to 0.5 mm, less than or equal to 0.45 mm, less than or equal to 0.4 mm, less than or equal to 0.35 mm, less than or equal to 0.3 mm, less than or equal to 0.25 mm, less than or equal to 0.2 mm, or less than or equal to 0.15 mm. Combinations of the above-referenced ranges are also possible (e.g., greater than or equal to 0.1 mm and less than or equal to 5 mm, greater than or equal to 0.3 mm and less than or equal to 1 mm, or greater than or equal to 0.4 mm and less than or equal to 0.6 mm). The thickness of a scrim may be determined by Edana WSP 120.1 Standard (2005) with a pressure foot selected to have a 2 ounce load and a 1 square inch area.

As described above, some scrims may be relatively open. When present, a scrim may comprise openings that may be parametrized by a longest line that has endpoints on the outer boundary of the opening and passes over the opening. This line would be equivalent to a diameter for a circular opening or to a diagonal for a rectangular opening. In some embodiments, a scrim comprises openings having a longest line that has endpoints on the outer boundary of the opening and passes over the opening of greater than or equal to 0.1 inch, greater than or equal to 0.15 inches, greater than or equal to 0.2 inches, greater than or equal to 0.25 inches, greater than or equal to 0.3 inches, greater than or equal to 0.35 inches, greater than or equal to 0.4 inches, or greater than or equal to 0.45 inches. A scrim may comprise openings having a longest line that has endpoints on the outer boundary of the opening and passes over the opening of less than or equal to 0.5 inches, less than or equal to 0.45 inches, less than or equal to 0.4 inches, less than or equal to 0.35 inches, less than or equal to 0.3 inches, less than or equal to 0.25 inches, less than or equal to 0.2 inches, or less than or equal to 0.15 inches. Combinations of the above-referenced ranges are also possible (e.g., greater than or equal to 0.1 inch and less than or equal to 0.5 inches). Other ranges are also possible. The openings may have a variety of shapes (e.g., square, rectangular, and the like).

As described above, some filter media comprise a nanofiber layer. The nanofiber layer may improve the filtration performance of the filter media. In some embodiments, a nanofiber layer functions as an efficiency layer. In such cases, the nanofiber layer may have one or more properties described herein with respect to efficiency layers and/or may have one or more properties described herein with respect to nanofiber layers. When present, the nanofiber layer may be positioned in a variety of suitable locations in the filter media, such as the upstream-most layer, the downstream-most layer, or a layer for which there are both one or more layers positioned upstream and one or more layers positioned downstream. In other words, it may be a first layer, a second layer, a third layer, a fourth layer, or another layer. In some embodiments, a filter media comprises more than one nanofiber layer. For instance, a filter media may comprise a first layer and a second layer that are nanofiber layers, a second layer and a third layer that are nanofiber layers, a first layer and a third layer that are nanofiber layers, or any other combination of layers that are nanofiber layers. In some embodiments, a filter media comprises a nanofiber layer and a scrim layer positioned on opposite sides of another efficiency layer (e.g., a meltblown efficiency layer, another nanofiber efficiency layer).

Some nanofiber layers described herein are fibrous. For instance, a nanofiber layer may be a non-woven fiber web. In some embodiments, the non-woven fiber web is an electrospun fiber web, a meltblown fiber web, or a centrifugal spun fiber web and/or comprises electrospun fibers, meltblown fibers, and/or centrifugal spun fibers. A nanofiber layer may comprise synthetic fibers and/or natural fibers. Non-limiting examples of synthetic fibers include nylon fibers (e.g., nylon 6 fibers), poly(vinylidene fluoride) fibers, poly(ether sulfone) fibers, polyester fibers, polycarbonate fibers, and/or poly(lactic acid) fibers. One example of a natural fiber is a chitosan fiber.

When present, a nanofiber layer may comprise synthetic fibers having a variety of suitable average diameters. Each nanofiber layer in the filter media may independently comprise synthetic fibers having an average diameter of greater than or equal to 20 nm, greater than or equal to 50 nm, greater than or equal to 75 nm, greater than or equal to 100 nm, greater than or equal to 200 nm, greater than or equal to 500 nm, or greater than or equal to 750 nm. Each nanofiber layer in the filter media may independently comprise synthetic fibers having an average diameter of less than or equal to 1 micron, less than or equal to 750 nm, less than or equal to 500 nm, less than or equal to 200 nm, less than or equal to 100 nm, less than or equal to 75 nm, or less than or equal to 50 nm. Combinations of the above-referenced ranges are also possible (e.g., greater than or equal to 20 nm and less than or equal to 1 micron). Other ranges are also possible.

When present, a nanofiber layer may comprise synthetic fibers having a variety of suitable average lengths. The fibers may comprise staple fibers and/or continuous fibers. Each nanofiber layer in the filter media may independently comprise synthetic fibers having an average length of greater than or equal to 0.2 mm, greater than or equal to 0.5 mm, greater than or equal to 1 mm, greater than or equal to 2 mm, greater than or equal to 5 mm, greater than or equal to 10 mm, greater than or equal to 15 mm, greater than or equal to 20 mm, greater than or equal to 25 mm, greater than or equal to 30 mm, greater than or equal to 40 mm, greater than or equal to 50 mm, greater than or equal to 75 mm, greater than or equal to 100 mm, greater than or equal to 150 mm, greater than or equal to 200 mm, greater than or equal to 250 mm, greater than or equal to 300 mm, greater than or equal to 350 mm, greater than or equal to 400 mm, greater than or equal to 450 mm, greater than or equal to 500 mm, greater than or equal to 750 mm, greater than or equal to 1 m, greater than or equal to 2 m, greater than or equal to 5 m, greater than or equal to 10 m, greater than or equal to 20 m, greater than or equal to 50 m, or greater than or equal to 100 m. Each nanofiber layer in the filter media may independently comprise synthetic fibers having an average length of less than or equal to 200 m, less than or equal to 100 m, less than or equal to 50 m, less than or equal to 20 m, less than or equal to 10 m, less than or equal to 5 m, less than or equal to 2 m, less than or equal to 1 m, less than or equal to 750 mm, less than or equal to 500 mm, less than or equal to 450 mm, less than or equal to 400 mm, less than or equal to 350 mm, less than or equal to 300 mm, less than or equal to 250 mm, less than or equal to 200 mm, less than or equal to 150 mm, less than or equal to 100 mm, less than or equal to 75 mm, less than or equal to 50 mm, less than or equal to 40 mm, less than or equal to 30 mm, less than or equal to 25 mm, less than or equal to 20 mm, less than or equal to 15 mm, less than or equal to 10 mm, less than or equal to 5 mm, less than or equal to 2 mm, less than or equal to 1 mm, or less than or equal to 0.5 mm. Combinations of the above-referenced ranges are also possible (e.g., greater than or equal to 0.2 mm and less than or equal to 100 m, greater than or equal to 0.2 mm and less than or equal to 500 mm, greater than or equal to 20 mm and less than or equal to 500 mm, or greater than or equal to 100 mm and less than or equal to 350 mm). Other ranges are also possible.

When present, a nanofiber layer may have a variety of suitable basis weights. The basis weights of nanofiber layers in which undulations have yet to be formed, tend to be lower than those that comprise one or more sets of undulations. Forming undulations in a nanofiber layers tends to increase the amount of the nanofiber layers per area of filter media footprint, and thus tends to increase the basis weight of the nanofiber layers. As described above, fabrication of a filter media may comprise forming undulations in an initially un-undulated nanofiber layers that then undergoes one or more processes to form one or more sets of undulations. For this reason, it may be more facile to refer to the basis weights of nanofiber layers prior to undulation. These basis weights are equivalent to the basis weights of the nanofiber layers if extended to remove all undulations therein.

Each nanofiber layer in the filter media may independently have a basis weight prior to undulation of greater than or equal to 0.02 g/m$^2$, greater than or equal to 0.03 g/m$^2$, greater than or equal to 0.04 g/m$^2$, greater than or equal to 0.05 g/m$^2$, greater than or equal to 0.075 g/m$^2$, greater than or equal to 0.1 g/m$^2$, greater than or equal to 0.2 g/m$^2$, greater than or equal to 0.5 g/m$^2$, greater than or equal to 1 g/m$^2$, greater than or equal to 1.5 g/m$^2$, greater than or equal to 2 g/m$^2$, greater than or equal to 3 g/m$^2$, or greater than or equal to 4 g/m$^2$. Each nanofiber layer in the filter media may independently have a basis weight prior to undulation of less than or equal to 5 g/m$^2$, less than or equal to 4 g/m$^2$, less than or equal to 3 g/m$^2$, less than or equal to 2 g/m$^2$, less than or equal to 1.5 g/m$^2$, less than or equal to 1 g/m$^2$, less than or equal to 0.5 g/m$^2$, less than or equal to 0.2 g/m$^2$, less than or equal to 0.1 g/m$^2$, less than or equal to 0.075 g/m$^2$, less than or equal to 0.05 g/m$^2$, less than or equal to 0.04 g/m$^2$, or less than or equal to 0.03 g/m$^2$. Combinations of the above-referenced ranges are also possible (e.g., greater than or equal to 0.02 g/m$^2$ and less than or equal to 5 g/m$^2$, greater than or equal to 0.05 g/m$^2$ and less than or equal to 3 g/m$^2$, or greater than or equal to 0.1 g/m$^2$ and less than or equal to 2 g/m$^2$). Other ranges are also possible.

In some embodiments, a nanofiber layer is provided with a carrier layer. The nanofiber may be directly adjacent to the carrier layer, or one or more layers may be positioned between the carrier layer and the nanofiber layer. In some embodiments, a filter media comprises a nanofiber layer and a carrier layer with adhesive positioned therebetween. The nanofiber layer may have been deposited onto the carrier layer during formation (e.g., during an electrospinning process). In some embodiments, the carrier layer supports the nanofiber layer and/or allows the nanofiber layer to be handled in a facile manner without undergoing damage.

Some carrier layers are fibrous. For instance, a carrier layer may be a non-woven fiber web, such as a meltblown fiber web and/or a carded fiber web. In some embodiments, a carrier layer comprises synthetic fibers, non-limiting examples of which include polypropylene fibers, polyester fibers, and nylon fibers.

When present, a carrier layer may comprise synthetic fibers having a variety of suitable average diameters. Each carrier layer in the filter media may independently comprise synthetic fibers having an average diameter of greater than or equal to 0.5 microns, greater than or equal to 0.75 microns, greater than or equal to 1 micron, greater than or equal to 1.25 microns, greater than or equal to 1.5 microns, greater than or equal to 1.75 microns, greater than or equal to 2 microns, greater than or equal to 2.25 microns, greater than or equal to 2.5 microns, greater than or equal to 2.75 microns, greater than or equal to 3 microns, greater than or equal to 4 microns, greater than or equal to 5 microns, greater than or equal to 7.5 microns, greater than or equal to 10 microns, greater than or equal to 12.5 microns, or greater than or equal to 15 microns. Each carrier layer in the filter media may independently comprise synthetic fibers having an average diameter of less than or equal to 20 microns, less than or equal to 15 microns, less than or equal to 12.5 microns, less than or equal to 10 microns, less than or equal to 7.5 microns, less than or equal to 5 microns, less than or equal to 4 microns, less than or equal to 3 microns, less than or equal to 2.75 microns, less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, or less than or equal to 0.75 microns. Combinations of the above-referenced ranges are also possible (e.g., greater than or equal to 0.5 microns and less than or equal to 20 microns, or greater than or equal to 1 micron and less than or equal to 3 microns). Other ranges are also possible.

When present, a carrier layer may have a variety of suitable basis weights. The basis weights of carrier layers in which undulations have yet to be formed, tend to be lower than those that comprise one or more sets of undulations. Forming undulations in a carrier layer tends to increase the amount of the scrim per area of filter media footprint, and thus tends to increase the basis weight of the carrier layer. As described above, fabrication of a filter media may comprise forming undulations in an initially un-undulated carrier layer that then undergoes one or more processes to form one or more sets of undulations. For this reason, it may be more facile to refer to the basis weights of carrier layers prior to undulation. These basis weights are equivalent to the basis weights of the carrier layers if extended to remove all undulations therein.

Each carrier layer in the filter media may independently have a basis weight prior to undulation of greater than or equal to 5 g/m$^2$, greater than or equal to 7.5 g/m$^2$, greater than or equal to 10 g/m$^2$, greater than or equal to 12.5 g/m$^2$, greater than or equal to 15 g/m$^2$, greater than or equal to 17.5 g/m$^2$, greater than or equal to 20 g/m$^2$, greater than or equal to 22.5 g/m$^2$, greater than or equal to 25 g/m$^2$, or greater than or equal to 27.5 g/m$^2$. Each carrier layer in the filter media may independently have a basis weight prior to undulation of less than or equal to 30 g/m$^2$, less than or equal to 27.5 g/m$^2$, less than or equal to 25 g/m$^2$, less than or equal to 22.5 g/m², less than or equal to 20 g/m², less than or equal to 17.5 g/m², less than or equal to 15 g/m², less than or equal to 12.5 g/m², less than or equal to 10 g/m², or less than or equal to 7.5 g/m². Combinations of the above-referenced ranges are also possible (e.g., greater than or equal to 5 g/m² and less than or equal to 30 g/m²). Other ranges are also possible. The basis weight of a carrier layer may be determined by weighing a carrier layer of known area and then dividing the measured weight by the known area.

As described above, some filter media, such as waved filter media, comprise one or more support layers. The support layer(s) may support one or more other layer(s) of the filter media that are waved. In an exemplary embodiment, a filter media includes a downstream support layer disposed on the air outflow side of the waved layer(s) and that is effective to hold the waved layer(s) in the waved configuration. The filter media can also include an upstream support layer that is disposed on the air entering side of the waved layer(s) opposite to the downstream support layer. The upstream support layer can likewise help maintain the waved layer(s) in a waved configuration. As indicated above, a person skilled in the art will appreciate that the filter media can include any number of layers, and it need not include two support layers, or a top layer. In certain exemplary embodiments, the filter media can include a single support layer positioned either upstream or downstream of the other waved layers. In other embodiments, the filter media can include any number of additional layers arranged in various configurations. The particular number and type of layers will depend on the intended use of the filter media.

The support layers described herein can be formed using various techniques known in the art, including meltblowing, air laid techniques, carding, spunbonding, and extrusion. In an exemplary embodiment, a filter media comprises one or more support layers that is a carded or air laid web. In some embodiments, a filter media comprises one or more support layers that is an extruded mesh.

Various materials can also be used to form the fibers of any support layers included in the filter media described herein, including synthetic and non-synthetic materials. The support layer or layers may comprise meltblown fibers, staple fibers, and/or spunbond fibers. In one exemplary embodiment, one or more support layers are formed from staple fibers, and in particular from a combination of binder fibers and non-binder fibers. One suitable fiber composition is a blend of at least 20% binder fiber and a balance of non-binder fiber. A variety of types of binder and non-binder fibers can be used to form the media of the present invention. The binder fibers can be formed from any material that is effective to facilitate thermal bonding between the layers, and will thus have an activation temperature that is lower than the melting temperature of the non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This may be particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers.

The non-binder fibers, if present in one or more support layers, can be synthetic and/or non-synthetic, and in an exemplary embodiment the non-binder fibers can be 100% synthetic. Synthetic fibers may have advantageous properties with respect to resistance to moisture, heat, long-term aging, and/or microbiological degradation. Exemplary synthetic non-binder fibers can include polyesters, acrylics, polyolefins, nylons, rayons, and combinations thereof.

When present, a support layer may include a suitable percentage of synthetic fibers. For example, in some embodiments, the weight percentage of synthetic fibers in each support layer is independently between 80 wt % and 100 wt % of all fibers in the support layer. In some embodiments, the weight percentage of synthetic fibers in each support layer is independently greater than or equal to 80 wt %, greater than or equal to 90 wt %, or greater than or equal to 95 wt %. In some embodiments, the weight percentage of the synthetic fibers in each support layer is independently less than or equal to 100 wt %, less than or equal to 95 wt %, less than or equal to 90 wt %, or less than or equal to 85 wt %. Combinations of the above-referenced ranges are also possible (e.g., greater than or equal to 80 wt % and less than or equal to 100 wt %). Other ranges are also possible. In some embodiments, one or more support layers includes 100 wt % of synthetic fibers. In some embodiments, one or more support layers includes the above-noted ranges of synthetic fibers with respect to the total weight of the support layer (e.g., including any resins).

When present, a support layer can be formed from a variety of fibers types and sizes. In an exemplary embodiment where a filter media comprises a downstream support layer, the downstream support layer is formed from fibers having an average diameter that is greater than or equal to an average diameter of the other layers present in the filter media. In some cases in which a filter media comprises both an upstream support layer and a downstream support layer, the upstream support layer formed from fibers having an average diameter that is less than or equal to an average diameter of the downstream support layer, but that is greater than an average diameter of the other layers present in the filter media. In certain exemplary embodiments, a filter media comprises a downstream support layer and/or the upstream support layer formed from fibers having an average diameter in the range of 10 microns to 32 microns, or 12 microns to 32 microns. For example, the average diameter of the downstream support layer and/or the upstream support layer may be in the range of 18 microns to 22 microns. In some cases, the downstream and/or the upstream support layer may comprise relatively fine fibers. For example, in some embodiments, the finer downstream and/or finer upstream support layer can be formed from fibers having an average diameter in the range of 9 microns to 18 microns. For example, the finer downstream and/or finer upstream support layer average diameter may be in the range of 12 microns to 15 microns.

When present, a support layer may comprise fibers having a variety of suitable average lengths. The fibers may comprise staple fibers and/or continuous fibers. Each support layer in the filter media may independently comprise fibers having an average length of greater than or equal to 20 mm, greater than or equal to 50 mm, greater than or equal to 75 mm, greater than or equal to 100 mm, greater than or equal to 200 mm, greater than or equal to 250 mm, greater than or equal to 300 mm, greater than or equal to 400 mm, greater than or equal to 500 mm, greater than or equal to 750 mm, greater than or equal to 1 m, greater than or equal to 2 m, greater than or equal to 5 m, greater than or equal to 10 m, greater than or equal to 20 m, greater than or equal to 50 m, or greater than or equal to 100 m. Each support layer in the filter media may independently comprise fibers having an average length of less than or equal to 200 m, less than or equal to 100 m, less than or equal to 50 m, less than or equal to 20 m, less than or equal to 10 m, less than or equal to 5 m, less than or equal to 2 m, less than or equal to 1 m, less than or equal to 750 mm, less than or equal to 500 mm, less than or equal to 400 mm, less than or equal to 300 mm, less than or equal to 250 mm, less than or equal to 200 mm, less than or equal to 100 mm, less than or equal to 75 mm, or less than or equal to 50 mm. Combinations of the above-referenced ranges are also possible (e.g., greater than or equal to 20 m and less than or equal to 200 m, greater than or equal to 20 mm and less than or equal to 100 mm, or greater than or equal to 20 mm and less than or equal to 75 mm). Other ranges are also possible.

When present, a support layer may have a variety of suitable basis weights. The basis weights of support layers in which undulations have yet to be formed, tend to be lower than those that comprise one or more sets of undulations. Forming undulations in a support layer tends to increase the amount of the support layer per area of filter media footprint, and thus tends to increase the basis weight of the support layer. As described above, fabrication of a filter media may comprise forming undulations in an initially un-undulated support layer that then undergoes one or more processes to form one or more sets of undulations. For this reason, it may be more facile to refer to the basis weights of support layers prior to undulation. These basis weights are equivalent to the basis weights of the support layers if extended to remove all undulations therein.

Each support layer may independently have a basis weight prior to undulation of greater than or equal to 10 g/m$^2$, greater than or equal to 20 g/m$^2$, greater than or equal to 22 g/m$^2$, greater than or equal to 33 g/m$^2$, greater than or equal to 50 g/m$^2$, greater than or equal to 60 g/m$^2$, greater than or equal to 70 g/m$^2$, greater than or equal to 80 g/m$^2$, or greater than or equal to 90 g/m$^2$. Each support layer may independently have a basis weight prior to undulation of less than or equal to 99 g/m$^2$, less than or equal to 90 g/m$^2$, less than or equal to 80 g/m$^2$, less than or equal to 70 g/m$^2$, less than or equal to 60 g/m$^2$, less than or equal to 50 g/m$^2$, less than or equal to 33 g/m$^2$, less than or equal to 22 g/m$^2$, or less than or equal to 20 g/m$^2$. Combinations of the above-referenced ranges are also possible (e.g., greater than or equal to 10 g/m$^2$ and less than or equal to 99 g/m$^2$, or greater than or equal to 33 g/m$^2$ and less than or equal to 70 g/m$^2$). Other ranges are also possible. The basis weight of a support layer may be measured by weighing a support layer of known area and then dividing the measured weight by the known area.

When present, a support layer may have a variety of suitable thicknesses. Each support layer in the filter media may independently have a thickness of greater than or equal to 3 mil, greater than or equal to 4 mil, greater than or equal to 5 mil, greater than or equal to 6 mil, greater than or equal to 8 mil, greater than or equal to 10 mil, greater than or equal to 12 mil, greater than or equal to 15 mil, greater than or equal to 20 mil, greater than or equal to 25 mil, greater than or equal to 30 mil, greater than or equal to 40 mil, greater than or equal to 50 mil, greater than or equal to 60 mil, greater than or equal to 75 mil, greater than or equal to 100 mil, greater than or equal to 125 mil, greater than or equal to 150 mil, or greater than or equal to 175 mil. Each support layer in the filter media may independently have a thickness of less than or equal to 200 mil, less than or equal to 175 mil, less than or equal to 150 mil, less than or equal to 125 mil, less than or equal to 100 mil, less than or equal to 75 mil, less than or equal to 60 mil, less than or equal to 50 mil, less than or equal to 40 mil, less than or equal to 30 mil, less than or equal to 25 mil, less than or equal to 20 mil, less than or equal to 15 mil, less than or equal to 12 mil, less than or equal to 10 mil, less than or equal to 8 mil, less than or equal to 6 mil, less than or equal to 5 mil, or less than or equal to 4 mil. Combinations of the above-referenced ranges are also possible (e.g., greater than or equal to 4 mil and less than or equal to 200 mil, greater than or equal to 4 mill and less than or equal to 100 mil, greater than or equal to 8 mil and less than or equal to 30 mil, greater than or equal to 15 mil and less than or equal to 60 mil, or greater than or equal to 12 mil and less than or equal to 20 mil). Other ranges are also possible. The thickness of a support layer may be determined by Edana WSP 120.1 Standard (2005) with a pressure foot selected to have a 2 ounce load and a 1 square inch area.

When present, a support layer may have a variety of suitable mean flow pore sizes. Each support layer in the filter media may independently have a mean flow pore size of greater than or equal to 30 microns, greater than or equal to 40 microns, greater than or equal to 50 microns, greater than or equal to 75 microns, greater than or equal to 100 microns, or greater than or equal to 120 microns. Each support layer in the filter media may independently have a mean flow pore size of less than or equal to 150 microns, less than or equal to 120 microns, less than or equal to 100 microns, less than or equal to 75 microns, less than or equal to 50 microns, or less than or equal to 40 microns. Combinations of the above-referenced ranges are also possible (e.g., greater than or equal to 30 microns and less than or equal to 150 microns, or greater than or equal to 50 microns and less than or equal to 120 microns). Other ranges are also possible. The mean flow pore size of a support layer may be determined in accordance with ASTM F316 (2011).

In one exemplary embodiment, a filter media comprises a downstream support layer and an upstream support layer, as measured in a planar configuration, each of which have a thickness of greater than or equal to 8 mil and less than or equal to 30 mil (e.g., greater than or equal to 12 mil and less than or equal to 20 mil), a basis weight of greater than or equal to 10 g/m$^2$ and less than or equal to 99 g/m$^2$ (e.g., greater than or equal to 22 g/m$^2$ and less than or equal to 99 g/m$^2$, or greater than or equal to 33 g/m$^2$ and less than or equal to 70 g/m$^2$), and a mean flow pore size of greater than or equal to 30 microns and less than or equal to 150 microns (e.g., greater than or equal to 50 microns and less than or equal to 120 microns).

As described above, some filter media, such as waved filter media, include one or more outer or cover layers disposed on the air entering side I and/or the air outflow side O. By way of example, FIG. 9A illustrates a top layer 18 that is a cover layer disposed on the air entering side I of the filter media 1006. In some embodiments, a filter media comprises an outer-most layer that is a wire backing. In some embodiments, a filter media comprises a cover layer that can function as a dust loading layer and/or that can function as an aesthetic layer. In an exemplary embodiment, the cover layer is a planar layer that is mated to the rest of the filter media after assembly and/or waving. The cover layer may provide a top surface that is aesthetically pleasing. The cover layer can be formed from a variety of fiber types and sizes. In an exemplary embodiment, the cover layer is formed from fibers having an average fiber diameter other than an average fiber diameter of fibers in an upstream support layer, if one is present. In certain exemplary embodiments, the cover layer is formed from fibers having an average fiber diameter of greater than or equal to 5 microns and less than or equal to 20 microns. As a result, the cover layer can function as a dust holding layer without affecting the gamma value of the filter media.

In some embodiments (e.g., the embodiment shown in FIG. 9B), a filter media includes a bottom layer disposed on the air outflow side. The bottom layer can function as strengthening component that provides structural integrity to the filter media to help maintain the waved configuration if the filter media comprises one or more layers that are waved. The bottom layer can also function to offer abrasion resistance. This may be particularly desirable in ASHRAE bag applications where the outermost layer is subject to abrasion during use. The bottom layer can have a configuration similar to the cover layer, as discussed above. In some embodiments, a filter media comprises both a bottom layer and a cover layer. In an exemplary embodiment, the bottom layer is the coarsest layer, i.e., it is formed from fibers having an average diameter that is greater than an average diameter of fibers forming all of the other layers of the filter media. One exemplary bottom layer is a spunbond layer, however various other layers can be used having various configurations.

When present, any outer layer(s), such as a cover layer and/or a bottom layer, can also be formed using various techniques known in the art, including meltblowing, wet laid techniques, air laid techniques, carding, spunbonding, and extrusion. In an exemplary embodiment, the cover layer is an air laid layer and the bottom layer is a spunbond layer. In some embodiments, a filter media comprises a cover layer that is an extruded mesh and/or a net. The resulting layer(s) can also have a variety of thicknesses, air permeabilities, and basis weights depending upon the requirements of a desired application.

When present, a cover layer and/or a bottom layer can comprise fibers of a variety of suitable types, including synthetic and non-synthetic materials. In one exemplary embodiment, a filter media comprises a cover layer and/or a bottom layer formed from staple fibers, and in particular from a combination of binder fibers and non-binder fibers. One suitable fiber composition is a blend of at least 20% binder fiber and a balance of non-binder fiber. A variety of types of binder and non-binder fibers can be used to form the media of the present invention, including those previously discussed above with respect to the support layers.

In one exemplary embodiment, a filter media comprises a cover layer and/or a bottom layer, as measured in a planar configuration, each of which independently has a thickness of greater than or equal to 2 mil and less than or equal to 50 mil, an air permeability of greater than or equal to 100 CFM and less than or equal to 1200 CFM, and a basis weight of greater than or equal to 10 g/m² and less than or equal to 50 g/m². The thickness of a cover layer may be determined by Edana WSP 120.1 Standard (2005) with a pressure foot selected to have a 2 ounce load and a 1 square inch area. The air permeability of a cover layer may be determined in accordance with ASTM Test Standard D737 (1996) under a pressure drop of 125 Pa on a sample with a test area of 38 cm². The basis weight of a cover layer may be measured by weighing a support layer of known area and then dividing the measured weight by the known area.

As described above, some filter media described herein comprise an adhesive. The adhesive may be positioned between two layers to adhere them together. When present, the adhesive may be positioned in a variety of suitable locations in the filter media, such as between an efficiency layer and a scrim, between an efficiency layer and a nanofiber layer, between a nanofiber layer and a support layer, and/or between any other two layers in the filter media. In other words, an adhesive may be positioned between a first layer and a second layer, between a second layer and a third layer, between a third layer and a fourth layer, and/or between any other two layers. In some embodiments, a filter media comprises adhesive positioned between two separate pairs of layers (e.g., between a first layer and a second layer, and between a second layer and a third layer; between a first layer and a second layer, and between a third layer and a fourth layer). Properties of some adhesives are described in further detail below.

A variety of adhesives may be employed in the filter media described herein. Non-limiting examples of suitable adhesives include pressure sensitive and/or high tack adhesives (e.g., Carbobond 1995), holt melt adhesives (e.g., Bostik HM4105, Bostik 2751). In some embodiments, a filter media comprises a water-based adhesive. In some embodiments, the adhesive is applied in emulsion form. The solids dispersed in the emulsion may comprise an acrylic copolymer.

When present, an adhesive may have a variety of suitable basis weights. The amount of adhesive between any two layers may be greater than or equal to 0.1 g/m², greater than or equal to 0.15 g/m², greater than or equal to 0.2 g/m², greater than or equal to 0.25 g/m², greater than or equal to 0.3 g/m², greater than or equal to 0.35 g/m², greater than or equal to 0.4 g/m², greater than or equal to 0.45 g/m², greater than or equal to 0.5 g/m², greater than or equal to 0.6 g/m², greater than or equal to 0.8 g/m², greater than or equal to 1 g/m², greater than or equal to 1.25 g/m², greater than or equal to 1.5 g/m², greater than or equal to 1.75 g/m², greater than or equal to 2 g/m², greater than or equal to 2.5 g/m², greater than or equal to 3 g/m², or greater than or equal to 4 g/m². The amount of adhesive between any two layers may be less than or equal to 5 g/m², less than or equal to 4 g/m², less than or equal to 3 g/m², less than or equal to 2.5 g/m², less than or equal to 2 g/m², less than or equal to 1.75 g/m², less than or equal to 1.5 g/m², less than or equal to 1.25 g/m², less than or equal to 1 g/m², less than or equal to 0.8 g/m², less than or equal to 0.6 g/m², less than or equal to 0.5 g/m², less than or equal to 0.45 g/m², less than or equal to 0.4 g/m², less than or equal to 0.35 g/m², less than or equal to 0.3 g/m², less than or equal to 0.25 g/m², less than or equal to 0.2 g/m², or less than or equal to 0.15 g/m². Combinations of the above-referenced ranges are also possible (e.g., greater than or equal to 0.1 g/m² and less than or equal to 5 g/m², greater than or equal to 0.3 g/m² and less than or equal to 1 g/m², or greater than or equal to 0.3 g/m² and less than or equal to 0.5 g/m²). Other ranges are also possible.

The basis weights described above may be one or more of the following basis weights: (1) the basis weight of an adhesive with respect to the final filter media; (2) the basis weight of an adhesive with respect to a filter media that has been extended to remove one set of undulations therein but not another (e.g., extended to remove undulations formed by a waving process but not undulations formed by a gathering process)); and (3) the basis weight of an adhesive which has been extended to remove all undulations therein.

In some embodiments, a filter media comprises a pair of layers between which no adhesive is positioned. Some filter media lack adhesive entirely. In some embodiments, other methods are employed, in addition to or instead of those using adhesives, to bond layers of a filter media together. For instance, ultrasonic welding may be employed to bond two or more layers of a filter media together.

Example 1

This Example describe the fabrication and testing of filter media comprising an irregular structure present at the surface thereof and extending through the uppermost layer therein.

Each filter media was fabricated by adhering a meltblown efficiency layer to a stretched mesh scrim, and then allowing the stretched mesh scrim to recover. First, the mesh scrim and meltblown efficiency layer were prepared. The mesh scrim and meltblown efficiency layer were cut to the desired sizes: the mesh scrim was cut to form a 15 inch by 16 inch rectangle, and the meltblown efficiency layer was cut to form a rectangle with a width of 15 inches and a length equal to the stretched length of the mesh to which it would be applied. Then, the mesh scrim was placed on a paper blotter, and an adhesive was applied thereto with a medium nap paint roller. The adhesive was a 50 wt %:50 wt % mixture of water and Carbobond 1955 (a 55 wt % solids acrylic copolymer emulsion). After coating with the adhesive, the mesh scrim was hung and allowed to air dry for at least 10 minutes.

Figure 10:
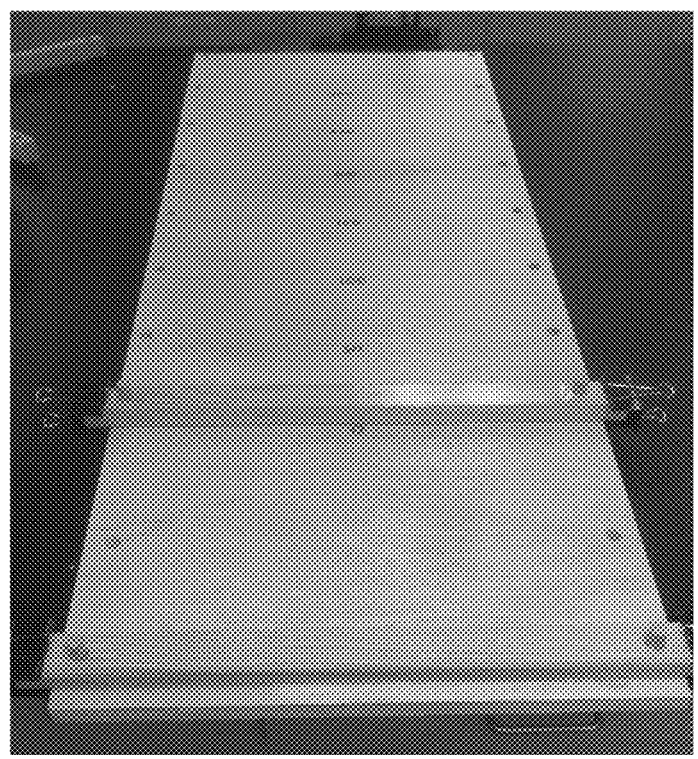
FIGS. 10-11 are photographs of an apparatus that may be used to fabricate a filter media according to some embodiments.
Figure 11:
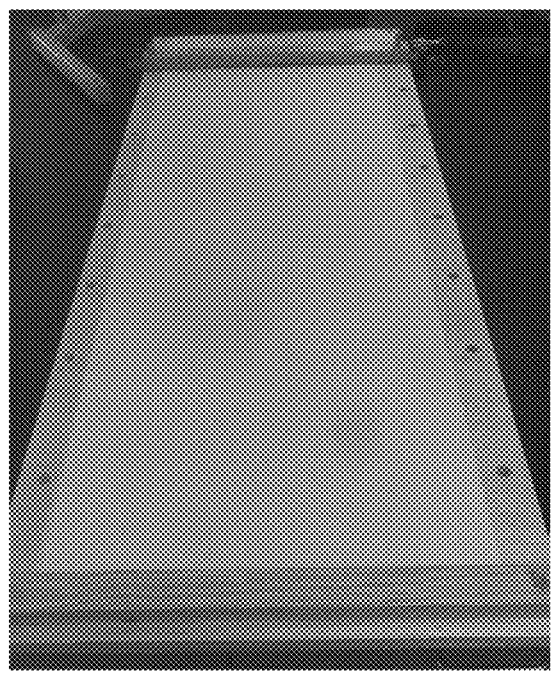

After the mesh scrim and meltblown efficiency layer were prepared, they were assembled together to form a filter media. The mesh scrim was clamped onto a piece of parchment paper disposed on a wooden board by wooden strips affixed thereto by dowel pins. FIG. 10 shows the wooden board, wooden strips, and dowel pins. Then, the distal wooden strip was moved away from the proximal wooden strip to stretch the filter media until the desired degree of stretch was obtained. At this point, the meltblown efficiency layer was gently pressed onto the adhesive-coated mesh using a lightweight roller device. FIG. 11 shows a photograph of an exemplary meltblown efficiency layer adhered to an adhesive-coated mesh stretched to 300% of its initial length. Finally, the meltblown efficiency layer and mesh scrim were removed together from the parchment paper and wooden strips, the mesh scrim was allowed to recover, and excess portions of the mesh scrim uncovered by the meltblown efficiency layer were cut away. The mesh scrim was allowed to recover by removing the dowel pins from the distal wooden strip and manually reducing the tension on the stretched mesh scrim. During this process, the meltblown efficiency layer became gathered.

Two sets of filter media were made, both of which included a polypropylene meltblown efficiency layer including fibers with diameters between 1 and 3 microns and a SWM X30014 styrenic block copolymer mesh scrim. For the first type of filter media (Type A), the polypropylene meltblown efficiency layer had a basis weight of 7.7 g/m$^2$ and was uncharged. For the second type of filter media (Type B), the polypropylene meltblown efficiency layer had a basis weight of 32 g/m$^2$ and was hydro charged.

For both types of filter media, increasing the degree of stretch of the mesh scrim prior to adhesion of the meltblown efficiency layer thereto increased the gamma, the average surface height, the thickness, and the basis weight of the resultant filter media up to a degree of stretch of 300%. Stretching the mesh scrim to a degree of stretch of 400% did not result in further increases in these values. Tables 1 and 2, below, show the effect of initial mesh scrim stretch on several properties of the resultant filter media for filter media of Types A and B, respectively.

TABLE 1

Properties of filter media of Type A

| Sample No. | 1 | 2 | 3 | 4 | 5 | 6 | 7 | 8 |
|---|---|---|---|---|---|---|---|---|
| Percent stretch of mesh scrim prior to adhesion of meltblown efficiency layer thereto | 0% | 50% | 100% | 150% | 200% | 250% | 300% | 400% |
| Meltblown basis weight in filter media (g/m$^2$) | 7.7 | 10.2 | 13.5 | 15.5 | 19.3 | 22.2 | 25.2 | 24.3 |
| Percent increase in meltblown basis weight in comparison to Sample No. 1 | N/A | 33% | 75% | 102% | 152% | 189% | 227% | 216% |
| Filter media thickness (mm) | 0.886 | 2.379 | 2.843 | 3.035 | 4.204 | 4.255 | 5.493 | 4.334 |
| Percent increase in filter media thickness in comparison to Sample No. 1 | N/A | 169% | 221% | 243% | 374% | 380% | 520% | 389% |
| Filter media pressure drop (mm) | 2.6 | 1.9 | 1.6 | 1.4 | 1.2 | 1.1 | 0.9 | 1.1 |
| Penetration through filter media | 58.2% | 51.6% | 49.6% | 51.7% | 48.6% | 40.9% | 36.1% | 30.4% |
| Filter media gamma | 9.0 | 15.1 | 19.0 | 20.5 | 26.1 | 35.3 | 49.2 | 47.0 |
| Percent increase in gamma in comparison to Sample No. 1 | N/A | 67% | 111% | 126% | 189% | 290% | 444% | 420% |

TABLE 2

Properties of filter media of Type B

| Sample No. | 9 | 10 | 11 | 12 | 13 | 14 | 15 |
|---|---|---|---|---|---|---|---|
| Percent stretch of mesh scrim prior to adhesion of meltblown efficiency layer thereto | 0% | 50% | 100% | 150% | 200% | 250% | 300% |
| Meltblown basis weight in filter media (g/m$^2$) | 33.5 | 42.8 | 54.7 | 68.6 | 77.2 | 90.3 | 99.4 |
| Percent increase in meltblown basis weight in comparison to Sample No. 9 | N/A | 28% | 63% | 105% | 130% | 170% | 197% |
| Filter media pressure drop (mm) | 3.2 | 2.4 | 2.1 | 2.1 | 1.6 | 1.2 | 1.3 |
| Penetration through filter media | 0.0167% | 0.0123% | 0.01% | 0.01% | 0.008% | 0.007% | 0.004% |
| Filter media gamma | 118 | 163 | 190 | 190 | 256 | 346 | 338 |
| Percent increase in gamma in comparison to Sample No. 9 | N/A | 38% | 61% | 61% | 117% | 193% | 187% |

Figure 12:
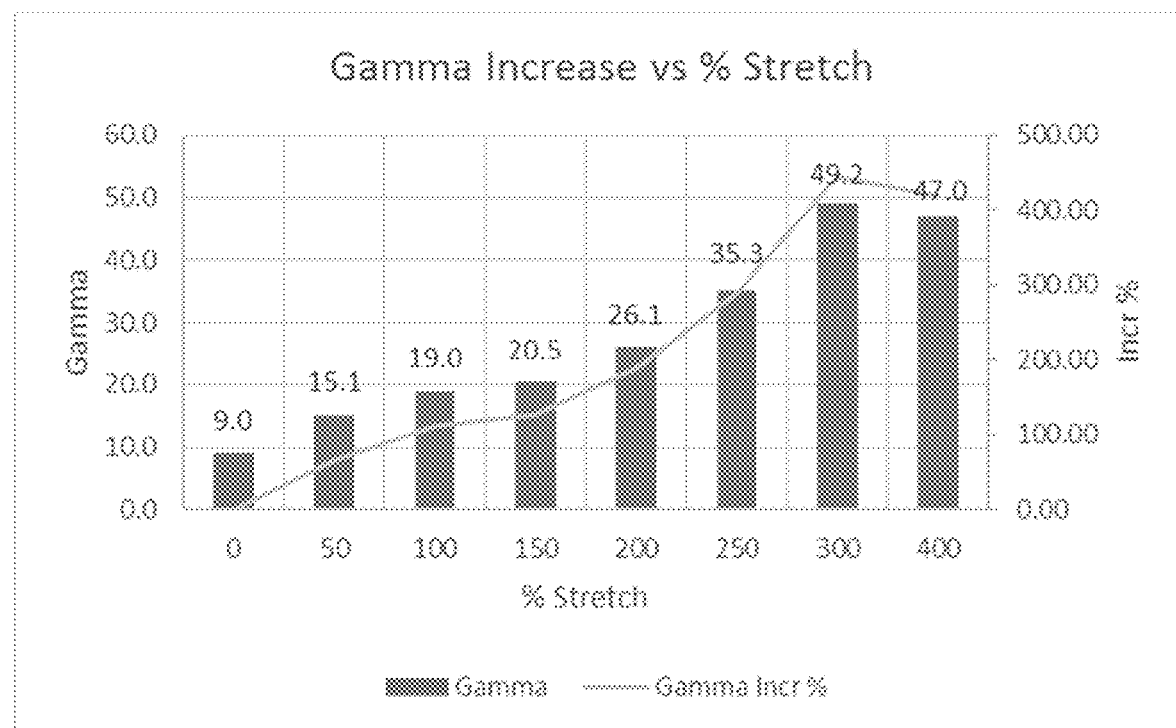
FIG. 12 is a plot showing gamma and percent increase in gamma as a function of stretch according to some embodiments.
Figure 13:
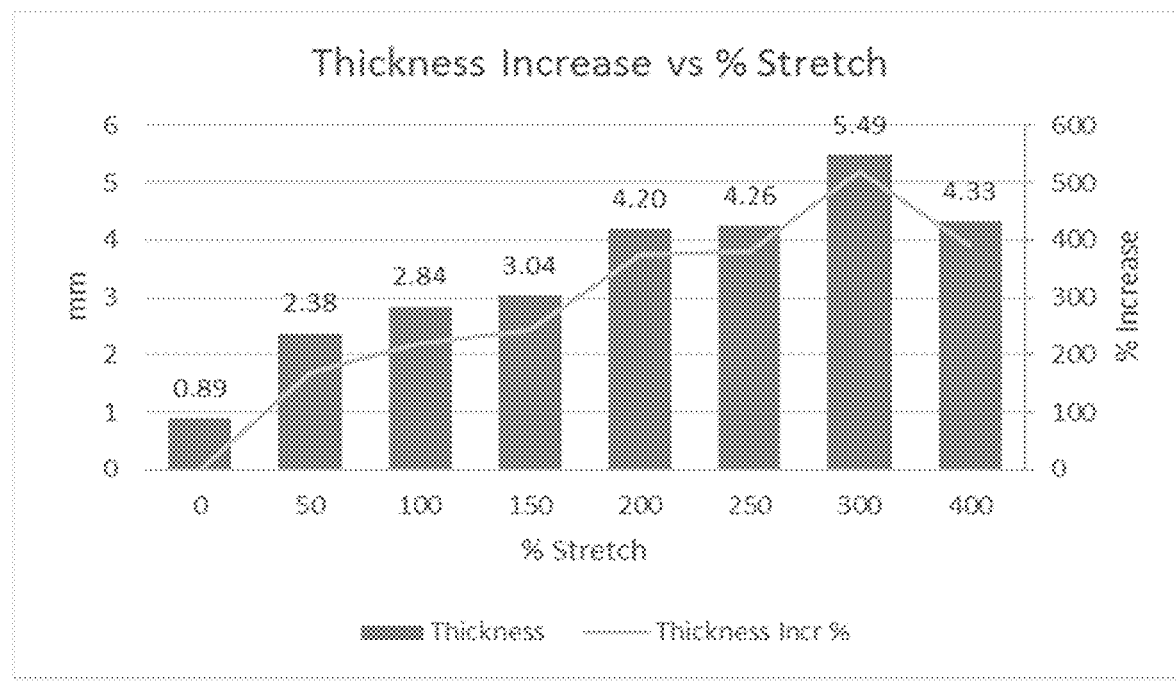
FIG. 13 is a plot showing thickness and percent increase in thickness as a function of stretch according to some embodiments.
Figure 14:
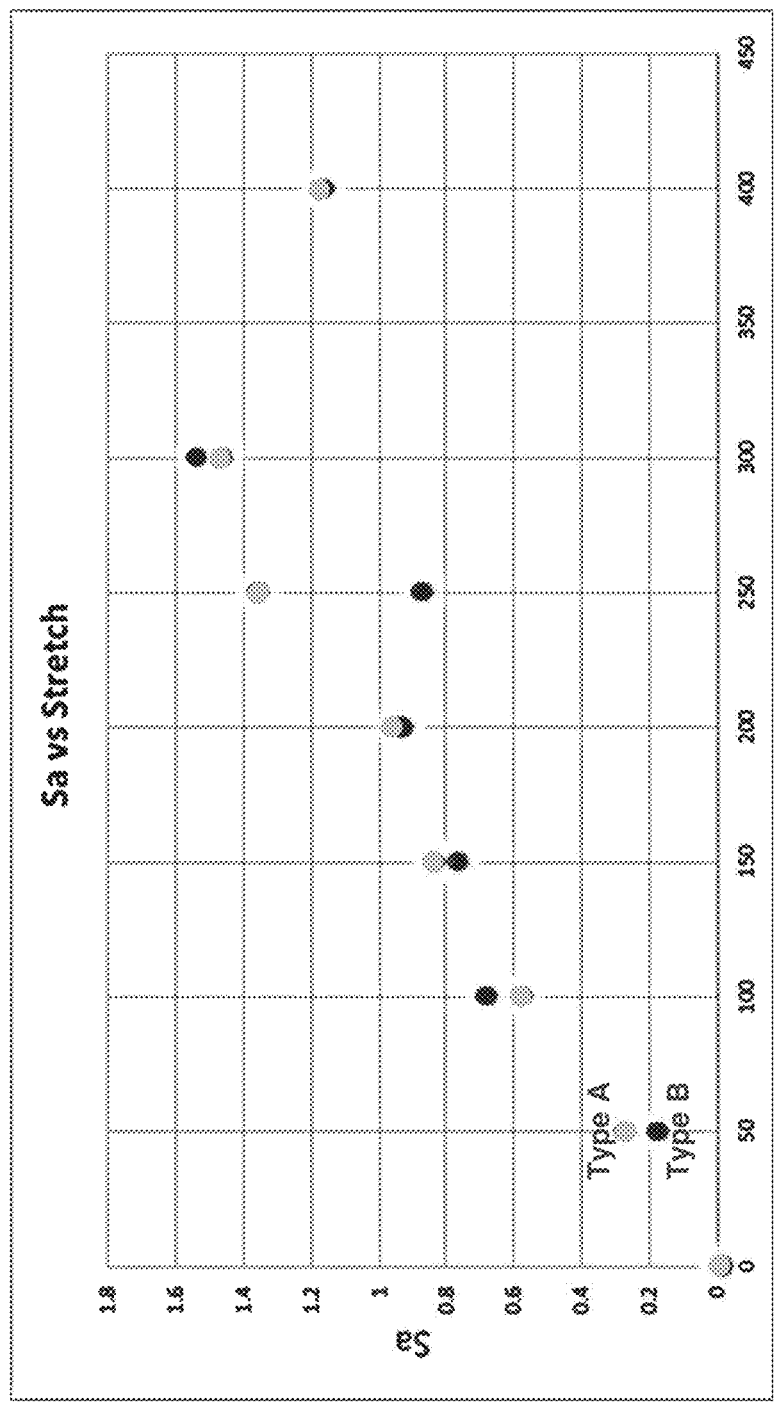
FIG. 14 is a plot showing surface height as a function of stretch according to some embodiments.
Figure 15:
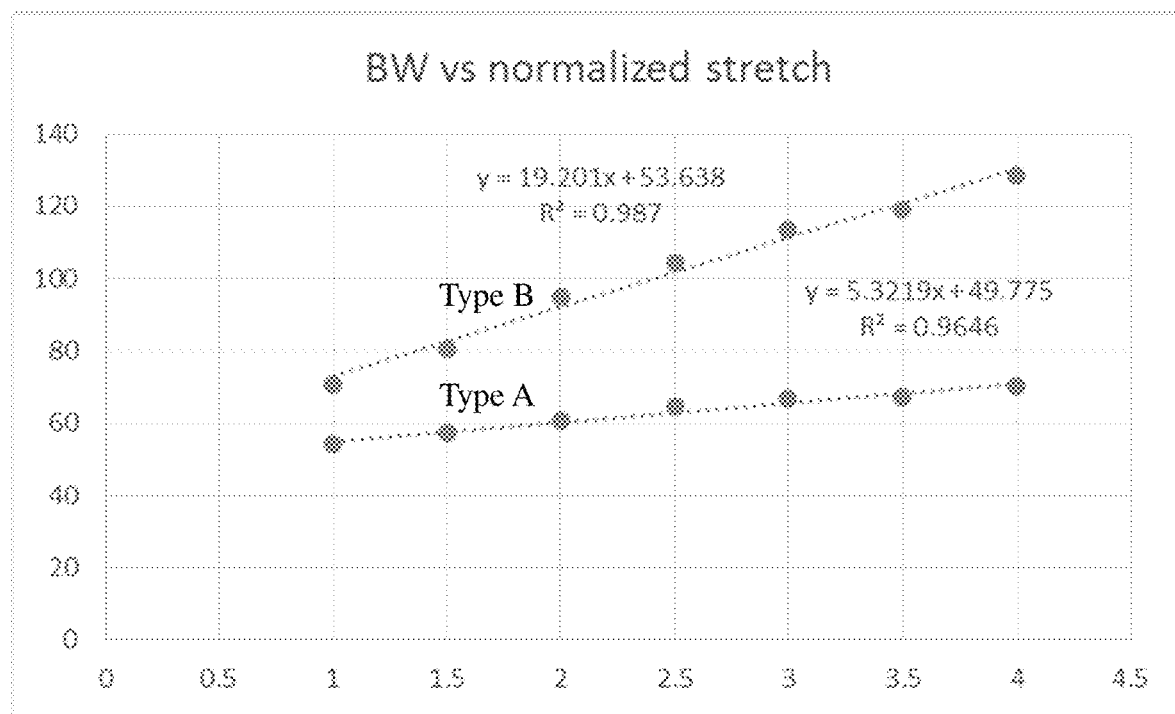
FIG. 15 is a plot showing basis weight as a function of stretch according to some embodiments.
Figure 16:
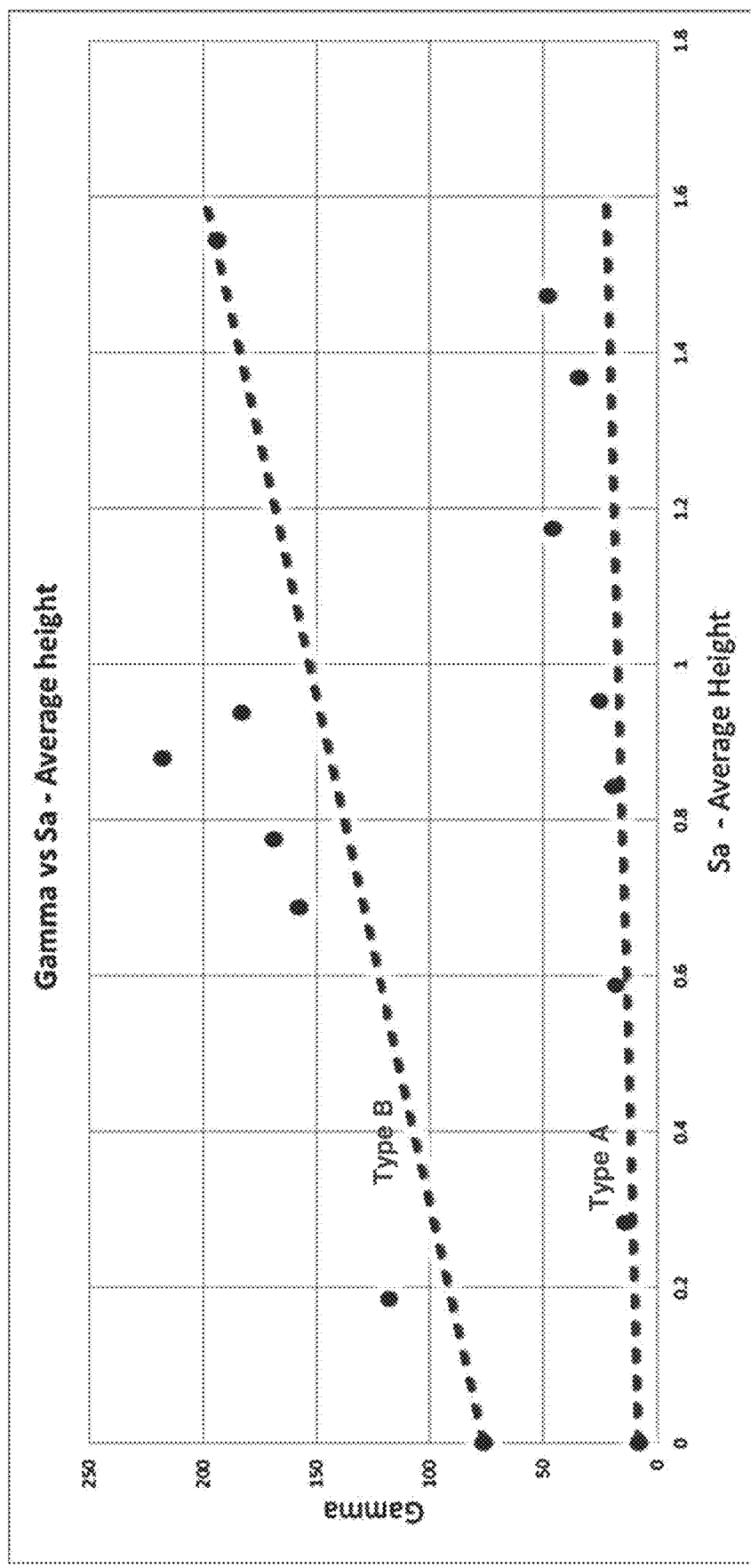
FIG. 16 is a plot showing gamma as a function of surface height according to some embodiments.

FIGS. 12 and 13 show the gamma and thickness, respectively, for filter media of Type A as a function of degree of stretch of the mesh scrim prior to adhesion of the meltblown efficiency layer thereto. In FIGS. 12 and 13, the x-axis is the degree of stretch, which is equivalent to the difference between the stretched length of the mesh scrim at which the meltblown efficiency layer was applied and the initial length of the mesh scrim divided by the initial length of the mesh scrim and then multiplied by 100%. FIGS. 14 and 15 show the average surface height ($S_a$) and basis weight, respectively, as a function of degree of stretch of the mesh scrim prior to adhesion of the meltblown efficiency layer thereto for both types of filter media. In FIGS. 14 and 15, the x-axis is the ratio of the stretched length of the mesh scrim at which the meltblown efficiency layer was applied to the initial length of the mesh scrim. FIG. 16 shows the gamma as a function of average surface height for both types of filter media, indicating that gamma increases with average surface height.

Figure 17:
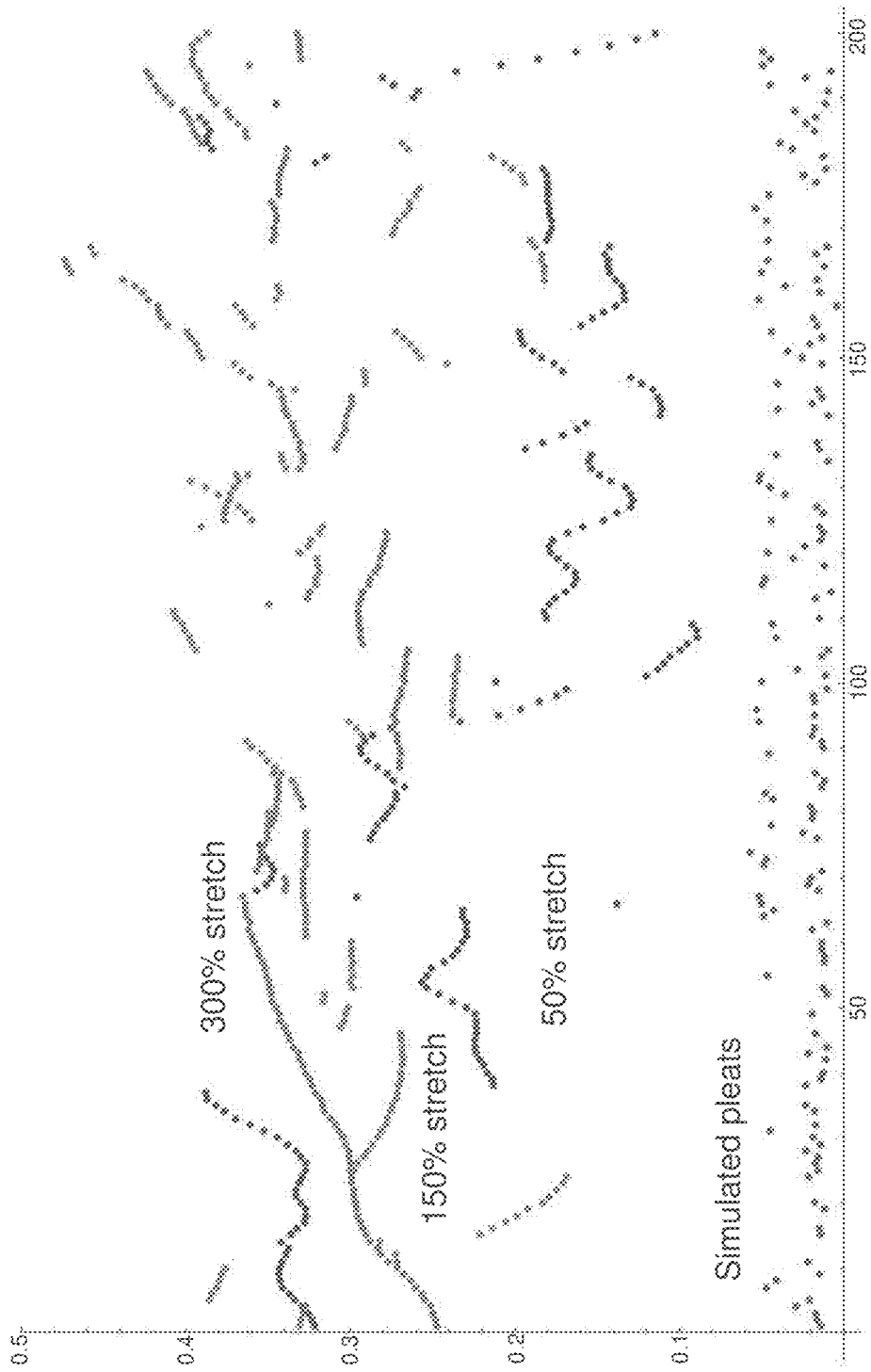
FIG. 17 is a plot showing the ratio of peak spacing standard deviation to average peak spacing at different degrees of stretch according to some embodiments.
Figure 18:
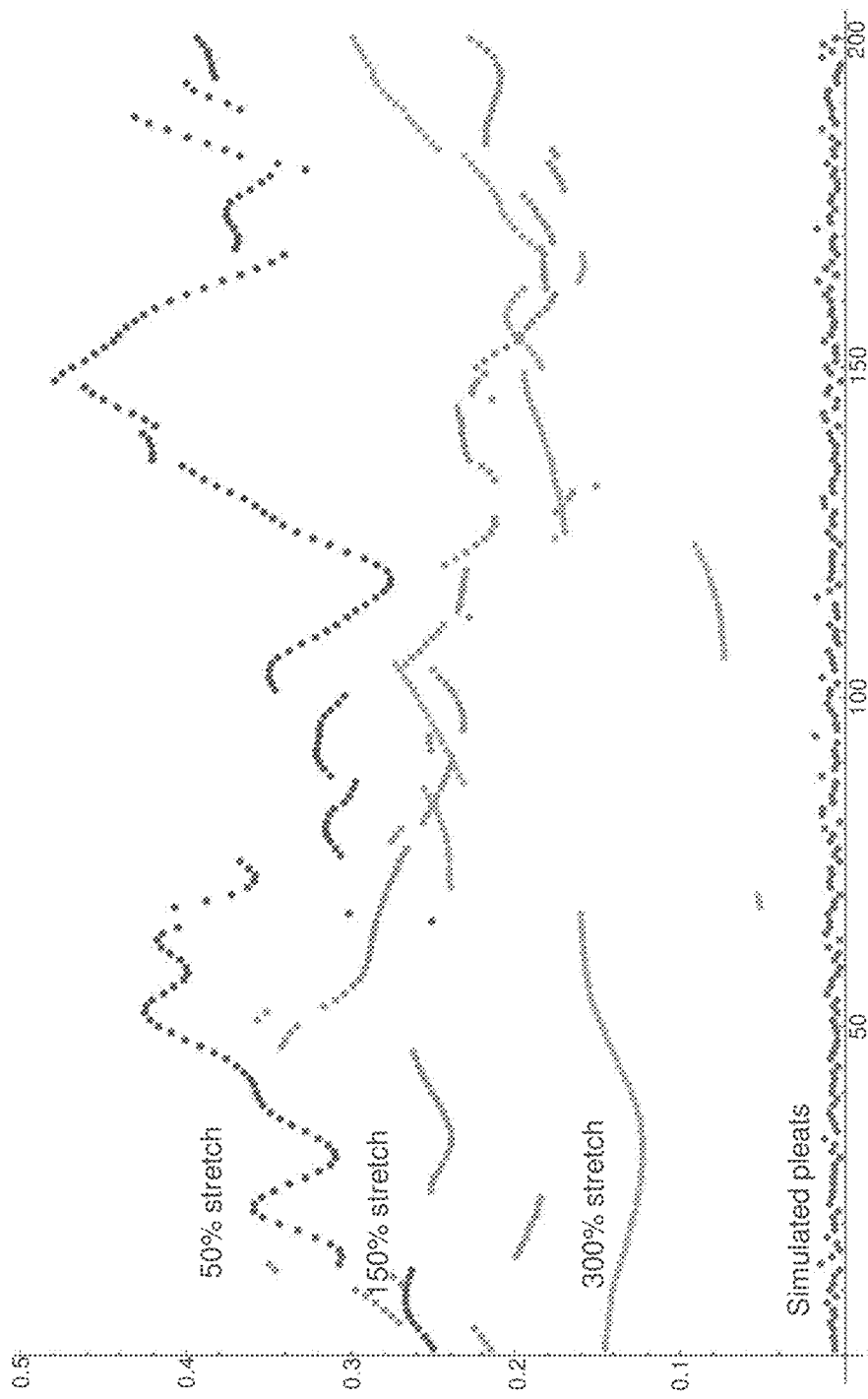
FIG. 18 is a plot showing the ratio of peak height standard deviation to average peak height according to some embodiments.

For filter media of Type B, increasing the degree of stretch of the mesh scrim prior to adhesion of the meltblown efficiency layer thereto also increased the irregularity of the surface of the filter media. FIGS. 17 and 18 show comparisons between filter media of Type B and simulations of pleated filter media. The y-axis of FIG. 17 shows the ratio of peak spacing standard deviation to average peak spacing across each sample, which is determined by following steps (1)-(2) of the procedure described above with respect to ISO 16610-21:2011, performing step (4) on each row, and then using standard statistical techniques to determine the peak spacing standard deviation. The y-axis of FIG. 18 shows the ratio of peak height standard deviation to average peak height across each sample, which is determined by following steps (1)-(2) of the procedure described above ISO 16610-21:2011, performing step (4) on each row, and then using standard statistical techniques to determine the height standard deviation. The x-axis of FIGS. 17 and 18 shows the position in the sample of the row at which the relevant ratio was measured. The data from the stretched samples is that measured from the samples described above. The data from the simulated pleats was data obtained based on simulations of pleated media comprising 10 mm high mini pleats with a pitch of 2.5 mm; variations in pleat height and pitch typically seen during manufacturing of pleated media were included in the simulation.

As shown in FIG. 17, the ratio of peak spacing standard deviation to average peak spacing increased with the degree of stretch of the mesh scrim prior to adhesion of the meltblown efficiency layer thereto. As also shown in FIG. 17, the ratio of peak spacing standard deviation to average peak spacing was far greater for each filter media of Type B than for the simulated pleated filter media. As shown in FIG. 18, the ratio of peak height standard deviation to average peak height decreased with the degree of stretch of the mesh scrim prior to adhesion of the meltblown efficiency layer thereto. This is because the average peak height increased with the degree of stretch of the mesh scrim prior to adhesion of the meltblown efficiency layer thereto to a greater degree than the peak height standard deviation. However, as shown in FIG. 18, for all cases the ratio of peak height standard deviation to average peak height for the filter media described in this Example greatly exceeded that for a simulated filter media having pleats.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
    a layer, wherein:
        the layer comprises a plurality of peaks having an average peak spacing and a peak spacing standard deviation;
        a ratio of the peak spacing standard deviation to the average peak spacing is greater than or equal to 0.08;
        the layer has an average surface height of greater than 0 3 mm;
        the average surface height is an average of relative heights of each point in a relative surface topography with respect to a reference height; and
        the reference height is a height of which 95% of the points making up a measured surface topography are above and 5% of the points making up the measured surface topography are below.

2. An article, comprising:
    a layer, wherein:
        the layer comprises a plurality of peaks having an average peak height and a peak height standard deviation;
        a ratio of the peak height standard deviation to the average peak height is greater than or equal to 0.15 and less than or equal to 0.5;
        the layer has an average surface height of greater than 0 3 mm;
        the average surface height is an average of relative heights of each point in a relative surface topography with respect to a reference height; and
        the reference height is a height of which 95% of the points making up a measured surface topography are above and 5% of the points making up the measured surface topography are below.

3. The article of claim 2, wherein the layer is a meltblown fiber web.

4. The article of claim 2, wherein the layer is charged.

5. The article of claim 2, wherein the article has an air permeability of greater than or equal to 2 CFM.

6. The article of claim 2, wherein the article has an air permeability of greater than or equal to 20 CFM.

7. The article of claim 2, wherein the article further comprises a scrim.

8. The article of claim 7, wherein the scrim is a mesh.

9. The article of claim 7, wherein the scrim is a spunbond web.

10. The article of claim 7, wherein the scrim is capable of undergoing a reversible stretch of at least 50% along at least one axis.

11. The article of claim 7, wherein the layer is adhered to the scrim by an adhesive.

12. The article of claim 2, wherein the article further comprises a second layer.

13. The article of claim 12, wherein the second layer is an electrospun fiber web.

14. The article of claim 13, wherein the layer is a meltblown fiber web, and wherein the electrospun fiber web and a scrim are positioned on opposite sides of the layer.

15. The article of claim 2, wherein the article comprises a support layer.

16. The article of claim 15, wherein the support layer holds the layer in a waved configuration and maintains separation of peaks and troughs of adjacent waves of the layer.

17. The article of claim 2, wherein the layer comprises a plurality of undulations, and wherein the plurality of undulations comprises the plurality of peaks.

* * * * *

UNITED STATES PATENT AND TRADEMARK OFFICE
CERTIFICATE OF CORRECTION

| | |
|---|---|
| PATENT NO. | : 12,036,496 B2 |
| APPLICATION NO. | : 17/873960 |
| DATED | : July 16, 2024 |
| INVENTOR(S) | : Bruce Smith et al. |

Page 1 of 1

It is certified that error appears in the above-identified patent and that said Letters Patent is hereby corrected as shown below:

In the Claims

Column 52, Claim 1, Line 24, "0 3 mm;" should read --0.3 mm;--

Signed and Sealed this
Tenth Day of December, 2024

Katherine Kelly Vidal
*Director of the United States Patent and Trademark Office*